United States Patent
Ebrahimi Afrouzi et al.

(10) Patent No.: US 11,747,819 B1
(45) Date of Patent: Sep. 5, 2023

(54) ROBOTIC FIRE EXTINGUISHER

(71) Applicants: Ali Ebrahimi Afrouzi, Henderson, NV (US); Lukas Robinson, York (CA); Chen Zhang, Redmond, WA (US); Brian Highfill, Castro Valley, CA (US)

(72) Inventors: Ali Ebrahimi Afrouzi, Henderson, NV (US); Lukas Robinson, York (CA); Chen Zhang, Redmond, WA (US); Brian Highfill, Castro Valley, CA (US)

(73) Assignee: AI Incorporated, Toronto (CA)

(*) Notice: Subject to any disclaimer, the term of this patent is extended or adjusted under 35 U.S.C. 154(b) by 0 days.

(21) Appl. No.: 17/837,682

(22) Filed: Jun. 10, 2022

Related U.S. Application Data

(63) Continuation of application No. 16/534,898, filed on Aug. 7, 2019, now Pat. No. 11,449,064, which is a continuation-in-part of application No. 15/955,480, filed on Apr. 17, 2018, now Pat. No. 10,436,810, and a continuation-in-part of application No. 15/498,382, filed on Apr. 26, 2017, now abandoned, and a continuation-in-part of application No. 15/447,450, filed on Mar. 2, 2017, now abandoned.

(60) Provisional application No. 62/748,943, filed on Oct. 22, 2018, provisional application No. 62/746,688, filed on Oct. 17, 2018, provisional application No. 62/740,558, filed on Oct. 3, 2018, provisional application No. 62/740,580, filed on Oct. 3, 2018, provisional application No. 62/740,573, filed on Oct. 3, 2018, provisional application No. 62/735,137, filed on Sep. 23, 2018, provisional application No. 62/720,478, filed on Aug. 21, 2018, provisional application No. 62/720,521, filed on Aug. 21, 2018, provisional application No. 62/317,037, filed on Apr. 1, 2016, provisional application No. 62/302,934, filed on Mar. 3, 2016.

(51) Int. Cl.
*G06T 3/00* (2006.01)
*G05D 1/02* (2020.01)
*A62C 27/00* (2006.01)

(52) U.S. Cl.
CPC ......... *G05D 1/0221* (2013.01); *G05D 1/0212* (2013.01); *G05D 1/0231* (2013.01); *A62C 27/00* (2013.01)

(58) Field of Classification Search
CPC .. G05D 1/0221; G05D 1/0212; G05D 1/0231; A62C 27/00
See application file for complete search history.

(56) References Cited

U.S. PATENT DOCUMENTS

| | | | |
|---|---|---|---|
| 2016/0022109 A1* | 1/2016 | Dooley | G05D 1/0219 15/98 |
| 2019/0270451 A1* | 9/2019 | Liu | B62D 15/025 |

* cited by examiner

Primary Examiner — Mekonen T Bekele

(57) ABSTRACT

Provided is provide a robotic device, including: a chassis; a set of wheels; a control system; a battery; one or more sensors; a processor; a tangible, non-transitory, machine readable medium storing instructions that when executed by the processor effectuates operations including: capturing, with the one or more sensors, data of an environment of the robotic device and data indicative of movement of the robotic device; generating or updating, with the processor, a map of the environment based on at least a portion of the captured data; and generating or updating, with the processor, a movement path of the robotic device based on at least the map of the environment.

20 Claims, 37 Drawing Sheets

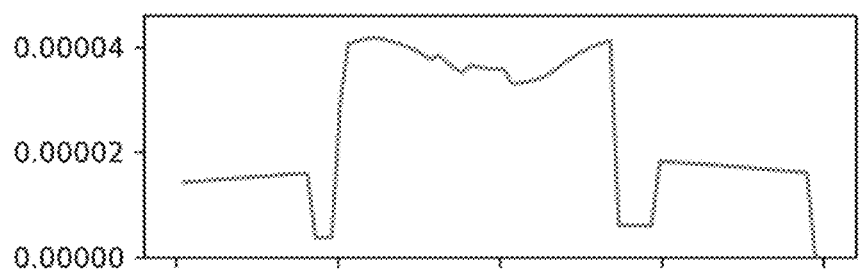
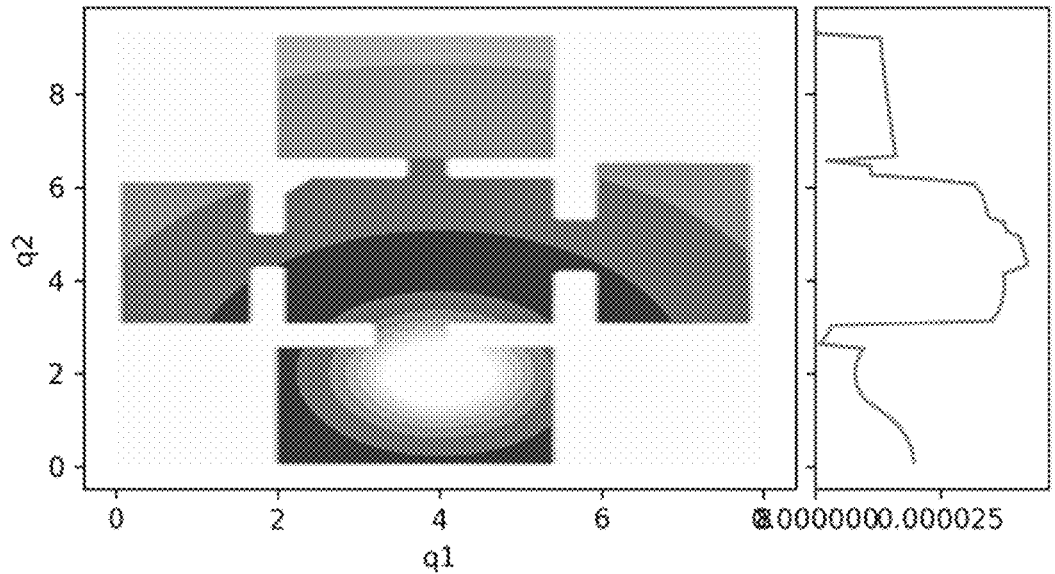
FIG. 23
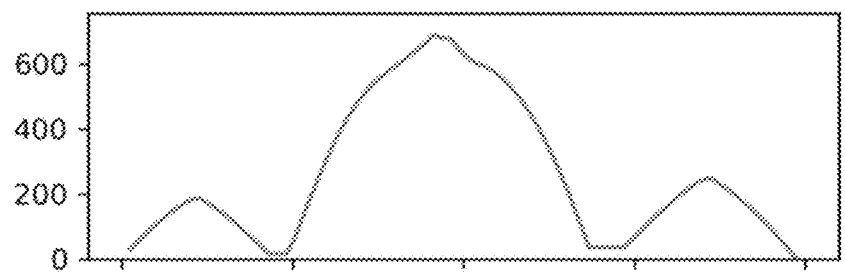
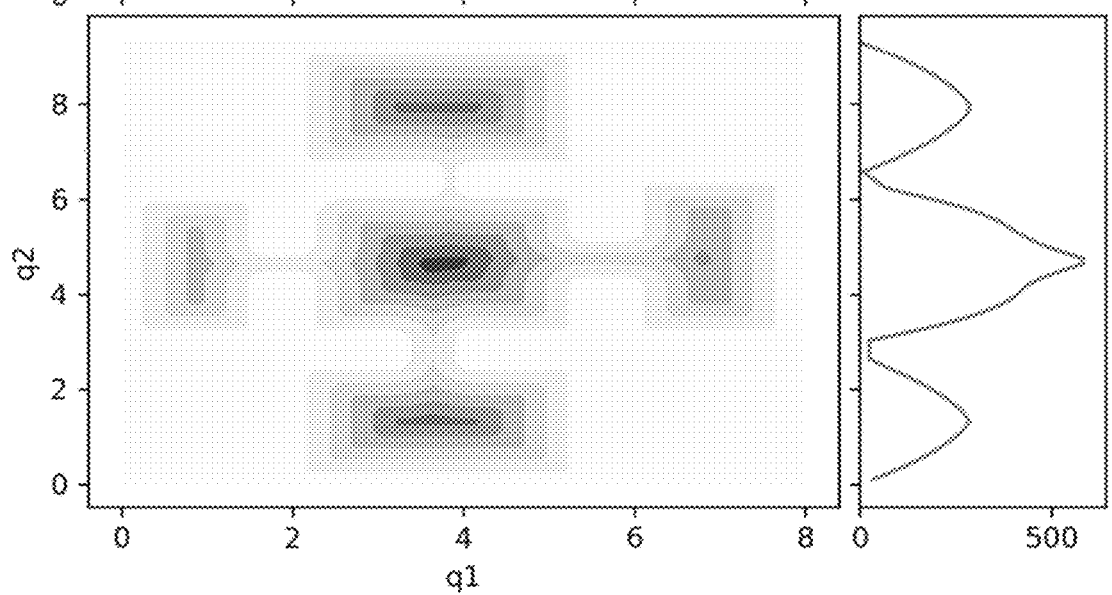
FIG. 24

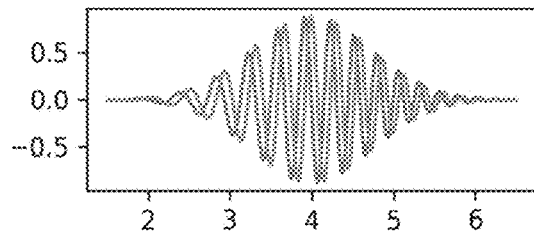
FIG.33A Original Ψ(x, 2)
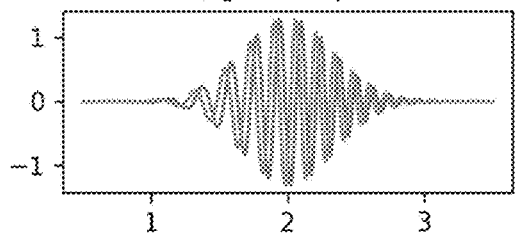
FIG.33B Original Φ(p, 2)
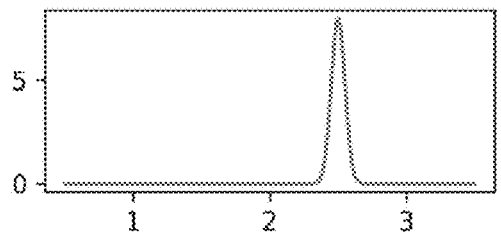
FIG.33C Observed Momentum Prob
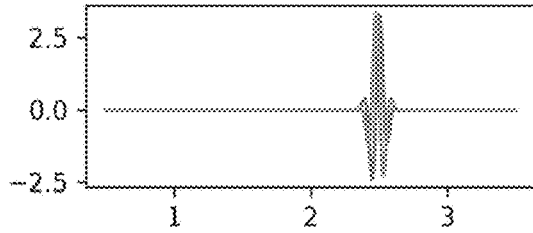
FIG.33D Updated Φ(p, 2)
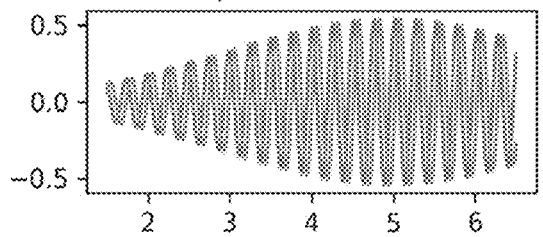
FIG.33E Updated Ψ(x, 2)
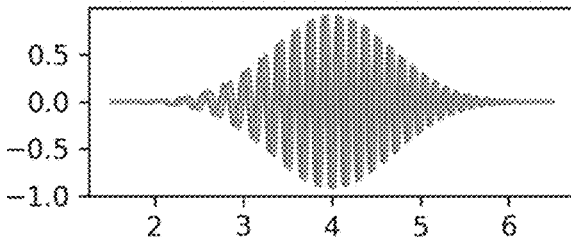
FIG.34A Original Ψ(x, 2)
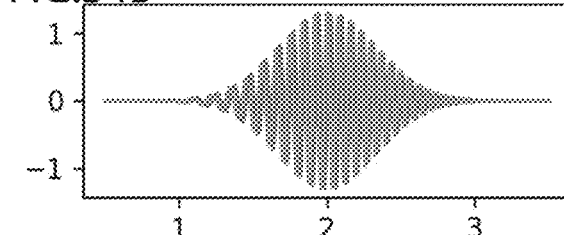
FIG.34B Original Φ(p, 2)
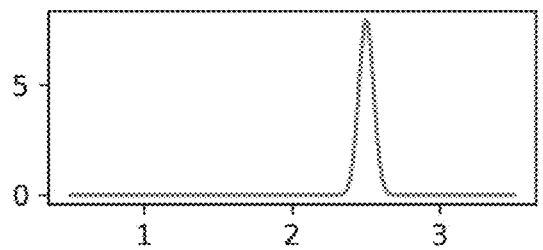
FIG.34C Observed Momentum Prob
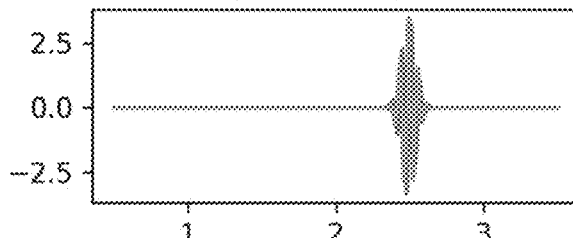
FIG.34D Updated Φ(p, 2)
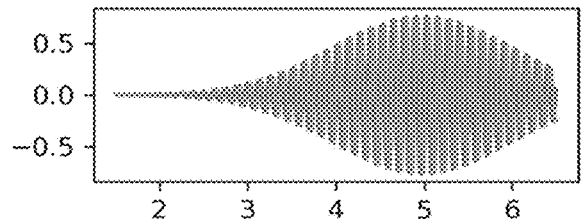
FIG.34E Updated Ψ(x, 2)

Original Ψ(x, 2)

Original Φ(p, 2)

Observed Position Prob

Updated Φ(p, 2)

Updated Ψ(x, 2)

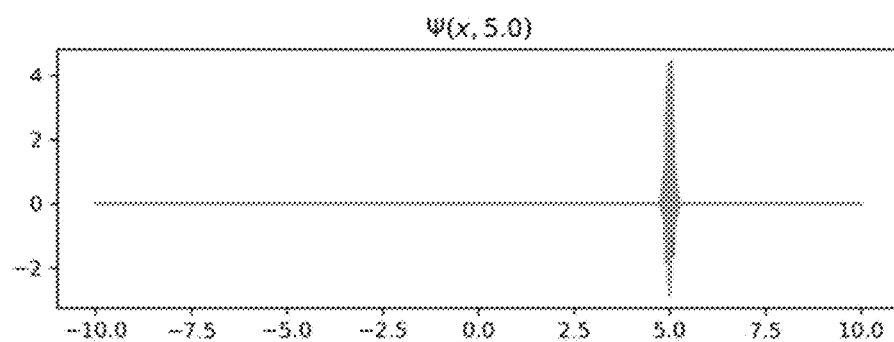
FIG. 42E
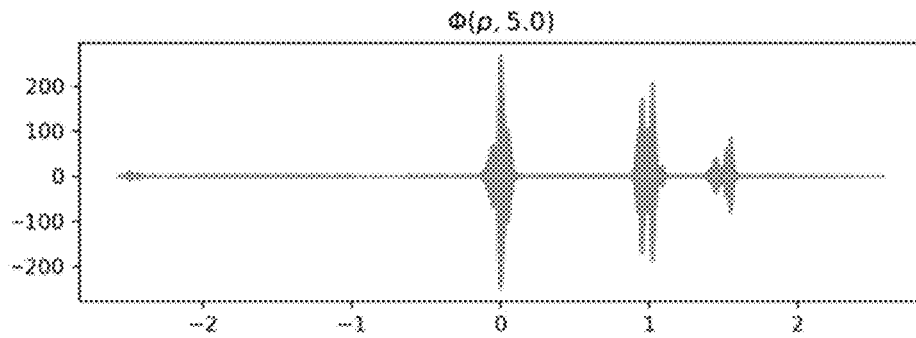
FIG. 42F
FIG. 43
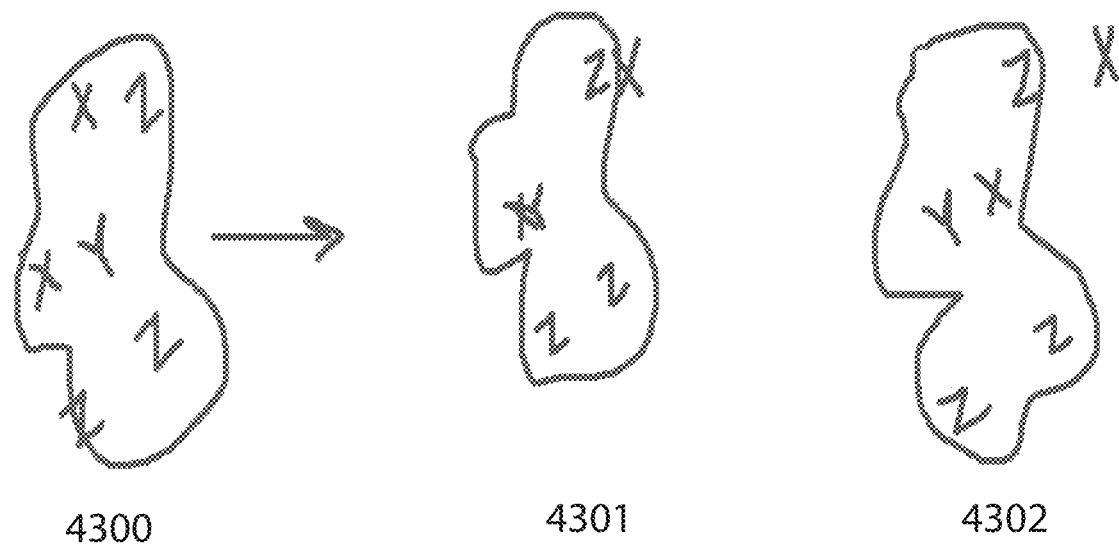

ROBOTIC FIRE EXTINGUISHER

CROSS-REFERENCE TO RELATED APPLICATIONS

This application is a Continuation of U.S. Non-Provisional patent application Ser. No. 16/534,898, filed Aug. 7, 2019, which is a Continuation-in-Part of U.S. patent application Ser. No. 15/498,382, filed Apr. 26, 2017, which claims the benefit of U.S. Provisional Patent Application No. 62/317,037, filed Apr. 1, 2016, each of which is hereby incorporated by reference. U.S. Non-Provisional patent application Ser. No. 16/534,898 is also a Continuation-in-Part of U.S. patent application Ser. No. 15/955,480, filed Apr. 17, 2018, which is a Continuation-in-Part of U.S. patent application Ser. No. 15/425,130, filed Feb. 6, 2017, which claims the benefit of U.S. Provisional Patent Application No. 62/299,701, filed Feb. 25, 2016, each of which is hereby incorporated by reference. U.S. Non-Provisional patent application Ser. No. 16/534,898 is also a Continuation-in-Part of U.S. patent application Ser. No. 15/447,450, filed Mar. 2, 2017, which claims the benefit of U.S. Provisional Patent Application No. 62/302,934, filed Mar. 3, 2016, each of which is hereby incorporated by reference.

U.S. Non-Provisional patent application Ser. No. 16/534,898 claims the benefit of Provisional Patent Application Nos. 62/746,688, filed Oct. 17, 2018, 62/740,573, filed Oct. 3, 2018, 62/740,580, filed Oct. 3, 2018, 62/720,478, filed Aug. 21, 2018, 62/720,521, filed Aug. 21, 2018, 62/735,137, filed Sep. 23, 2018, 62/740,558, filed Oct. 3, 2018, and 62/748,943, filed Oct. 22, 2018, each of which is hereby incorporated by reference.

In this patent, certain U.S. patents, U.S. patent applications, or other materials (e.g., articles) have been incorporated by reference. Specifically, U.S. Patent Application Nos. 62/746,688, 62/740,573, 62/740,580, 62/720,478, 62/720,521, 62/735,137, 62/740,558, 62/748,943, Ser. Nos. 15/272,752, 15/949,708, 16/277,991, 16/048,179, 16/048,185, 16/163,541, 16/163,562, 16/163,508, 16/185,000, 16/041,286, 16/422,234, 15/406,890, 14/673,633, 15/676,888, 16/163,530, 16/297,508, 15/955,480, 15/425,130, 15/955,344, 15/243,783, 15/954,335, 15/954,410, 15/257,798, 15/674,310, 15/224,442, 15/683,255, 14/817,952, 15/619,449, 16/198,393, 15/444,966, 15/447,450, 15/447,623, 15/951,096, 16/270,489, 16/239,410, 16/353,019, 15/447,122, 16/393,921, 16/389,797, 15/706,523, 16/241,436, 15/377,674, 16/427,317, 15/048,827, 15/981,643, 15/986,670, 16/130,880, and 14/948,620, are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to autonomous robotic devices.

BACKGROUND

In most industrial, residential, and commercial settings, stationary fire extinguishers are placed at strategic points for users to access in the event of a fire. Generally, fire extinguishers are positioned at central locations that are easily accessible from the majority of areas of a building. However, in placing fire extinguishers thusly, there will inherently be locations that are disadvantaged by being further from a fire extinguisher relative to other locations within the building. One solution may be to place more fire extinguishers throughout a building, however this solution may be too costly for most circumstances. Furthermore, the locations in which fires may occur within a building may not be predicted, so one cannot solve the problem simply by placing fire extinguishers at strategic locations. A need exists for a method for providing fire extinguishers where they are needed during the time of an actual fire.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some embodiments provide a robotic device, including: a chassis; a set of wheels coupled to the chassis; a battery; a plurality of sensors; a processor; a tangible, non-transitory, machine readable medium storing instructions that when executed by the processor effectuates operations including: capturing, with at least one sensor disposed on the robotic device, data of an environment of the robotic device and data indicative of movement of the robotic device; generating or updating, with the processor, a map of the environment based on at least a portion of the captured data; and generating or updating, with the processor, a movement path of the robotic device based on at least the map, wherein at least a portion of the movement path comprises a repetitive iteration of: actuating, with the processor of the robot, the robot to traverse a first linear segment; actuating, with the processor of the robot, the robot to rotate 180 degrees in a first rotation, wherein the first rotation comprises traversing a first distance in a direction perpendicular to the first linear segment after starting the first rotation and before finishing the first rotation; actuating, with the processor of the robot, the robot to traverse a second linear segment; and actuating, with the processor of the robot, the robot to rotate 180 degrees in a second rotation, wherein the second rotation comprises traversing a second distance in a direction perpendicular to the second linear segment after starting the second rotation and before finishing the second rotation.

Some embodiments provide a tangible, non-transitory, machine readable medium storing instructions that when executed by a processor of a robotic device effectuates operations including: capturing, with at least one sensor disposed on the robotic device, data of an environment of the robotic device and data indicative of movement of the robotic device; generating or updating, with the processor, a map of the environment based on at least a portion of the captured data; and generating or updating, with the processor, a movement path of the robotic device based on at least the map, wherein at least a portion of the movement path comprises a repetitive iteration of: actuating, with the processor of the robot, the robot to traverse a first linear segment; actuating, with the processor of the robot, the robot to rotate 180 degrees in a first rotation, wherein the first rotation comprises traversing a first distance in a direction perpendicular to the first linear segment after starting the first rotation and before finishing the first rotation; actuating, with the processor of the robot, the robot to traverse a second linear segment; and actuating, with the processor of the robot, the robot to rotate 180 degrees in a second rotation, wherein the second rotation comprises traversing a second distance in a direction perpendicular to the second linear segment after starting the second rotation and before finishing the second rotation.

Some embodiments include a method for operating a robotic device, including: capturing, with at least one sensor disposed on the robotic device, data of an environment of the robotic device and data indicative of movement of the robotic device; generating or updating, with a processor of the robotic device, a map of the environment based on at least a portion of the captured data; and generating or updating, with the processor, a movement path of the robotic device based on at least the map, wherein at least a portion of the movement path comprises a repetitive iteration of: actuating, with the processor of the robot, the robot to traverse a first linear segment; actuating, with the processor of the robot, the robot to rotate 180 degrees in a first rotation, wherein the first rotation comprises traversing a first distance in a direction perpendicular to the first linear segment after starting the first rotation and before finishing the first rotation; actuating, with the processor of the robot, the robot to traverse a second linear segment; and actuating, with the processor of the robot, the robot to rotate 180 degrees in a second rotation, wherein the second rotation comprises traversing a second distance in a direction perpendicular to the second linear segment after starting the second rotation and before finishing the second rotation

BRIEF DESCRIPTION OF DRAWINGS

FIG. 23 illustrates an example of an updated probability density after observing Wi-Fi strength, according to some embodiments.

FIG. 24 illustrates an example of a wall distance map, according to some embodiments.

FIGS. 33A-33E illustrate an example of evolution of a wave function in a position and momentum space with observed momentum, according to some embodiments.

FIGS. 34A-34E illustrate an example of evolution of a wave function in a position and momentum space with observed momentum, according to some embodiments.

FIGS. 40A, 40B, 41A-41H, and 42A-42F illustrate an example of a wave function of a state of a robotic device after observations, according to some embodiments.

FIG. 43 illustrates an example of an evolution of an ensemble, according to some embodiments.

DETAILED DESCRIPTION OF SOME EMBODIMENTS

Figure 1:
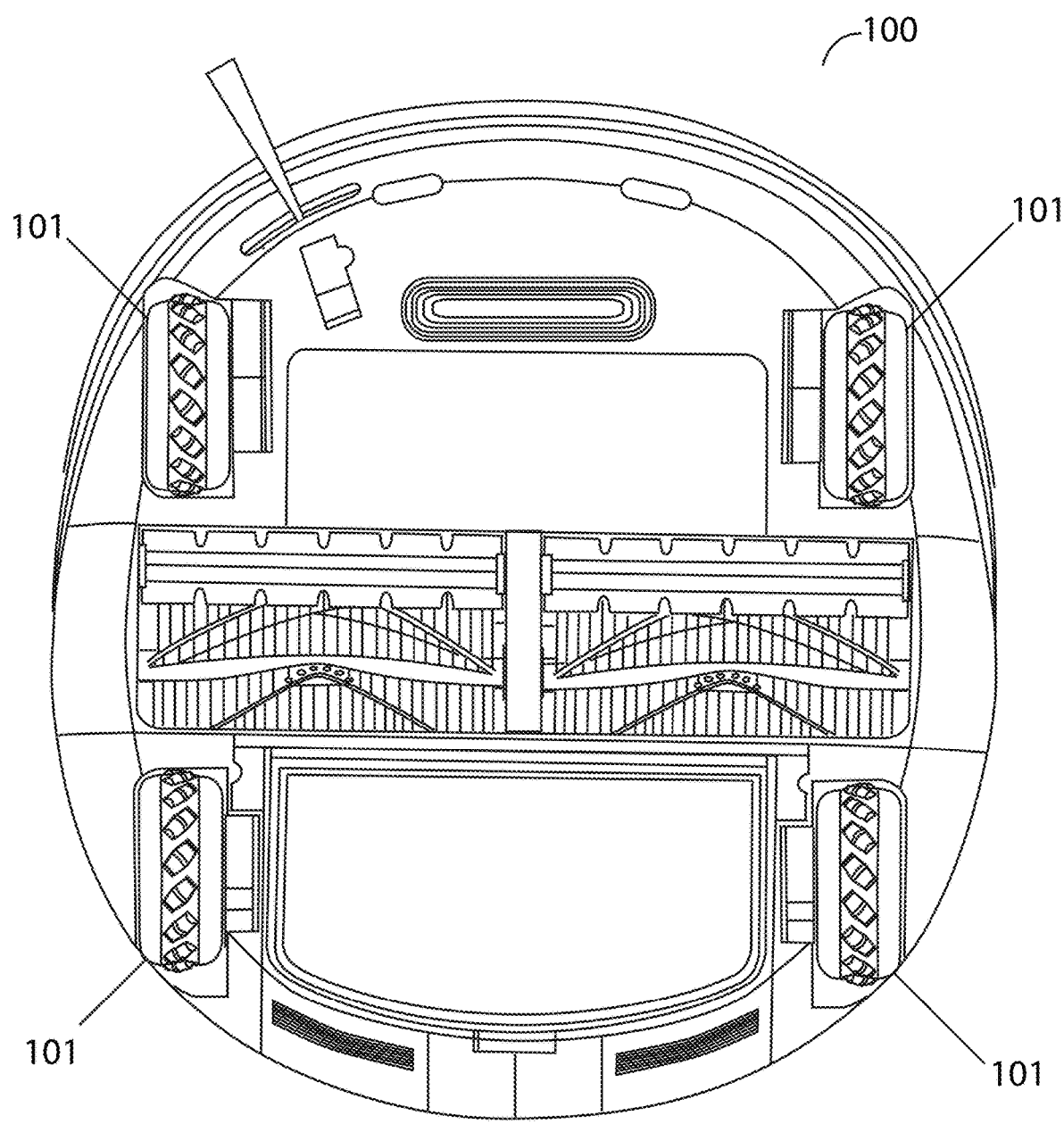
FIG. 1 illustrates a bottom plan view of a robotic device with mecanum wheels, according to some embodiments.

The present techniques will now be described in detail with reference to a few embodiments thereof as illustrated in the accompanying drawings. In the following description, numerous specific details are set forth in order to provide a thorough understanding. It will be apparent, however, to one skilled in the art, that the present techniques may be practiced without some or all of these specific details. In other instances, well known process steps and/or structures have not been described in detail in order to not unnecessarily obscure the present techniques. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

In some embodiments, a robotic fire extinguisher may include one or more autonomous or semi-autonomous robotic devices having communication, mobility, actuation and/or processing elements. In some embodiments, a robotic device includes a vehicle, such as a car or truck, with an electric motor. For example, the robotic fire extinguisher may include an electric vehicle fire truck with an electric motor. In some embodiments, a vehicle, such as a car or truck, with an electric motor includes a robot. For example, an electric vehicle fire truck with an electric motor may include a robotic fire extinguisher powered by an electric motor. In some embodiments, a robotic fire extinguisher may include, but is not limited to include, one or more of a casing, a chassis including a set of wheels, a motor to drive the wheels, a receiver that acquires signals transmitted from, for example, a transmitting beacon, a transmitter for transmitting signals, a processor, a memory, a controller, tactile sensors, obstacle sensors, a mapping and localization system, network or wireless communications, radio frequency communications, power management such as a rechargeable battery, one or more clock or synchronizing devices, temperature sensors, imaging sensors, one or more fire extinguishing means (e.g., fire extinguisher, water tank and hose, etc.). The processor may, for example, receive and process data from internal or external sensors, execute commands based on data received, control motors such as wheel motors, map the environment, localize the robot, and determine movement paths. In some embodiments, at least a portion of the sensors of the robotic fire extinguisher are provided in a sensor array, wherein the at least a portion of sensors are coupled to a flexible, semi-flexible, or rigid frame. In some embodiments, the frame is fixed to a chassis or casing of the robotic fire extinguisher. In some embodiments, the sensors are positioned along the frame such that the field of view of the robot is maximized while the cross-talk or interference between sensors is minimized. In some cases, a component may be placed between adjacent sensors to minimize cross-talk or interference. Further details of a sensor array are described in U.S. Patent Application No. 62/720,478, the entire contents of which is hereby incorporated by reference.

In some embodiments, the wheels of the robotic fire extinguisher include a wheel suspension system. An example of a dual wheel suspension system is described in U.S. patent application Ser. Nos. 15/951,096 and 16/270,489, the entire contents of which are hereby incorporated by reference. Other examples of wheel suspension systems that may be used are described in U.S. Patent Application No. 62/720,521, and Ser. No. 16/389,797, the entire contents of which are hereby incorporated by reference. In some embodiments, the different wheel suspension systems may be used independently or in combination.

Figure 2:
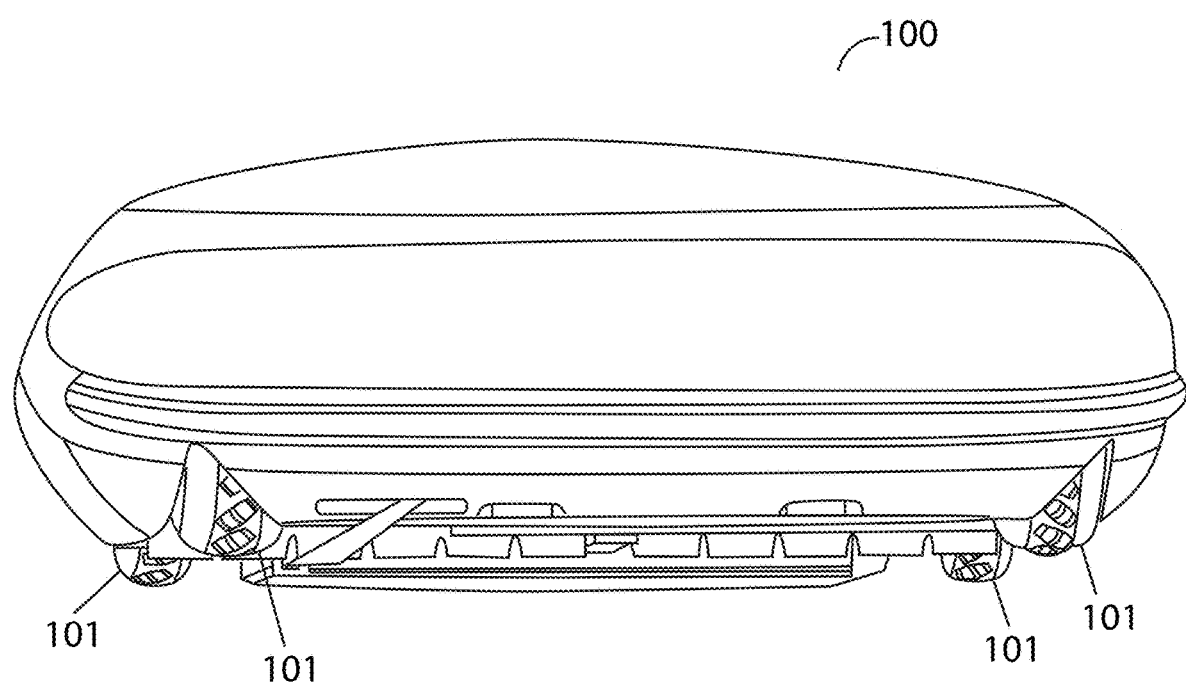
FIG. 2 illustrates a front view of a robotic device with mecanum wheels, according to some embodiments.

In some embodiments, the wheels of the robotic fire extinguisher are expandable mecanum wheels, as described in U.S. patent application Ser. Nos. 15/441,966 and 15/447,623, the entire contents of which are hereby incorporated by reference. For example, FIG. 1 illustrates a bottom plan view of a robotic device 100 with mecanum wheels 101. FIG. 2 illustrates a front view of the robotic device 100 with mecanum wheels 101 to which components for extinguishing a fire may be coupled. The robotic device may travel diagonally by turning a front wheel and opposite rear wheel at a first speed while turning the other wheels at a second speed, different from the first. Turning all four wheels in the same direction causes the device to move in a straight direction. Turning the wheels on either side of the device in opposite directions causes the device to rotate. Turning the wheels on one diagonal in the opposite direction to those on the other diagonal causes sideways movement.

Figure 3:
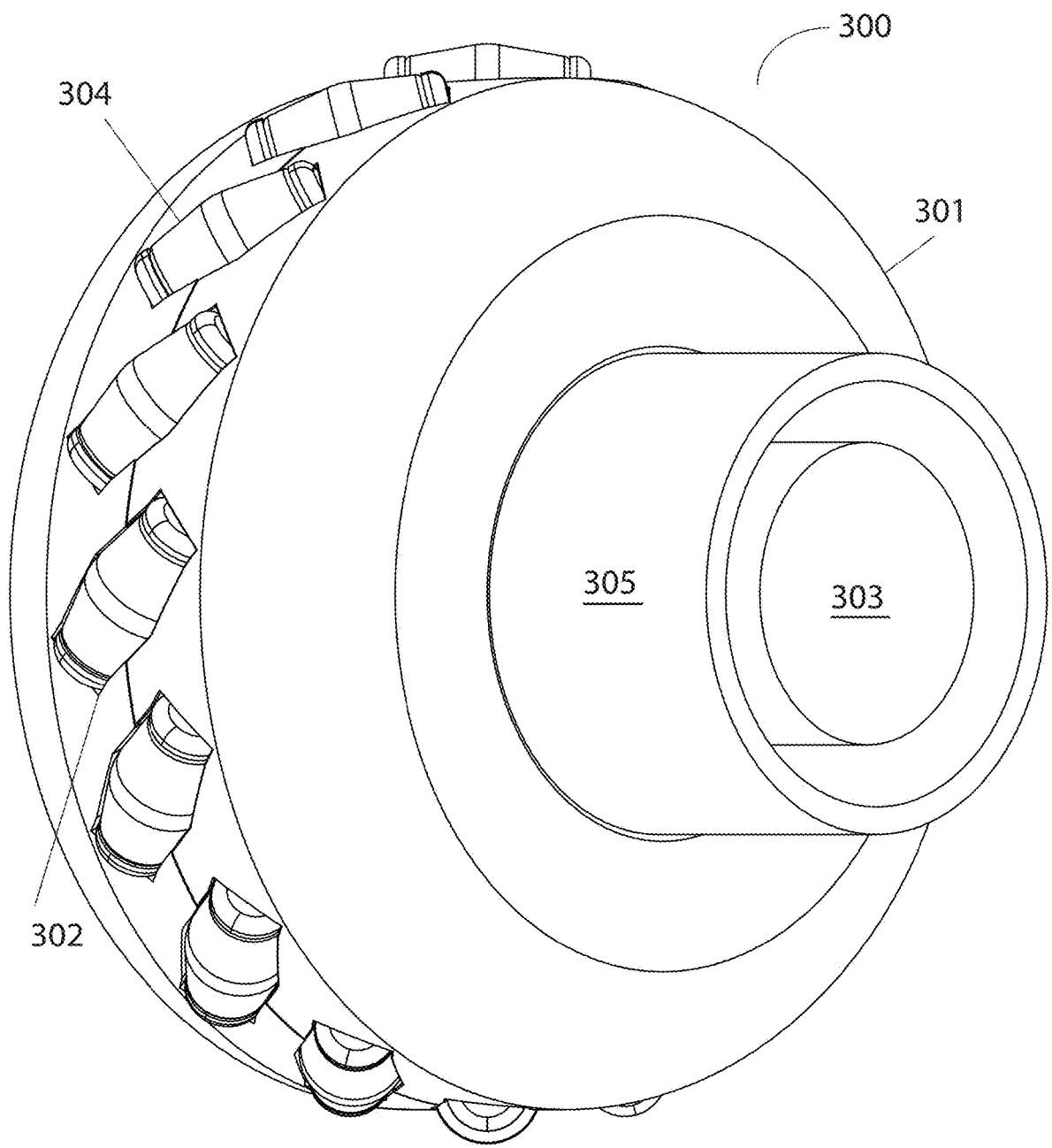
FIG. 3 illustrates a perspective view of an expandable mecanum wheel in a contracted position, according to some embodiments.
Figure 4:
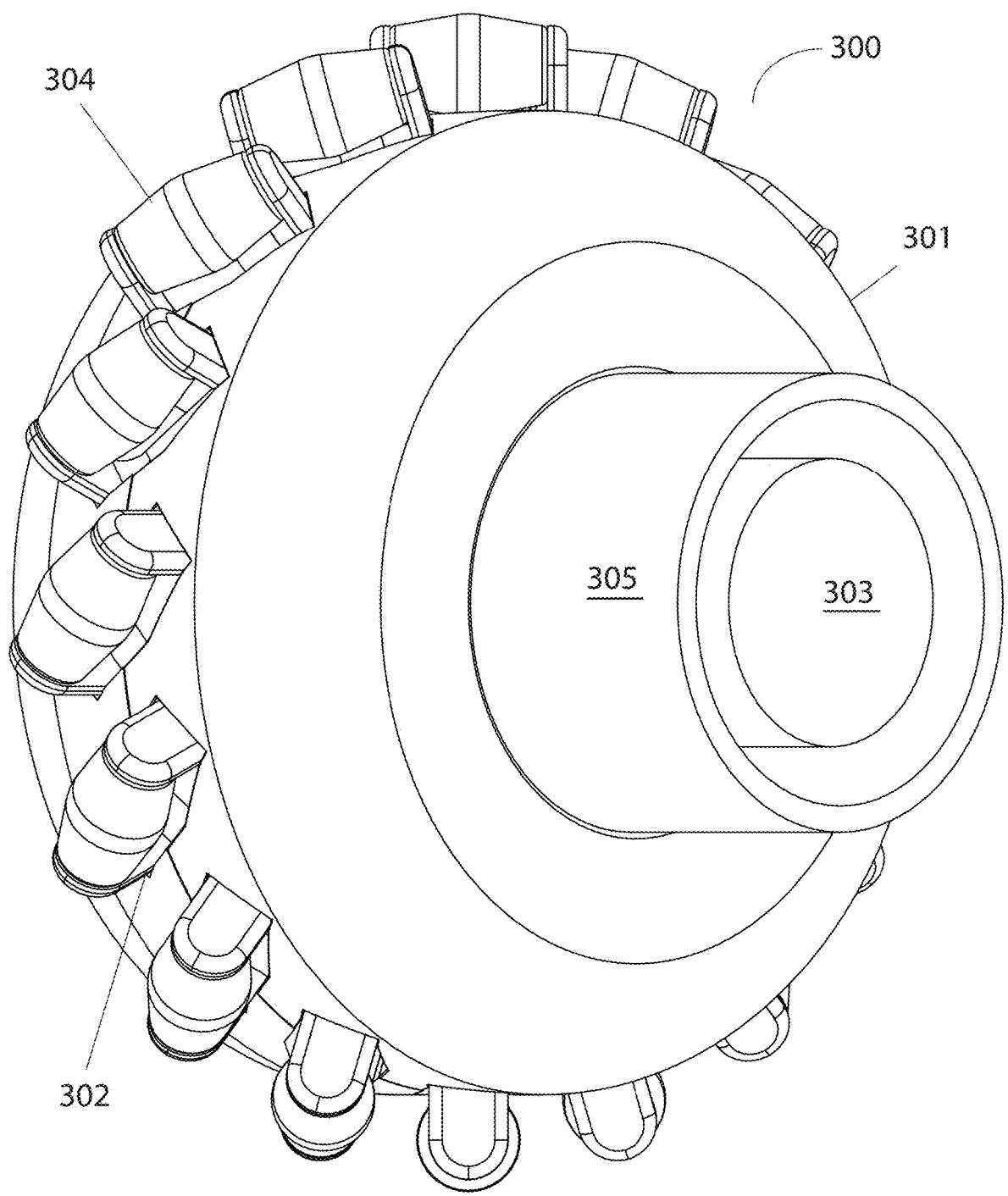
FIG. 4 illustrates a perspective view of an expandable mecanum wheel in an expanded position, according to some embodiments.

In some embodiments, the wheels of the device are also expandable. FIG. 3 illustrates an expandable mecanum wheel 300 in a contracted position. In some embodiments, the expandable wheel includes an outer housing 301 with a plurality of apertures 302 therein, an inner shaft 303 co-centered and positioned within the an outer shaft 305 coupled to the outer housing 301, a plurality of spokes (not shown) mounted pivotally by a first end to the inner shaft, a pivoting linkage (not shown) connected to a second end of the spoke, and a roller 304 mounted at the distal end of the pivoting linkage so as to be rotatable around an axial of the roller. The inner shaft is positioned within the outer housing in a manner such that it can rotate independently and relative to the outer housing and coupled outer shaft. The inner shaft can be rotated relative to the outer housing and coupled outer shaft, causing the wheel to move from a first position (shown in FIG. 3) in which the linkages and rollers protrude minimally through their corresponding apertures to a second position in which the linkages and rollers protrude maximally through their corresponding apertures. The rollers form the circumference of the wheel, which is smallest in the fully contracted position and largest in the fully expanded position. The outer shaft coupled to the outer housing can rotate independently and relative to the inner shaft to rotate the expandable mecanum wheel once positioned at a desired circumference, causing the robot to move. When the inner shaft is caused to rotate relative to the outer shaft and housing, the spokes together with the pivoting linkages work as a crank mechanism and translate the relative rotation of the inner shaft to a linear movement of the roller radially outward from the center of the wheel, the aperture working as a guide. FIG. 4 illustrates the wheel 300 in the expanded position. The inner shaft 303 has been rotated relative to the outer housing 301 and coupled outer shaft 305, causing the spokes (not illustrated) to move radially outward from the center of the wheel, the apertures 302 guiding the pivoting linkages and rollers 304. The rollers 304 are thus pushed outward from the center of the wheel and form a circumference larger than the circumference formed when the wheel is in the contracted position shown in FIG. 3.

Figure 5:
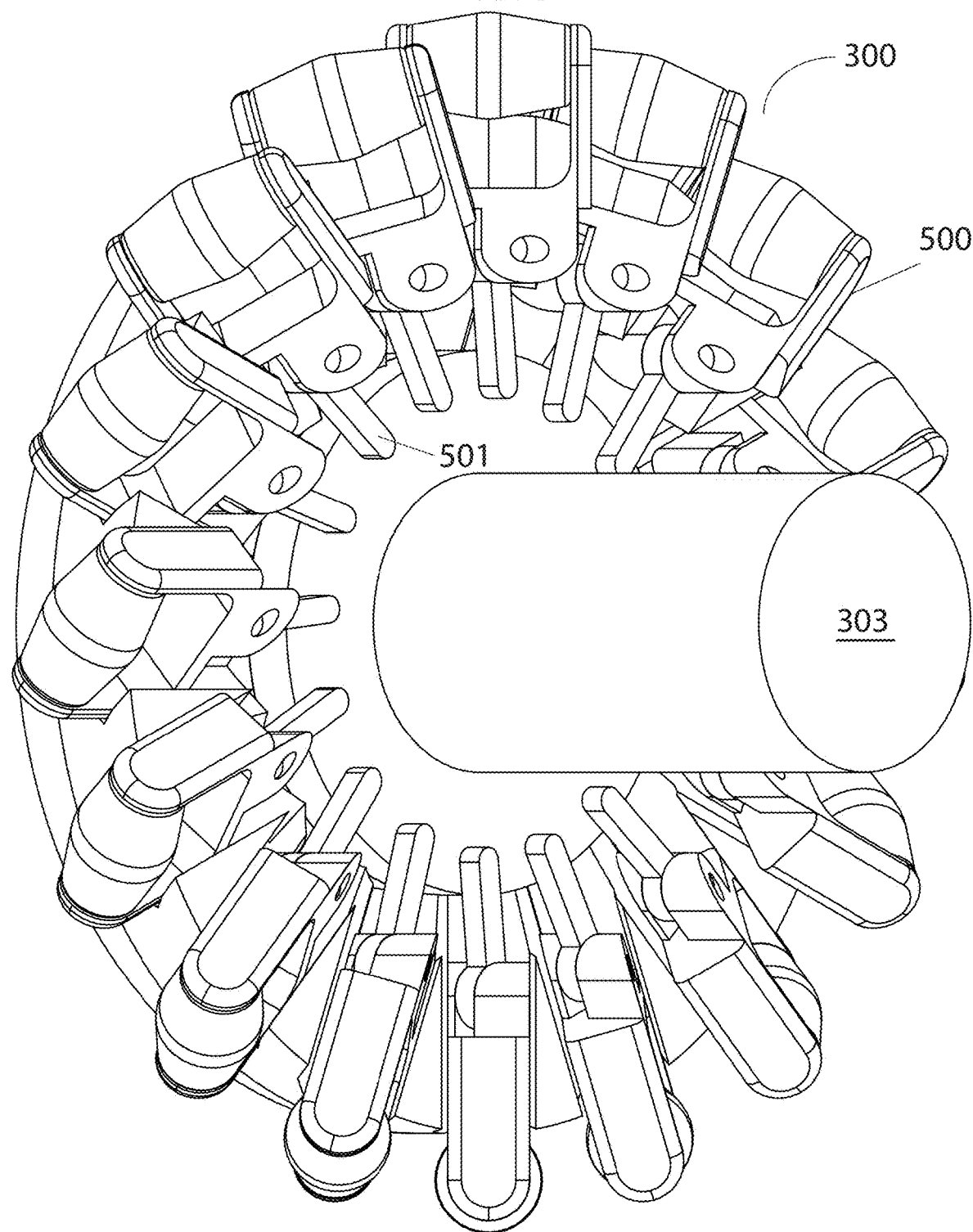
FIG. 5 illustrates a cutaway view of an expandable mecanum wheel, according to some embodiments.
Figure 6:
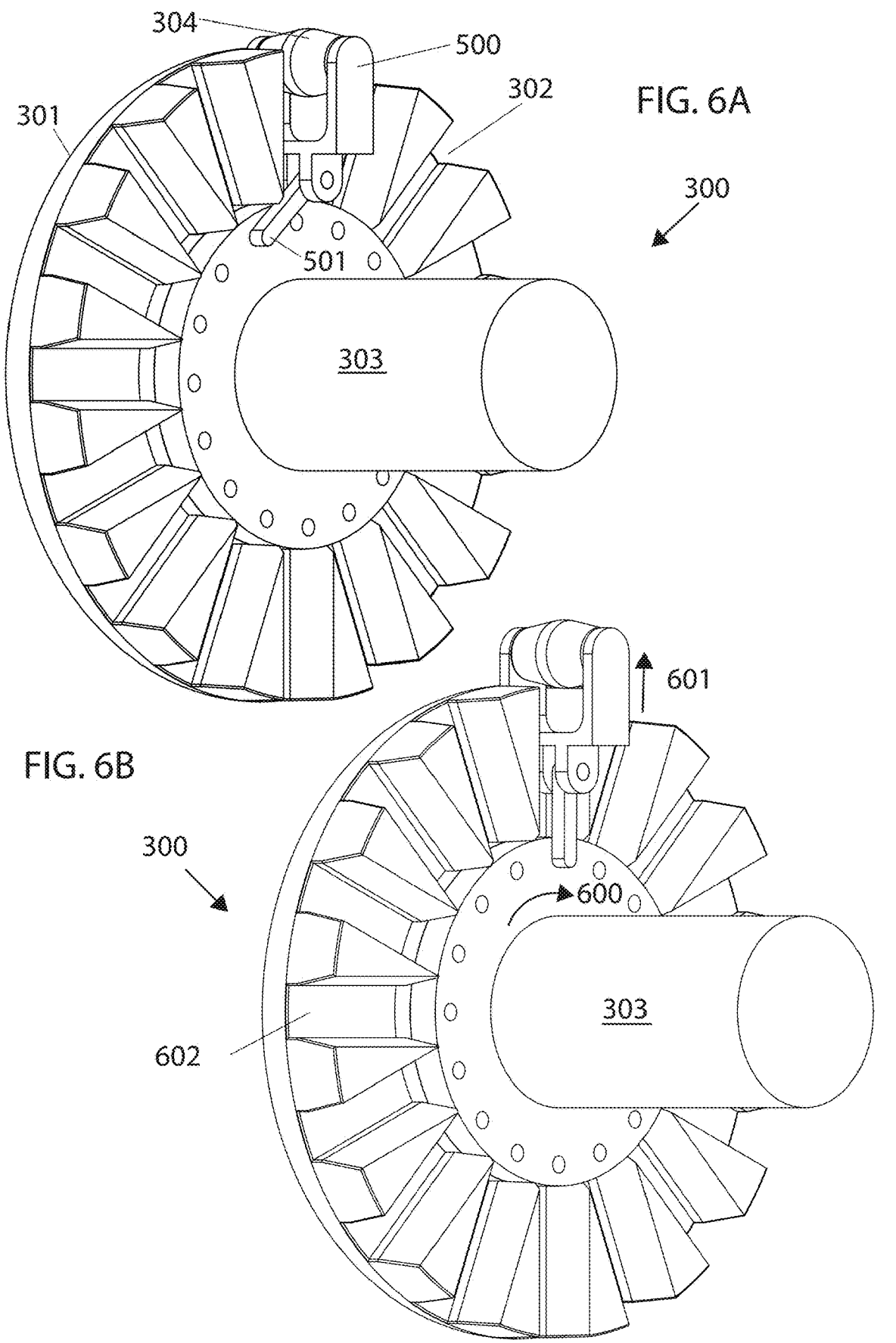
FIG. 6A illustrates a cutaway view of an expandable mecanum wheel in a contracted position, according to some embodiments.
FIG. 6B illustrates a cutaway of an expandable mecanum wheel in an expanded position, according to some embodiments.

FIG. 5 illustrates a cutaway view of the expandable mecanum wheel 300. Spokes 501 are connected to the inner shaft 303 and to the pivoting linkages 500. FIGS. 6A and 6B illustrate cutaway views of the wheel 300. In both drawings, a singular spoke, linkage, and roller is illustrated in order to portray the parts more clearly, however, in practice, for each aperture 302, there would be a corresponding spoke, linkage and roller. FIG. 6A illustrates the spoke 501, linkage 500, and roller 304 in a contracted position. The spoke 501 is mounted pivotally by a first end to an inner shaft 303, which is co-centered and positioned within the outer housing 301 and coupled outer shaft (not shown). As shown in FIG. 6B, rotation of the inner shaft in direction 600 results in each spoke, linkage, and roller group to be extended in a radially outward direction 601. When the inner shaft 303 is rotated in a direction 600, until a point where each spoke is parallel with a radius of the inner shaft 303, the linkage and roller are pushed at a maximal distance from the center of the wheel, creating a larger circumference. Expansion of the wheels increases the distance of the robotic device from the floor and thus facilitates movement across different surfaces and obstacles. Sleeve 602 fits over the aperture structures of outer housing 301 to protect apertures 302 from wear. In some embodiments, a sleeve is provided around the aperture to limit the wear of the link member and to provide better support for the link member as a guide.

In some embodiments, the wheel includes a means for rotating the inner shaft and the outer shaft. In some embodiments, separate motors are used to rotate the inner shaft and the outer shaft. In some embodiments, a single means for rotation of the inner shaft and outer shaft may be used. In some embodiments, means for rotation of inner shaft and/or outer shaft may be electrical (e.g., electrical motor) or mechanical (e.g., expansion and retraction of the wheel using a crank). Rotation of the inner shaft increases or decreases the circumference of the wheel by extension and retraction of the rollers. Rotation of the outer shaft rotates the expandable mecanum wheel, causing the robot to move.

In some embodiments, the processor of the robot determines when the mecanum wheels should be expanded or retracted based on sensor data collected by one or more sensors. For example, data of a sensor monitoring tension on the wheels may be used to determine when to expand the wheel, when, for example, more than a predetermined amount of tension is detected. Similarly, data of a sensor monitoring rate of rotation of a wheel may be used to determine when expand the wheel, when, for example, it is determined that rotation is not concurrent with motor power. It will be obvious to one skilled in the art that the disclosed invention can benefit from any kind of sensing mechanism to detect tension etc.

In some embodiments, one or more wheels of the robotic fire extinguisher are driven by one or more electric motors. For example, a wheel may include a main wheel gear that may be driven by one or more output gears of one or more corresponding electric motors interfacing with the wheel gear. The processor of the robotic fire extinguisher may autonomously activate each of the one or more output gears independently of one another depending on the amount of torque required. For example, the processor may detect an obstacle on the driving surface and may activate all electric motors of the output gears as a large amount of torque may be required to overcome the obstacle. Output gears may rotate when deactivated. In other embodiments, any number of output gears interfacing with the wheel gear may be used. In some embodiments, a brushless DC wheel motor may be positioned within a wheel of the robotic fire extinguisher. For example, the wheel with motor may include a rotor with magnets, a bearing, a stator with coil sets, an axle and tire each attached to rotor. Each coil set may include three separate coils, the three separate coils within each coil set being every third coil. The rotor acts as a permanent magnet. DC current is applied to a first set of coils causing the coils to energize and become an electromagnet. Due to the force interaction between the permanent magnet (i.e., the rotor) and the electromagnet (i.e., the first set of coils of the stator), the opposite poles of the rotor and stator are attracted to each other, causing the rotor to rotate towards the first set of coils. As the opposite poles of the rotor approach the first set of coils, the second set of coils are energized and so on, and so forth, causing the rotor to continuously rotate due to the magnetic attraction. Once the rotor is about to reach the first coil set a second time, the first coil set is energized again but with opposite polarity as the rotor has rotated 180 degrees. In some embodiments, two set of coils are energized simultaneously to increase the torque. In some embodiments, the processor uses data of a wheel sensor (e.g., halls effect sensor) to determine the position of the rotor, and based on the position determines which pairs of coils to energize.

In some embodiments, the robotic fire extinguisher may be an electric vehicle fire truck. In some embodiments, the electric vehicle fire truck may include the same components described above for the robotic fire extinguisher. In some embodiments, the electric vehicle fire truck autonomously responds to a fire detected by an alarm system. In some embodiments, the alarm system is wirelessly connected with the processor of the electric vehicle fire truck and may transmit a signal to the processor upon detecting a fire at a particular location. In some embodiments, the processor is connected with multiple alarm systems in different locations. In some embodiments, the electric vehicle fire truck navigates to a location of a sensor of the alarm system that first detected the fire. In some embodiments, the electric vehicle fire truck autonomously extinguishes the fire. In some embodiments, a user uses components of the electric vehicle fire truck to extinguish or manage the fire. In some embodiments, a control system connected with various alarm systems within the environment manages one or more electric vehicle fire trucks and determines which electric vehicle fire truck responds to each particular alarm. An example of a control system for managing one or more robotic devices is described in U.S. patent application Ser. No. 16/130,880, the entire contents of which is hereby incorporated by reference. In some embodiments, a follower electric vehicle fire truck follows a leading electric vehicle fire truck to a fire using methods such as those described in U.S. patent application Ser. No. 14/948,620, the entire contents of which is hereby incorporated by reference. In some embodiments, processors of multiple electric vehicle fire trucks collaborate and share intelligence to collectively determine the actions of each electric vehicle fire truck that may maximize their efficiency as a group. Examples of methods for collaborative intelligence of robotic devices are described in U.S. patent application Ser. Nos. 15/048,827, 15/981,643 and 15/986,670, the entire contents of which are hereby incorporated by reference.

For example, some embodiments describe a method for collaborative intelligence of artificial intelligence (AI) agents. Some embodiments describe a method for communication, exchange of information, sharing of situational awareness, and delegation and distribution of different tasks between actuated and non-actuated AI agents. In some embodiments, AI agents may learn from each other or share information in real time during operation and/or while offline and/or while some AI agents are offline and others are online. In some embodiments, AI agents may connect through wired or wireless networking technologies and may use different security measures to protect their connection and communication contents. In some cases, the AI agents described herein may be actuated robots that may physically move and perform actions or non-actuated static computer based AI units. In some embodiments, AI agents may be equipped with sensors and an operating system software to monitor hardware subsystems. In some embodiments, AI agents may have different functionalities, manage security, analyze and share data and tasks, and resolve probable disputes between other AI peers. In some embodiments, a control system of an AI agent may track other AI agents within their vicinity, including information on the model, type, functionality, capability, role, operating system, security privileges, and approximate proximity (i.e., distance) of the other AI agents.

In some embodiments, control systems of AI agents employ collaborative intelligence and artificial intelligence. In some embodiments, collaborative intelligence may include AI agents learning from one another and artificial intelligence may include the control system of an AI agent learning from the environment (e.g., user feedback). For instance, a home control unit (e.g., voice assistant, home assistant, etc.) capable of learning preferences of a user (e.g. home temperature, music genre and schedule, cleaning schedule, alarm setting, etc.) from their actions over time is an example of artificial intelligence. Based on the preferences of the user learned over time, the control system of the home control unit may therefore, play a specific genre of music or set the shower to a specific temperature. If a second home control unit was introduced into the home, the control system of the first home control unit may share its intelligence with the control system of the second home control unit such that the control system of the second home control unit may learn the preferences of the user from the control system of the first home control unit, which may be considered collaborative intelligence. In some embodiments, the control system of each AI agent operating within the environment may learn from the environment (e.g., user feedback) and in some embodiments, may share their learned intelligence with the control systems of other AI agents to complete tasks more efficiently. For example, the control system of the second home control unit may learn from the control system of the first home control unit that the user prefers playing jazz music in the evening while the control system of the first home control unit may learn from the control system of the second home control unit what time the user prefers to wake up. In some embodiments, the control systems of AI agents may autonomously split tasks. For example, the control system of one home control unit may control home temperature while the control system of the other home control unit may control lighting in the home. In another example, a control system of a first surface cleaning robot shares its intelligence with a control system of a second surface cleaning robot and vice versa. In particular, the control system of the first surface cleaning robot may share with the control system of the second surface cleaning robot that the user likes the house cleaned at 8:00 AM and may learn from the control system of the second surface cleaning robot that its user prefers the house cleaned at 8:00 PM. By sharing such intelligence, both robots may autonomously collaborate with one another to schedule cleaning and determine, for example, cleaning location, cleaning time, and task allocation of each robot. In this way, multiple AI agents may collaborate to complete tasks by making decisions themselves without requiring user input to control their actions. In one example, the control system of a first robot learns that user A prefers a home temperature of 75° F. while the control system of a second robot learns that a user B prefers the home temperate at 73° F. The control systems of the robots may autonomously share intelligence and collaborate and may infer based on shared intelligence that a home temperature of 74° F. is best when both users are present and to set the temperature to the preferred temperature of each individual user when they are only present. In some instances, a user may choose AI agent settings. For example, control systems of two cleaning robots introduced into a same environment and with separate user preferences stored may share their respective stored user preferences with one another, however, a user may choose the new preferences if preferences chosen by the collaborating robots are not desired. The control systems of the robots may then learn the new user preferences for the future. In some embodiments, the control system of the robots may store the shared information and the user may choose preferences or settings. For example, a user of a first robotic cleaner may prefer that the robotic vacuum clean at 8:00 AM while a user of a second robotic cleaner, introduced into a same house, may prefer the robotic cleaner to clean at 8:00 PM. The control systems of the robots may share the cleaning preferences of their respective users with one another and may store the information online. A user may select a preferred time for cleaning by the robotic cleaners if the user does not want the robotic cleaners to clean the house more than once a day. The user may select that the robotic cleaners only clean at 8:00 AM or 8:00 PM rather than twice a day. The control systems of the robots may store this information and may share it as a user preference in the future. In some embodiments, information may be stored online, such as on the cloud, or may be stored on an external device.

In some embodiments, a control system of an AI agent may make inferences from shared intelligence. For instance, a control system of a robotic coffee machine may learn that a user typically gets home from a jog every morning at 5:00 AM and to therefore brew a cup of the coffee preferred by the user at 5:00 AM. If one day at 4:45 AM the control system of a collaborating robotic vacuum cleaner detects the front door opening, it may share this data with the control system of the robotic coffee machine and the control system of the robotic coffee machine may infer that the user is home early from their jog and may therefor brew a cup of coffee earlier than usual. In another example, the control system of a robotic tooth brush may collaborate with the control system of a robotic coffee maker, such that operation of the robotic tooth brush in the morning may be shared with the control system of the robotic coffee maker. The robotic coffee maker may therefore infer the user is awake and brew a cup of the preferred coffee of the user before the user reaches the kitchen. If there are two users within the home, the control system of the robotic coffee machine may infer the user based on probabilities and statistics of information in order to maximize comfort without wasting energy. For instance, if the control system of the robotic coffee machine infers both users are awake it may brew a medium roast in order to appease both users if one prefers light roast and the other dark roast.

In some embodiments, control systems of AI agents may collect and share data of multiple users to learn to make decisions benefiting all present users. For example, if two users prefer a robot to clean at 8:00 AM but one prefers mopping while the other prefers sweeping, the control system of the robot may decide to clean at 8:00 AM using both cleaning functionalities to benefit both users. In another example, an AI system that suggests movies based on learned movie preferences of a user may compile movie preferences of all present users in order to suggest movies that all users may enjoy. In some embodiments, the control system of an AI agent may create group profiles for users. For example, there may be five users living in a same house. An AI system may create user profiles, each having differing levels of preferences for comedy, romance, drama, sci-fi, and thriller movies. Two users may jointly watch a romantic movie and rate the romantic movie a score of 3/5, while the AI system expected a score of 5/5. The AI system may perform a few experiments and instead of adjusting the classification, the AI system may develop a new tree in the user profile hierarchy associating two or more user profiles into a group profile.

In some embodiments, the control system of a AI agent may provide suggestions to a user based on learned preferences of the user. For example, a control system of a robot may combine music preferences of a large group of individuals attending an event and suggest songs to play. In another example, control systems of housekeeping robots working at separate locations of a hotel chain may learn room preferences of an individual that often travels for work and stays within the same hotel chain and may prepare the room for the individual based on statistical information and probabilities from data previously collected or may provide suggestions to the user. For instance, the control system of a robot may decide to turn on a warm shower for the user at 6:15 AM based on previous intelligence on the time the user woke up and the temperature of the shower the user used. Or the control system of the robot may provide the user with a suggestion to set the alarm for 6:15 AM based on previous intelligence on the time the user woke up.

In some embodiments, control systems of AI agents may announce their presence and capabilities to a group of other AI agents within an area. In some embodiments, control systems of AI agents may gather and share information about one other to build a database and enhance their performance within their workplace. In some embodiments, control systems of AI agents may determine which AI agent within the group is best suited for specific tasks based on information shared among the AI agents. In some embodiments, AI agents may execute the tasks they are best suited for. In some embodiments, AI agents may establish a connection by one or more of: broadcasting a signal by a transmitter of a first AI agent, detecting the signal by a receiver of a second AI agent, sending a second AI agent identifier by a transmitter of the second AI agent, receiving the second AI agent identifier by a receiver of the first AI agent, sending confirmation of receipt of the second AI agent identifier and sending a first AI agent identifier by the transmitter of the first AI agent, receiving the first AI agent identifier by the receiver of the second AI agent, sending confirmation of receipt of the first AI agent identifier by the transmitter of the second AI agent, establishing a data transfer channel (DTC) link between the first and second AI agents by a control system of the first AI agent and a control system of the second AI agent, transferring information (e.g., by transmitting signals) between AI agents through the DTC link by the control system of the first AI agent and the control system of the second AI agent and, performing an action by at least one AI agent based on the transferred information. The DTC link may be, for example, a secure wireless connection (e.g. Wi-Fi, Bluetooth, or RF) between the first and second AI agents.

Figure 7:
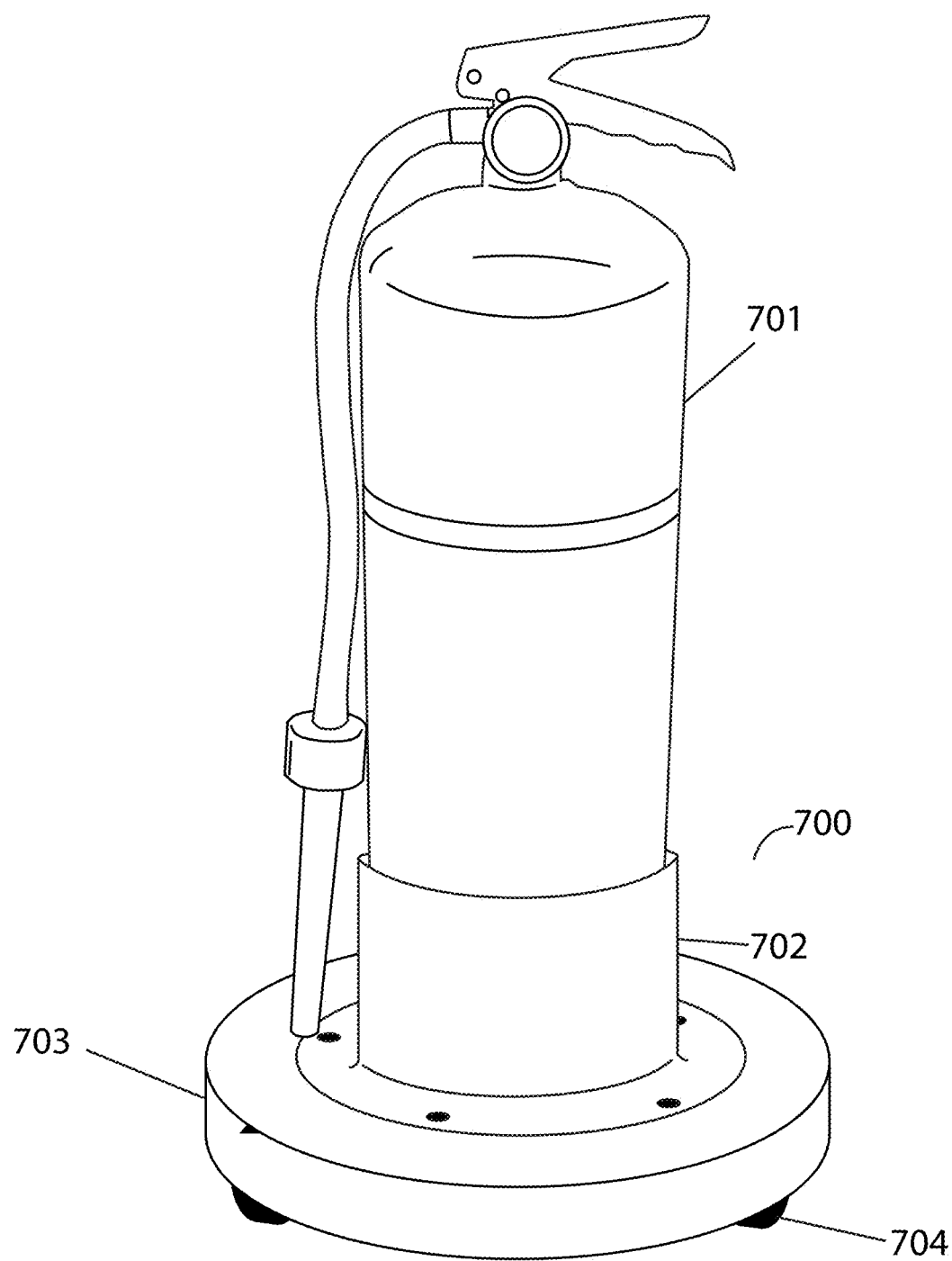
FIG. 7 illustrates a perspective view of an example of a robotic fire extinguisher, according to some embodiments.

In some embodiments, the robotic fire extinguisher may be a delivery robot transporting one or more various components for extinguishing or managing a fire. For example, the delivery robot may transport a fire extinguisher, water tank and hose, fire masks, fire protection garments, heat sensors, a first aid kit, and the like. FIG. 7 illustrates an example of a delivery robot 700 including a holder 702 in which a fire extinguisher 701 is placed for transportation, a base 703, and a set of wheels 704. In some embodiments, the delivery robot 700 includes sensors that collect data for generating a map of the environment and localizing the robot within the environment. In some embodiments, the delivery robot includes components similar to those described above for the robotic fire extinguisher. In some embodiments, the processor of the robotic fire extinguisher receives a signal from a synchronized fire alarm system indicating that a fire has been detected. In some embodiments, the processor extracts the location of a sensor of the fire alarm system that detected the fire. In some embodiments, the processor determines a movement path that leads toward the sensor that first detected the fire and the robotic fire extinguisher drives along or executes the movement path. In some embodiments, one or more infrared heat sensors positioned on the robotic fire extinguisher measure the temperature and may trigger the robotic fire extinguisher to interrupt the movement path if the temperature exceeds a predetermined threshold. In some embodiments, the robotic fire extinguisher may be caused to halt movement if the temperature measured exceeds a predetermined threshold. In some embodiments, the robotic fire extinguisher may be caused to retrace the movement path in an opposite direction if temperature exceeds a predetermined threshold. In some embodiments, a user uses one or more components of the robotic fire extinguisher to extinguish or manage a fire. In some embodiments, the robotic fire extinguisher extinguishes or manages the fire using one or more components. In some embodiments, a user remotely controls the robotic fire extinguisher and remotely extinguishes or manages the fire using one or more components of the robot.

In some embodiments, the robotic fire extinguisher recharges one or more rechargeable batteries at a docking station. Examples of a docking station are described in U.S. patent application Ser. Nos. 15/706,523, 16/241,436, and 15/377,674, the entire contents of which are hereby incorporated by reference.

In some embodiments, the processor of the robotic fire extinguisher uses data from various sensors, such as cameras, LIDAR, and other depth sensing devices (or depth perceiving devices), to generate a map of the surroundings. In some embodiments, a camera captures spatial data while the robotic fire extinguisher moves within the surroundings. In some embodiments, the robotic fire extinguisher moves back and forth across the environment in straight lines, such as in a boustrophedon pattern. In some embodiments, the camera captures spatial data while the robotic fire extinguisher rotates 360 degrees. In some embodiments, spatial data of the surroundings are captured continuously as the robotic fire extinguisher moves around the surroundings or rotates in one or more different positions in the surroundings. In some embodiments, the camera captures objects within a first field of view. In some embodiments, the image captured is a depth image, the depth image being any image containing data which may be related to the distance from the camera to objects captured in the image (e.g., pixel brightness, intensity, and color, time for light to reflect and return back to sensor, depth vector, etc.). In some embodiments, depth to objects within the surroundings is measured using a depth measurement device, such as those described in Ser. No. 15/447,122, 16/393,921, 15/243,783, 15/954,335, 15/954,410, 15/257,798, 15/674,310, 15/224,442, and 15/683,255, the entire contents of which are hereby incorporated by reference. In one embodiment, the camera measures vectors from the camera to objects in the surroundings and the processor calculates the L2 norm of the vectors using $\|x\|_P = (\Sigma_i |x_i|^P)^{1/P}$ with P=2 to estimate depths to objects. In some embodiments, the camera rotates to observe a second field of view partly overlapping the first field of view and captures a depth image of objects within the second field of view (e.g., differing from the first field of view due to a difference in camera pose). In some embodiments, the processor compares the depth readings for the second field of view to those of the first field of view and identifies an area of overlap when a number of consecutive readings from the first and second fields of view are similar. The area of overlap between two consecutive fields of view correlates with the angular movement of the camera (relative to a static frame of reference of a room, for example) from one field of view to the next field of view. By ensuring the frame rate of the camera is fast enough to capture more than one frame of readings in the time it takes the camera to rotate the width of the frame, there is always overlap between the readings taken within two consecutive fields of view. The amount of overlap between frames may vary depending on the angular (and in some cases, linear) displacement of the camera, where a larger area of overlap is expected to provide data by which some of the present techniques generate a more accurate segment of the map relative to operations on data with less overlap. In some embodiments, the processor infers the angular disposition of the robotic fire extinguisher from the size of the area of overlap and uses the angular disposition to adjust odometer information to overcome the inherent noise of an odometer.

Prior to measuring vectors from the camera to objects within each new field of view and estimating depths, the processor may adjust previous readings to account for the measured movement of the robotic fire extinguisher as it moves from observing one field of view to the next (e.g., differing from one another due to a difference in camera pose). This adjustment accounts for the movement of the coordinate system observed by the camera with respect to a stationary coordinate system that may or may not coincide with the first field of view of the camera. In instances wherein the camera and robotic fire extinguisher move as a single unit, the observed coordinate system of the camera moves with respect to the stationary coordinate system as the robotic fire extinguisher moves. In some embodiments, a movement measuring device such as an odometer, gyroscope, optical flow sensor, etc. measures the movement of the robotic fire extinguisher and hence the camera (assuming the two move as a single unit) as the camera moves to observe new fields of view with corresponding new observed coordinate systems. In some embodiments, the processor stores the movement data in a movement vector and transforms all perimeter and object coordinates to correspond to, for example, the initial coordinate system observed by the camera coinciding with the stationary coordinate system. For example, in an embodiment wherein C is a stationary Cartesian coordinate system, C0 may be the observed coordinate system of the camera fixed to the robotic fire extinguisher at time t0 with state S and coinciding with stationary coordinate system C. The robotic fire extinguisher with attached camera displaces and the camera observes coordinate system C1 at time t1 with state S'. A movement measuring device measures the movement vector V with values (x, y, theta) and the processor uses the movement vector V to transform coordinates observed in coordinate system C1 to corresponding coordinates in coordinate system C0, coinciding with static coordinate system C. The movement vector V allows all coordinates corresponding to different coordinate systems to be transformed to a single coordinate system, such as the static coordinate system C, thereby allowing the entire perimeter to correspond to a single coordinate system. Some embodiments of the present techniques reduce a non-trivial problem to simple addition of vectors. Embodiments of this approach may be a lossy compression of the state world; but, by adjusting resolutions and creatively using mathematical estimations, acceptable results may be achieved for most home environments. With a holistic, stationary, or global coordinate system in which the camera of the robotic fire extinguisher observes a local coordinate system, a function that relates the local observations of the camera to the stationary or global observation may be created. A challenge may be estimating a reliable function that can provide high accuracy. For example, accounting for scenarios wherein the surface on which the robotic fire extinguisher operates is unlevelled whereby the odometer may measure a depth greater or smaller than the true 2D displacement. Methods for eradicating such issues have been suggested in U.S. patent application Ser. No. 15/683,255, the entire contents of which are hereby incorporated by reference, whereby the processor monitors declining depth measurements as a depth measurement device of the robotic fire extinguisher moves towards a stationary object. If the steady decline of measurements is interrupted by a predetermined number of measurements that are a predetermined percentage greater than the measurements immediately before and after the interruption, the processor discards the interrupting measurements.

In some embodiments, the processor identifies (e.g., determines) an area of overlap between two fields of view when (e.g., during evaluation a plurality of candidate overlaps) a number of consecutive (e.g., adjacent in pixel space) readings from the first and second fields of view are equal or close in value. Although the value of overlapping readings from the first and second fields of view may not be exactly the same, readings with similar values, to within a tolerance range of one another, can be identified (e.g., determined to correspond based on similarity of the values). Furthermore, identifying matching patterns in the value of readings captured within the first and second fields of view may also be used in identifying the area of overlap. For example, a sudden increase then decrease in the readings values observed in both depth images may be used to identify the area of overlap. Other patterns, such as increasing values followed by constant values or constant values followed by decreasing values or any other pattern in the values of the readings, can also be used to estimate the area of overlap. A Jacobian and Hessian matrix may be used to identify such similarities. In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric, such as the Szymkiewicz-Simpson coefficient, may be used to indicate how good of an overlap there is between the two sets of readings. Or some embodiments may determine an overlap with a convolution. Some embodiments may implement a kernel function that determines an aggregate measure of differences (e.g., a root mean square value) between some or all of a collection of adjacent readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied. In some embodiments, the processor determines the area of overlap based on translation and rotation of the camera between consecutive frames measured by an inertial measurement unit (IMU). In some embodiments, the translation and rotation of the camera between frames is measured by two separate movement measurement devices (e.g., optical encoder and gyroscope of the robotic fire extinguisher) and the movement of the robotic fire extinguisher is the average of the measurements from the two separate devices. In some embodiments, the data from one movement measurement device is the movement data used and the data from the second movement measurement device is used to confirm the data of the first movement measurement device. In some embodiments, the processor uses movement of the camera between consecutive frames to validate the area of overlap identified between readings. Or, in some embodiments, comparison between the values of readings is used to validate the area of overlap determined based on measured movement of the camera between consecutive frames.

Figure 8A:
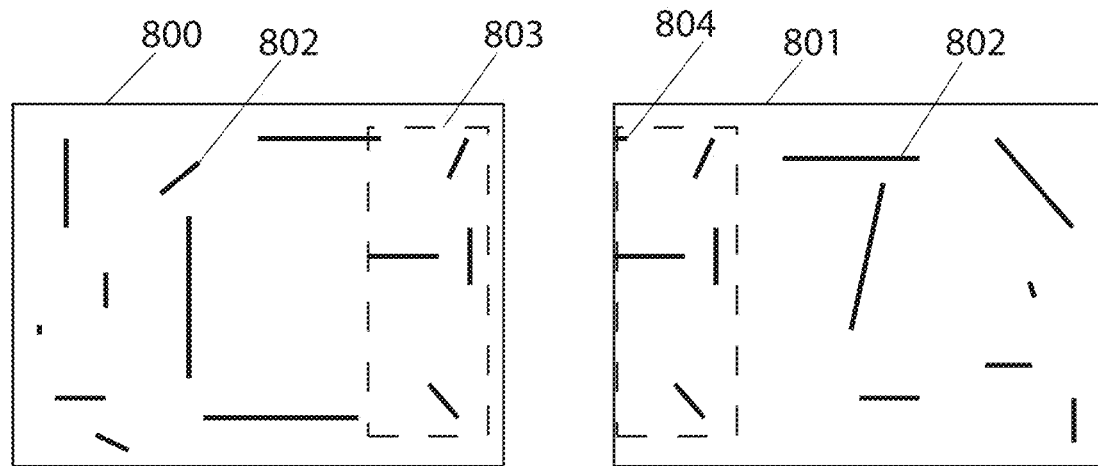
FIGS. 8A and 8B illustrate how an overlapping area is detected in some embodiments using raw pixel intensity data and the combination of data at overlapping points.
Figure 8B:
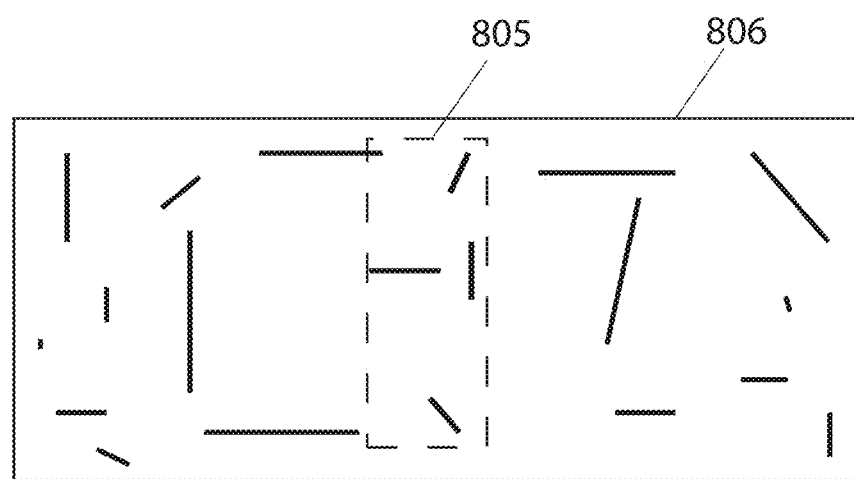

FIGS. 8A and 8B illustrate an example of identifying an area of overlap using raw pixel intensity data and the combination of data at overlapping points. In FIG. 8A, the overlapping area between overlapping image 800 captured in a first field of view and image 801 captured in a second field of view may be determined by comparing pixel intensity values of each captured image (or transformation thereof, such as the output of a pipeline that includes normalizing pixel intensities, applying Gaussian blur to reduce the effect of noise, detecting edges in the blurred output (such as Canny or Haar edge detection), and thresholding the output of edge detection algorithms to produce a bitmap like that shown) and identifying matching patterns in the pixel intensity values of the two images, for instance by executing the above-described operations by which some embodiments determine an overlap with a convolution. Lines 802 represent pixels with high pixel intensity value (such as those above a certain threshold) in each image. Area 803 of image 800 and area 804 of image 801 capture the same area of the environment and, as such, the same pattern for pixel intensity values is sensed in area 803 of image 800 and area 804 of image 801. After identifying matching patterns in pixel intensity values in image 800 and 801, an overlapping area between both images may be determined. In FIG. 8B, the images are combined at overlapping area 805 to form a larger image 806 of the environment. In some cases, data corresponding to the images may be combined. For instance, depth values may be aligned based on alignment determined with the image.

Figure 9A:
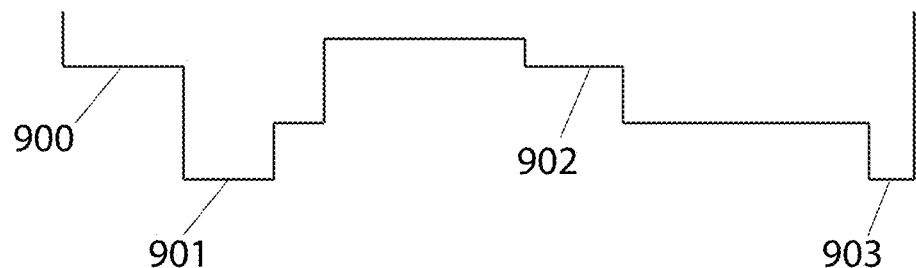
FIGS. 9A-9C illustrate how an overlapping area is detected in some embodiments using raw pixel intensity data and the combination of data at overlapping points.
Figure 9B:
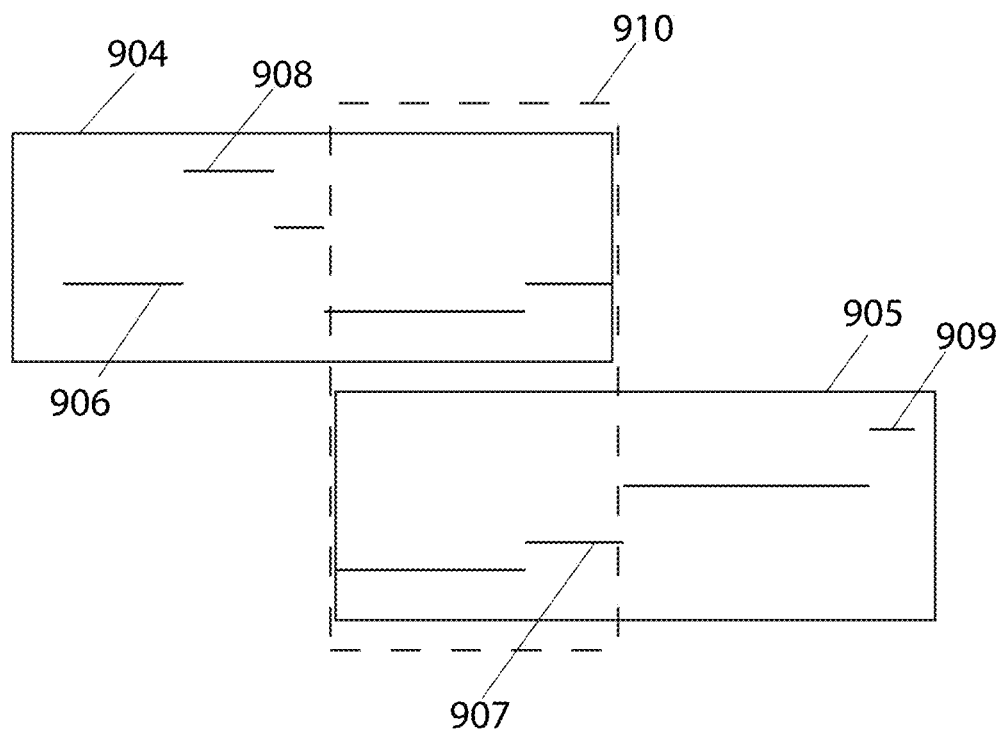
Figure 9C:
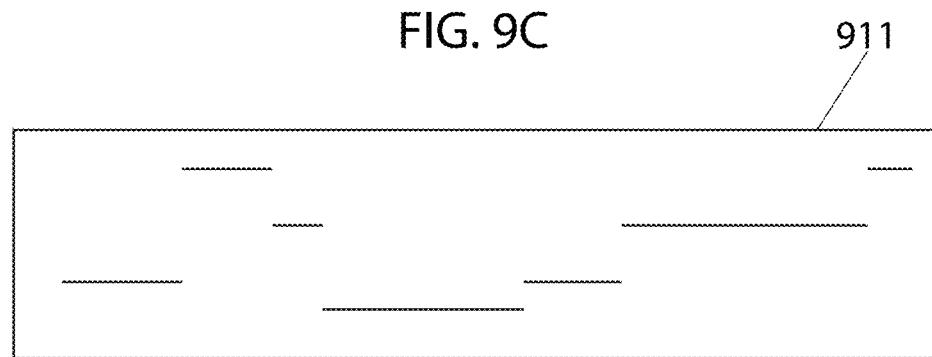

FIGS. 9A-9C illustrate another example of identifying an area of overlap using raw pixel intensity data and the combination of data at overlapping points. FIG. 9A illustrates a top (plan) view of an object, such as a wall, with uneven surfaces wherein, for example, surface 900 is further away from an observer than surface 901 or surface 902 is further away from an observer than surface 903. In some embodiments, at least one infrared line laser positioned at a downward angle relative to a horizontal plane coupled with at least one camera may be used to determine the depth of multiple points across the uneven surfaces from captured images of the line laser projected onto the uneven surfaces of the object. Since the line laser is positioned at a downward angle, the position of the line laser in the captured image will appear higher for closer surfaces and will appear lower for further surfaces. Similar approaches may be applied with lasers offset from a camera in the horizontal plane. The position of the laser line (or feature of a structured light pattern) in the image may be detected by finding pixels with intensity above a threshold. The position of the line laser in the captured image may be related to a distance from the surface upon which the line laser is projected. In FIG. 9B, captured images 904 and 905 of the laser line projected onto the object surface for two different fields of view are shown. Projected laser lines with lower position, such as laser lines 906 and 907 in images 904 and 905 respectively, correspond to object surfaces 900 and 902, respectively, further away from the infrared illuminator and camera. Projected laser lines with higher position, such as laser lines 908 and 909 in images 904 and 905 respectively, correspond to object surfaces 901 and 903, respectively, closer to the infrared illuminator and camera. Captured images 904 and 905 from two different fields of view may be combined into a larger image of the environment by finding an overlapping area between the two images and stitching them together at overlapping points. The overlapping area may be found by identifying similar arrangement of pixel intensities in both images, wherein pixels with high intensity may be the laser line. For example, areas of images 904 and 905 bound within dashed lines 910 have similar arrangement of pixel intensities as both images captured a same portion of the object within their field of view. Therefore, images 904 and 905 may be combined at overlapping points to construct larger image 911 of the environment shown in FIG. 9C. The position of the laser lines in image 911, indicated by pixels with intensity value above a threshold intensity, may also be used to infer depth of surfaces of objects from the infrared illuminator and camera (see, U.S. patent application Ser. No. 15/674,310, the entire contents of which is hereby incorporated by reference).

In some embodiments, the area of overlap between readings taken within the two field of views is estimated based on the measured movement of the robotic fire extinguisher and is used as a method of verifying the identified area of overlap. In some embodiments, measured movement may be used as the primary method of identifying the area of overlap. In some embodiments, devices such as an odometer, gyroscope, and optical flow sensor may be used to measure movement. For example, the angular displacement provided by an odometer and gyroscope and/or the mathematical convolution of the two may be used to estimate the area of overlap. In some embodiments, the readings from the odometer, gyroscope and optical sensor may be combined to produce more accurate readings, e.g., with data fusion techniques and a Kalman filter. Gyroscopes and odometers provide similar readings (e.g., in vector form indicating magnitude of distance and direction). However, since each measurement device is subject to a different type of noise and different errors, combining readings from both measurement devices through a mathematical process can produce more accurate readings. In some embodiments, the robotic fire extinguisher may have more than one movement measuring device in order to measure movement between each time step or fields of view observed. For example, the robotic fire extinguisher may have gyroscopes and odometers that simultaneously provide redundant information. In many implementations, only one set of information is used by the processor of the robotic fire extinguisher while the other is discarded. In other implementations, the processor combines the two readings by, for example, using a moving average (or some other measure of central tendency may be applied, like a median or mode) or a more complex method. Due to measurement noise, the type of measurement device used, etc. discrepancies between the measurements by a first device and a second device may exist and may not be the exact same. In such cases, the processor calculates movement of the robotic fire extinguisher by combining the measurements from the first and second device, or selects measurements from one device as more accurate than the others. For example, the processor may combine measurements from the first device and the second device (or measurements from more devices, like more than three, more than five, or more than 10) using a moving average (or some other measure of central tendency may be applied, like a median or mode). The processor may also use minimum sum of errors to adjust and calculate movement of the robotic fire extinguisher to compensate for the lack of precision between the measurements from the first and second device. By way of further example, the processor may use minimum mean squared error to provide a more precise estimate of the movement of the robotic fire extinguisher. The processor may also use other mathematical methods to further process measured movement of the robotic fire extinguisher by the first and second device, such as split and merge algorithm, incremental algorithm, Hough Transform, line regression, Random Sample Consensus, Expectation-Maximization algorithm, or curve fitting, for example, to estimate more realistic movement of the robotic fire extinguisher. In another embodiment, the processor may use the k-nearest neighbors algorithm where each movement measurement is calculated as the average of its k-nearest neighbors.

Due to measurement noise, discrepancies between the value of readings within the area of overlap from the first field of view and the second field of view may exist and the values of the overlapping readings may not be the exact same. In such cases, new readings may be calculated, or some of the readings may be selected as more accurate than others. For example, the overlapping readings from the first field of view and the second field of view (or more fields of view where more images overlap, like more than three, more than five, or more than 10) may be combined using a moving average (or some other measure of central tendency may be applied, like a median or mode) and adopted as the new readings for the area of overlap. The minimum sum of errors may also be used to adjust and calculate new readings for the overlapping area to compensate for the lack of precision between overlapping readings perceived within the first and second fields of view. By way of further example, the minimum mean squared error may be used to provide a more precise estimate of readings within the overlapping area. Other mathematical methods may also be used to further process the readings within the area of overlap, such as split and merge algorithm, incremental algorithm, Hough Transform, line regression, Random Sample Consensus, Expectation-Maximization algorithm, or curve fitting, for example, to estimate more realistic readings given the overlapping readings perceived within the first and second fields of view. The calculated readings are used as the new readings for the overlapping area. In another embodiment, the k-nearest neighbors algorithm can be used where each new reading is calculated as the average of the values of its k-nearest neighbors. Some embodiments may implement DB-SCAN on readings and related values like pixel intensity, e.g., in a vector space that includes both depths and pixel intensities corresponding to those depths, to determine a plurality of clusters, each corresponding to readings of the same feature of an object. In some embodiments, a first set of readings is fixed and used as a reference while the second set of readings, overlapping with the first set of readings, is transformed to match the fixed reference. In some embodiments, the processor expands the area of overlap to include a number of readings immediately before and after (or spatially adjacent) readings within the identified area of overlap.

Structure of data used in inferring readings may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. For ease of visualization, data from which depth is inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. It is noted that each step taken in the process of transforming raw readings into a depth value in millimeters or inches is a loss and computationally expensive compression and further reduces the state space in each step when digitizing each quality. In order to reduce the loss and computational expenses, it is desired and useful to omit intermediary steps if the goal can be accomplished without them. Based on information theory principal, it is beneficial to increase content for a given number of bits. For example, reporting depth in specific formats, such as metric units, is only necessary for human visualization. In implementation, such steps can be avoided to save computational expense and loss of information. The amount of compression and the amount of information captured and processed is a trade-off, which a person of ordinary skill in the art can balance to get the desired result with the benefit of this disclosure. Depths may be perceived (e.g., measured or otherwise inferred) in any form and be reported in any format. The methods of perceiving or otherwise inferring depths and the formats of reporting depths used herein are for illustrative purposes and are not intended to limit the invention, again which is not to suggest that other descriptions are limiting.

In some embodiments, two classes of sensors are used, one acting as a predictor and the other confirming perimeter points of a work space. The predictor sensor predicts a specific coordinate as a perimeter point. The second set of sensors may either confirm or refute the prediction. For example, a predicted coordinate is proven to be false if the second set of sensors detects the robotic fire extinguisher occupying the area within which the coordinate is found. If the second set of sensors detects that coordinate is within an area the robotic fire extinguisher cannot access, the prediction is found true. In some embodiments, this is implemented with a low range sensor array. The second set of sensors may be, but is not limited to, a low range IR sensor, a distance sensor, a tactile sensor, a bumper sensor, or other types of sensors.

The processor of the robotic fire extinguisher may use the map of the environment to autonomously navigate the environment during operation. In some embodiments, the map (e.g., mapped, e.g., in vector or bitmap form) is stored in memory for future use. Storage of the map may be in temporary memory such that a map is only available during an operational session or in more permanent forms of memory such that the map is available at the next session or startup. In some embodiments, the map is further processed to identify rooms and other segments. In some embodiments, a new map is constructed at each use. In some embodiments, the map may be externally stored on another device such as the docking station or other base station of the robotic fire extinguisher or in the cloud (e.g., in memory of a server at a remote data center) or other remote storage device.

Figure 10A:
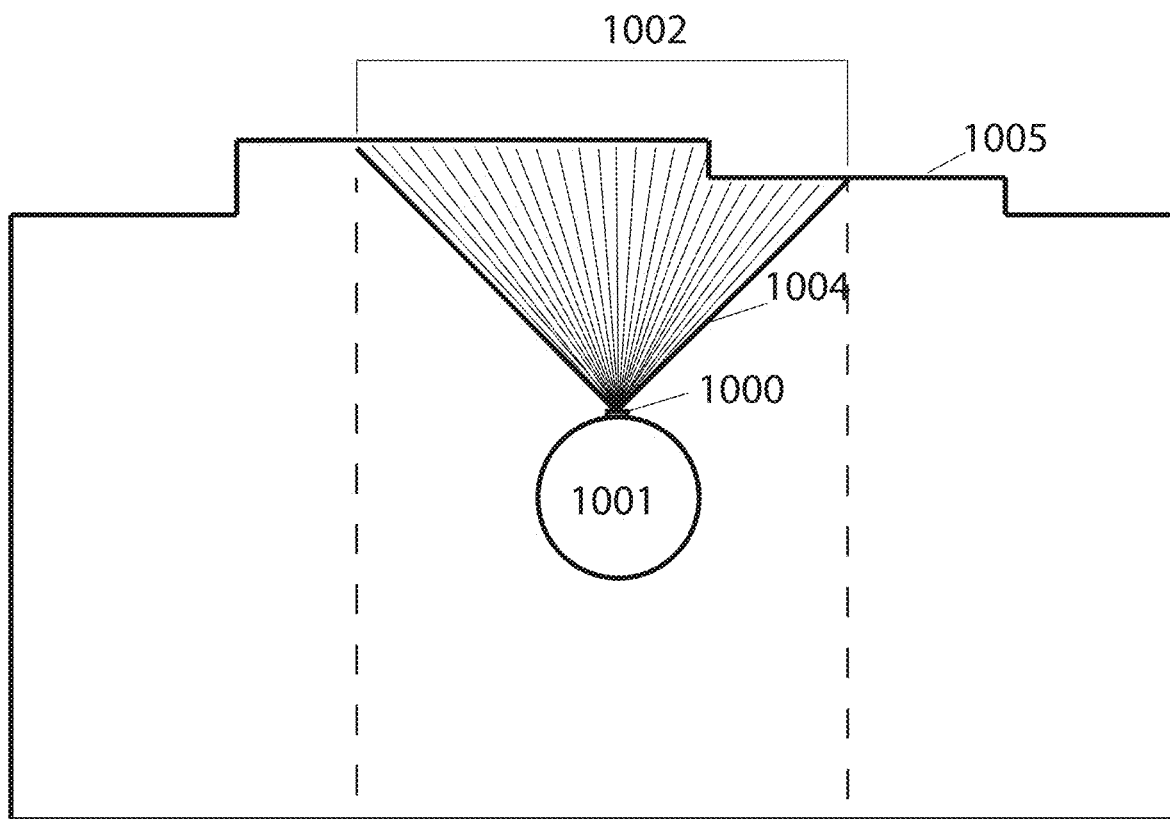
FIGS. 10A and 10B illustrate a camera taking distance measurements of an enclosure within a first range of sight and resulting segment of a 2D boundary of the enclosure in some embodiments.
Figure 10B:
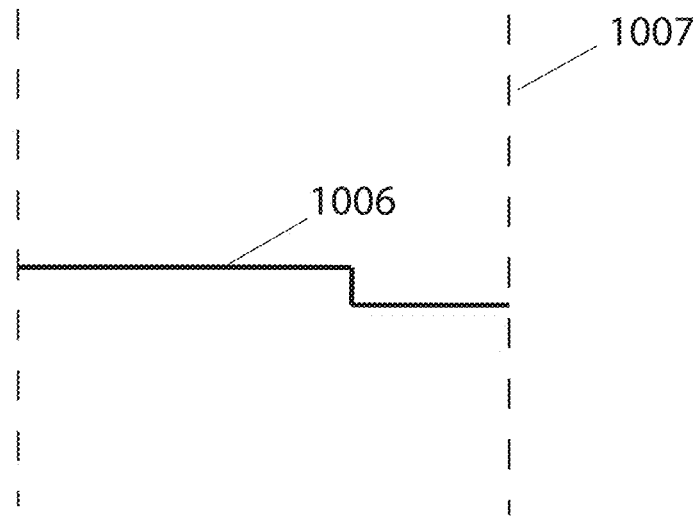

FIG. 10A illustrates an embodiment consistent with the above mapping techniques wherein camera 1000 mounted on robotic fire extinguisher 1001 is measuring distances 1002 within first field of view (i.e. field of view) 1004. Distance measurements 1002 taken by camera 1000 measure the distance from camera 1000 to object 1005, which in this case is a wall. FIG. 10B illustrates 2D perimeters segment 1006 resulting from plotted distance measurements 1002 taken within first field of view 1004. Dashed lines 1007 demonstrates that resulting 2D perimeter segment 1004 corresponds to distance measurements 1002 taken within field of view 1004. In some embodiments, 3D distance measurements are taken and plotted to construct 2D or 3D perimeter segments of the map.

Figure 11A:
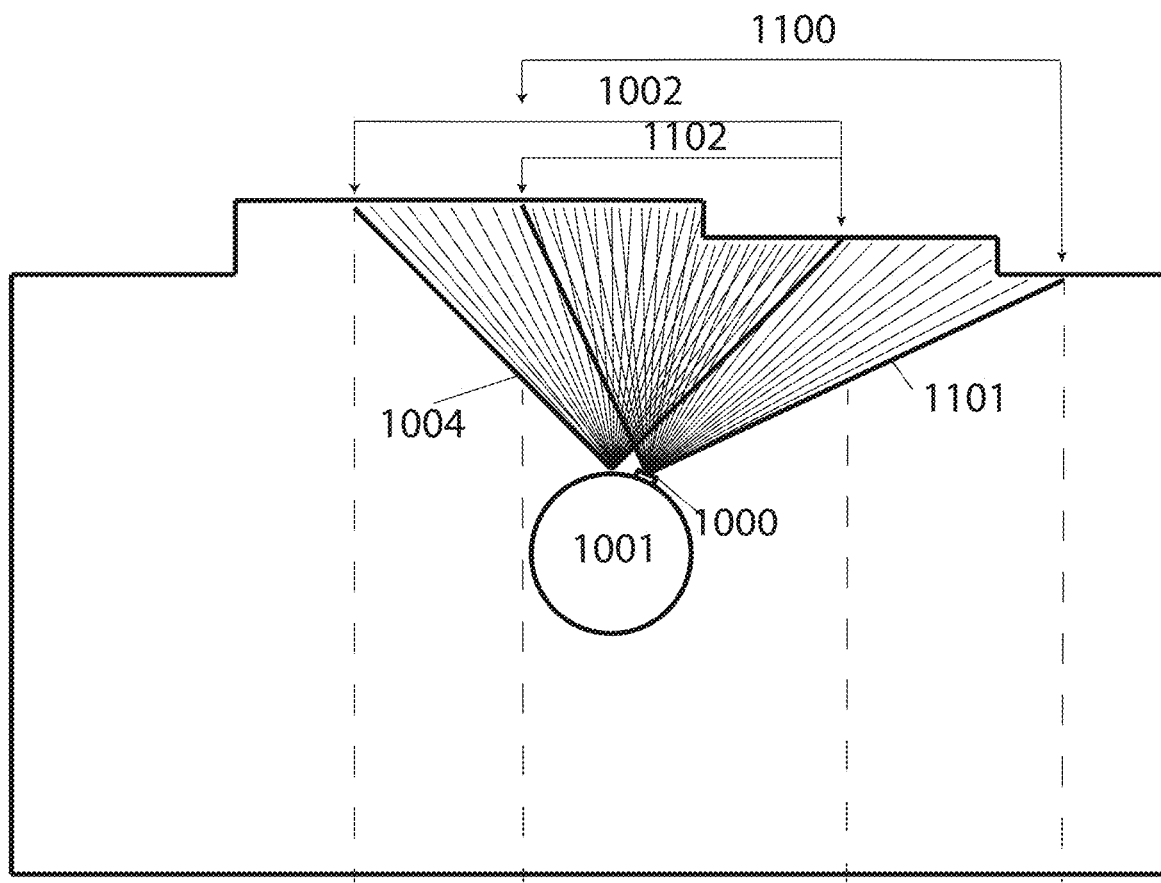
FIGS. 11A and 11B illustrate how a segment of a 2D boundary of an enclosure is constructed from distance measurements taken within successively overlapping range of sight in some embodiments.

FIG. 11A illustrates camera 1000 mounted on robotic fire extinguisher 1001 measuring distances 1100 within second field of view 1101 partly overlapping distance measurements 1002 within first field of view 1004. After distance measurements 1002 within first field of view 1004 are taken, robotic fire extinguisher 1001 with mounted camera 1000 moves to observe overlapping second field of view 1101 and take distance measurements 1100. As robotic fire extinguisher 1001 moves to observe second field of view 1101, the values of distance measurements 1002 taken within first field of view 1004 are adjusted to account for the movement of robotic fire extinguisher 1001. Distance measurements 1102 represent the area of overlap between distance measurements 1002 taken within field of view 1004 and distance measurements 1100 taken within field of view 1101.

Figure 11B:
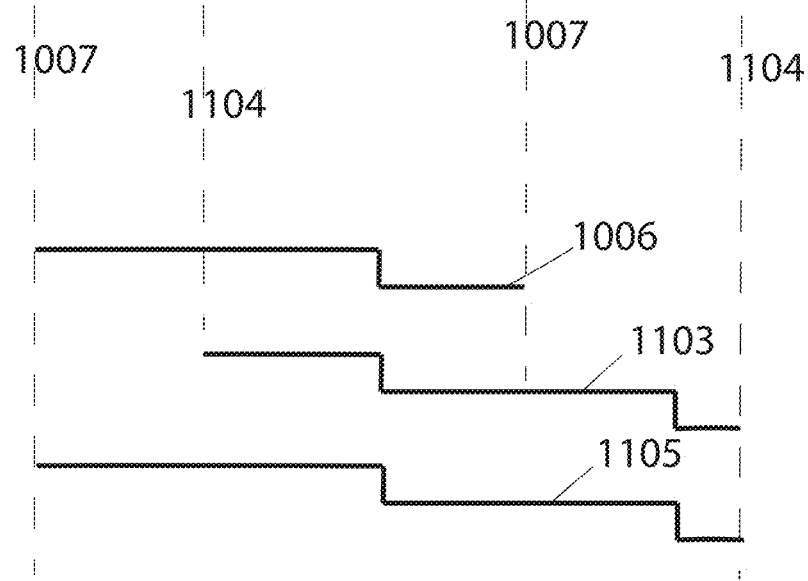

FIG. 11B illustrates 2D perimeters segments 1006 and 1103 resulting from distance measurements 1002 and 1100, respectively. While shown aligned, the processor may receive the data in a format in which each segment is in a distinct coordinate system, e.g., each in pixel coordinates of a different image. Segments 1006 and 1103 are bounded by dashed lines 1007 and 1104, respectively. 2D perimeters segment 1105 constructed from the combination of 2D perimeters segments 1006 and 1103 and bounded by the outermost dashed lines of 1007 and 1104 is also illustrated. Distance measurements 1100 captured within second field of view 1101 are compared to distance measurements 1002 captured within first field of view 1004 to identify the area of overlap bounded by the innermost dashed lines of 1104 and 1007. The processor of the robotic fire extinguisher may compare measurements and determine the area of overlap using the methods described above. 2D perimeters segment 1006 from distance measurements taken within first field of view 1004 and 2D perimeters segment 1103 from distance measurements taken within second field of view 1101 may be combined at the area of overlap to construct larger 2D perimeters segment 1105. When the values of overlapping distance measurements from field of view 1004 and 1101 within the area of overlap are slightly different, an analytical method, such as a data or sensor fusion algorithm, averaging, minimum sum of errors, or any other suitable method as described above is used to calculate a single distance value for each pair of overlapping distance measurements that can result in a more accurate ground truth as compared to the distance measurements initially taken. In some embodiments, this method is repeated such that distance measurements captured within successively overlapping field of views may be combined to construct the perimeters of the entire map.

Figure 12:
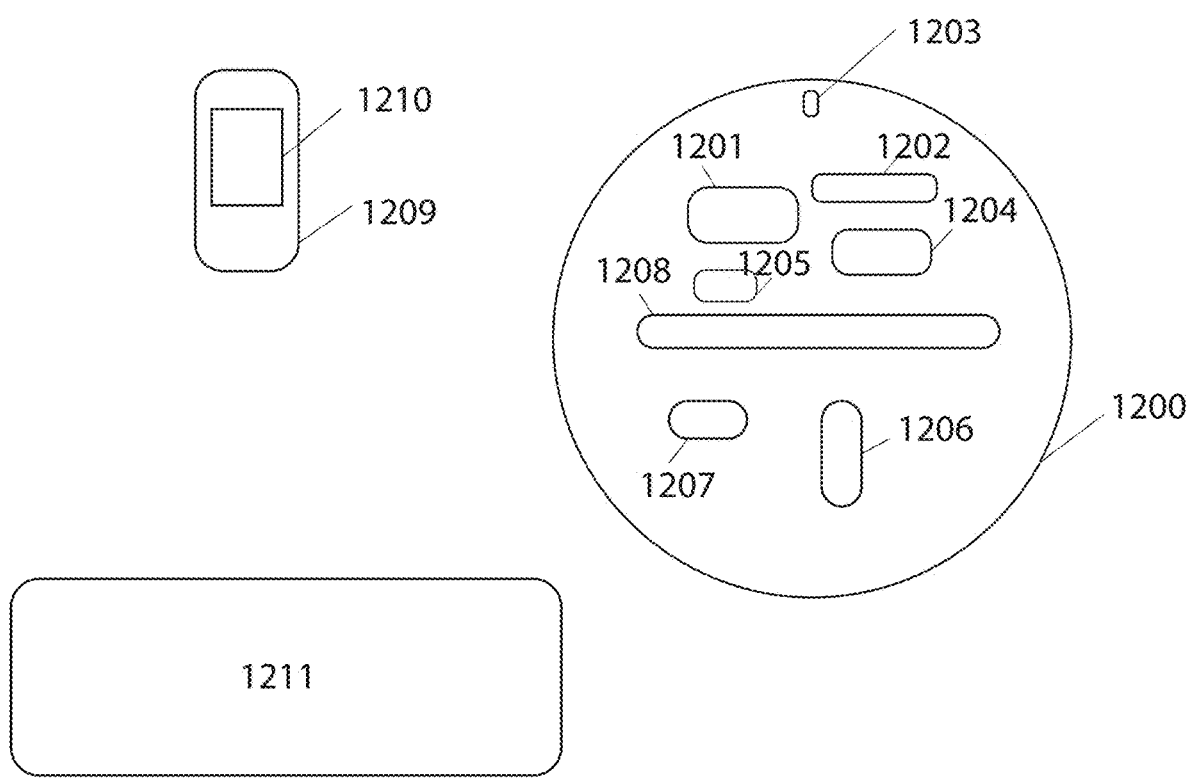
FIG. 12 is a schematic diagram of an example of a robot with which the present techniques may be implemented in some embodiments.

FIG. 12 depicts an example of a robotic fire extinguisher 1200 with processor 1201, memory 1202, a first set of sensors 1203, second set of sensors 1204, network communication 1205, movement driver 1206, signal receiver 1207, and more or more tools 1208. The first and second set of sensors 1203 and 1204 may include depth measuring devices, movement measuring devices, infrared heat sensors, and the like. In some embodiments, the robotic fire extinguisher may include the features of a robotic fire extinguisher described herein. The shape of the illustrated features is not meant to imply that the robotic fire extinguisher has a round shape or that any feature has any particular shape. In some embodiments, program code stored in the memory 1202 and executed by the processor 1201 may effectuate the operations described herein. Some embodiments additionally include user communication device 1209 having a touchscreen 1210 with a software application coupled to the robotic fire extinguisher 1200, such as that described in U.S. patent application Ser. Nos. 15/272,752, 15/949,708, and 16/277,991, the entire contents of which is hereby incorporated by reference. For example, the application may be used to provide instructions to the robotic fire extinguisher, such as days and times to execute particular functions and which areas to execute particular functions within. In other cases, the application may be used by a user to modify the map of the environment by, for example, adjusting perimeters and obstacles and creating subareas within the map. In some embodiments, once a map is established, it may be sent to a user interface. Maps may be sent to a user interface at any stage; they do not need to be complete. In some embodiments, through the interface, a user may view the map and take any of a variety of actions. In embodiments, a user interface may be provided through a software application on a computer, tablet, smartphone, or a dedicated remote control. In some embodiments, a user may adjust or correct the map boundaries within the user interface by selecting all or part of a boundary line using a cursor, pointer, stylus, mouse, the user's finger, a button or buttons, or other input device on the user interface. In some embodiments, once a boundary line is selected, a user may be provided with various options, such as, but not limited to, deleting, trimming, rotating, elongating, redrawing, moving in a left direction, moving in a right direction, moving in an upward direction, moving in a downward direction, etc. In some embodiments, a user may be given the option to redraw a boundary line using a cursor, pointer, stylus, mouse, the user's finger, a button or buttons, or other input devices.

In some embodiments, maps generated by robotic devices may contain errors, be incomplete, or simply not reflect the areas that a user wishes a robotic device to service. By adjusting the map, a user may improve the accuracy of the information that the robotic device has about its environment, thereby improving the device's ability to navigate through the environment. A user may, for example, extend the boundaries of a map in areas where the actual boundaries are further than those identified by the system, or trim boundaries where the system identified boundaries further than the actual or desired boundaries. Even in cases where a system creates an accurate map of an environment, a user may prefer to adjust the map boundaries to keep the device from entering some areas.

In some embodiments, data may be sent between the robotic device and the user interface through one or more network communication connections. Any type of wireless network signals may be used, including, but not limited to, radio signals, Wi-Fi signals, or Bluetooth signals. In some embodiments, map data collected by sensors of the robotic device is sent to the user interface, where a user may make adjustments and/or apply or adjust settings. In some embodiments, changes made by a user in the user interface are sent to the robotic device through the one or more network communication connections.

In some embodiments, robotic devices may have a plurality of tools that can be used concurrently or independently. In some embodiments, robotic devices may also have various settings, such as speed settings, movement pattern settings, etc. In some embodiments, a user is enabled to adjust all of these settings through the user interface. In some embodiments, a user may select with a cursor, pointer, stylus, mouse, the user's finger, a button or buttons, a keyboard, or other input devices any portion of the workspace and select one or more settings to be applied to the area.

An example of a process for customizing robotic device operation through a user interface includes, in a first step, a user selecting the area of the workspace map in which he or she wants to designate robotic device operation settings. A user may select any size area; the area selected could be comprised of a small portion of the workspace or could encompass the entire workspace. In a next step, a user selects desired settings for the selected area. The particular functions and settings available may be dependent on the capabilities of the particular robotic device in question. For example, in some embodiments, a user may select any of: navigation methods, driving speed, etc. In a next step, the selections made by the user are sent to the robotic device. In a next step, a processor of the robotic device processes the received data and applies the user changes.

A user may desire to correct boundary lines of a map to match actual obstacles. By changing the boundary lines of the map, a user is enabled to create a two-dimensional map of the workspace that accurately identifies obstacles and boundaries in the workspace. Furthermore, as discussed previously, a user may identify areas within the two-dimensional map to be treated in specific ways. By delineating a portion of the map, a user may select settings for that area. In a like manner, a user may define an area and turn on a mopping function for that area. The remaining area may be treated in a default manner. Additionally, in adjusting the boundary lines of the two-dimensional map, a user is permitted to create boundaries anywhere desired, regardless of whether an actual boundary exists in the workspace. In an example, a boundary line has been redrawn to exclude an area near a corner. The robotic device will thus be prevented from entering the area. This may be useful for keeping a robotic device out of areas that a user does not want the device to service. For example, a user might exclude areas from a map with fragile objects, pets, cables or wires, etc.

In an example of a user interface, the user delineates sections of the workspace to be serviced in different ways by a robotic device. The user has delineated four sections. The user may select the settings of the robotic device within each section independently of the other sections using the user interface. In the example, a user uses his or her finger to manipulate the map through a touchscreen; however, various other methods may be employed depending on the hardware of the device providing the user interface.

In another example, the application may transmit self-test information (e.g., from diagnostic testing the processor of the robotic fire extinguisher executes autonomously to identify errors or malfunctions) directly to human customer support or to the cloud for an artificial intelligence (AI) system to analyze. In some cases, the AI system may determine a solution and transmit the solution to the application or the processor of the robotic fire extinguisher. In other cases, the AI system may determine that human customer support is required and transmit the self-test information to human customer support for further analysis. In some cases, the customer service representative may communicate with a user using the application or other form of communication. Further, minimal explanation may be required by the user as the customer service representative may be in possession of self-test, information and logs recorded by the processor which may be used in finding the root source of the error or malfunction. In some cases, the AI system or customer service representative sends a shipping label to the user that may be used in sending the robotic fire extinguisher for repair. In some cases, the AI system or customer service representative sends. In some cases, the AI system analyzes self-test information autonomously in the background and sends a spare to the user in anticipation of the robotic fire extinguisher requiring the spare part. For example, the AI system detects that a filter requires replacement earlier than expected and sends a new filter to a home of the user. In some cases, the processor of the robotic fire extinguisher transmits the self-test information directly to human customer service or the cloud for the AI system to retrieve. In some cases, the application may be used to choose when and which self-tests to execute.

While the examples and illustrations provided apply the some of the present techniques to the construction of a 2D perimeters using 2D distance measurements, the 2D perimeters may be constructed using 3D distance measurements as well. Furthermore, embodiments may construct 3D perimeters of the map using 3D distance measurements. The 3D perimeters of the map may be plotted using at least one camera, such as a distance measuring camera, capable of taking 3D distance measurements. 3D distance measurements taken within overlapping field of views may be combined at identified areas of overlap where overlapping distance measurements are used as the attachment points. In some embodiments, a 2D perimeters can be extracted from the plotted 3D perimeters.

The resulting plot of the perimeters may be encoded in various forms. For instance, some embodiments may construct a point cloud of three dimensional points by transforming vectors into a vector space with a shared origin, e.g., based on the above-described vectors, in some cases displacement vectors may be used and refined based on measured depths. Some embodiments may represent maps with a set of polygons that model detected surfaces, e.g., by calculating a convex hull over measured vectors within a threshold area, like a tiling polygon. Polygons are expected to afford faster interrogation of maps during navigation and consume less memory than point clouds at the expense of greater computational load when plotting.

In some embodiments, the field of view of the sensor may be limited. In such cases, there may not be overlap between measurements captured in consecutive field of views as the robot rotates 360 degrees to scan the environment or executes other movements within the environment. In some embodiments, the robotic fire extinguisher includes a camera oriented towards the ceiling. The camera captures images of features and the processor monitors how the image of the ceiling changes in each degree of angular displacement. The processor compares consecutively captured images and determines a transpose that transforms a previously captured image into a currently captured image. The processor applies the transpose to all measurements and normalizes them. The transpose may be determined and applied to the measurements at the end of a 360 degrees turn, at every incremental degree, or at a predetermined interval (e.g., an interval corresponding with camera FPS or TOF sensor Hz). In other instances, the camera captures images of other objects such as walls, floors, walls and floors, ceilings and walls, etc. For example, the camera may be oriented to capture images of walls and floors and the processor may determine the transpose of a corner connecting a floor and two walls from one image to another. In some embodiments, the processor determines the change in distance of the feature from an edge of the image.

In some embodiments, more than one camera may be used to improve accuracy of the map. For example, a plurality of distance measuring cameras (e.g., carried by the robotic fire extinguisher) may be used simultaneously (or concurrently) to more accurately determine the perimeters of the map. The use of a plurality of distance measuring cameras is expected to allow for the collection of distance measurements from different perspectives and angles, for example. Where more than one distance measuring camera is used, triangulation or others suitable methods may be used for further data refinement and accuracy. In some embodiments, a 360-degree LIDAR is used to create perimeters of the map. It should be emphasized, though, that embodiments are not limited to techniques that construct maps in this way, as the present techniques may also be used for plane finding in augmented reality, barrier detection in virtual reality applications, outdoor mapping with autonomous drones, and other similar applications, which is not to suggest that any other description is limiting. Further details of mapping methods are described in U.S. patent application Ser. Nos. 16/048,179, 16/048,185, 16/163,541, 16/163,562, 16/163,508, and 16/185,000, the entire contents of which are hereby incorporated by reference.

For example, in some embodiments, the movement pattern of the robotic device during the mapping process is a boustrophedon movement pattern. This can be advantageous for mapping the environment. For example, if the robotic device begins in close proximity to a wall of which it is facing and attempts to map the environment by rotating 360 degrees in its initial position, areas close to the robotic device and those far away may not be observed by the sensors as the areas surrounding the robotic device are too close and those far away are too far. Minimum and maximum detection distances may be, for example, 30 and 400 centimeters, respectively. Instead, in some embodiments, the robotic device moves backwards (i.e., opposite the forward direction as defined below) away from the wall by some distance and the sensors observe areas of the environment that were previously too close to the sensors to be observed. The distance of backwards movement is, in some embodiments, not particularly large, it may be 40, 50, or 60 centimeters for example. In some cases, the distance backward is larger than the minimal detection distance. In some embodiments, the distance backward is more than or equal to the minimal detection distance plus some percentage of a difference between the minimal and maximal detection distances of the robot's sensor, e.g., 5%, 10%, 50%, or 80%.

The robotic device, in some embodiments, (or sensor thereon if the sensor is configured to rotate independently of the robot) then rotates 180 degrees to face towards the open space of the environment. In doing so, the sensors observe areas in front of the robotic device and within the detection range. In some embodiments, the robot does not translate between the backward movement and completion of the 180 degree turn, or in some embodiments, the turn is executed while the robot translates backward. In some embodiments, the robot completes the 180 degree turn without pausing, or in some cases, the robot may rotate partially, e.g., degrees, move less than a threshold distance (like less than 10 cm), and then complete the other 90 degrees of the turn.

References to angles should be read as encompassing angles between plus or minus 20 degrees of the listed angle, unless another tolerance is specified, e.g., some embodiments may hold such tolerances within plus or minus 15 degrees, 10 degrees, 5 degrees, or 1 degree of rotation. References to rotation may refer to rotation about a vertical axis normal to a floor or other surface on which the robot is performing a task, like cleaning, mapping, or cleaning and mapping. In some embodiments, the robot's sensor by which a workspace is mapped, at least in part, and from which the forward direction is defined, may have a field of view that is less than 360 degrees in the horizontal plane normal to the axis about which the robot rotates, e.g., less than 270 degrees, less than 180 degrees, less than 90 degrees, or less than 45 degrees. In some embodiments, mapping may be performed in a session in which more than 10%, more than 50%, or all of a room is mapped, and the session may start from a starting position, is where the presently described routines start, and may correspond to a location of a base station or may be a location to which the robot travels before starting the routine.

The robotic device, in some embodiments, then moves in a forward direction (defined as the direction in which the sensor points, e.g., the centerline of the field of view of the sensor) by some first distance allowing the sensors to observe surroundings areas within the detection range as the robot moves. The processor, in some embodiments, determines the first forward distance of the robotic device by detection of an obstacle by a sensor, such as a wall or furniture, e.g., by making contact with a contact sensor or by bringing the obstacle closer than the maximum detection distance of the robot's sensor for mapping. In some embodiments, the first forward distance is predetermined or in some embodiments the first forward distance is dynamically determined, e.g., based on data from the sensor indicating an object is within the detection distance.

The robotic device, in some embodiments, then rotates another 180 degrees and moves by some second distance in a forward direction (from the perspective of the robot), returning back towards its initial area, and in some cases, retracing its path. In some embodiments, the processor may determine the second forward travel distance by detection of an obstacle by a sensor, such moving until a wall or furniture is within range of the sensor. In some embodiments, the second forward travel distance is predetermined or dynamically determined in the manner described above. In doing so, the sensors observe any remaining undiscovered areas from the first forward distance travelled across the environment as the robotic device returns back in the opposite direction. In some embodiments, this back and forth movement described is repeated (e.g., with some amount of orthogonal offset translation between iterations, like an amount corresponding to a width of coverage of a cleaning tool of the robot, for instance less than 100% of that width, 95% of that width, 90% of that width, 50% of that width, etc.) wherein the robotic device makes two 180 degree turns separated by some distance, such that movement of the robotic device is a boustrophedon pattern, travelling back and forth across the environment. In some embodiments, the robotic device may not be initially facing a wall of which it is in close proximity with. The robotic device may begin executing the boustrophedon movement pattern from any area within the environment. In some embodiments, the robotic device performs other movement patterns besides boustrophedon alone or in combination.

In other embodiments, the boustrophedon movement pattern (or other coverage path pattern) of the robotic device during the mapping process differs. For example, in some embodiments, the robotic device is at one end of the environment, facing towards the open space. From here, the robotic device moves in a first forward direction (from the perspective of the robot as defined above) by some distance then rotates 90 degrees in a clockwise direction. The processor determines the first forward distance by which the robotic device travels forward by detection of an obstacle by a sensor, such as a wall or furniture. In some embodiments, the first forward distance is predetermined (e.g., and measured by another sensor, like an odometer or by integrating signals from an inertial measurement unit). The robotic device then moves by some distance in a second forward direction (from the perspective of the room, and which may be the same forward direction from the perspective of the robot, e.g., the direction in which its sensor points after rotating); and rotates another 90 degrees in a clockwise direction. The distance travelled after the first 90-degree rotation may not be particularly large and may be dependent on the amount of desired overlap when cleaning the surface. For example, if the distance is small (e.g., less than the width of the main brush of a robotic vacuum), as the robotic device returns back towards the area it began from, the surface being cleaned overlaps with the surface that was already cleaned. In some cases, this may be desirable. If the distance is too large (e.g., greater than the width of the main brush) some areas of the surface may not be cleaned. For example, for small robotic devices, like a robotic vacuum, the brush size typically ranges from 15-30 cm. If 50% overlap in coverage is desired using a brush with 15 cm width, the travel distance is 7.5 cm. If no overlap in coverage and no coverage of areas is missed, the travel distance is 15 cm and anything greater than 15 cm would result in coverage of area being missed. For larger commercial robotic devices brush size can be between 50-60 cm. The robotic device then moves by some third distance in forward direction back towards the area of its initial starting position, the processor determining the third forward distance by detection of an obstacle by a sensor, such as wall or furniture. In some embodiments, the third forward distance is predetermined. In some embodiments, this back and forth movement described is repeated wherein the robotic device repeatedly makes two 90-degree turns separated by some distance before travelling in the opposite direction, such that movement of the robotic device is a boustrophedon pattern, travelling back and forth across the environment. In other embodiments, the directions of rotations are opposite to what is described in this exemplary embodiment. In some embodiments, the robotic device may not be initially facing a wall of which it is in close proximity. The robotic device may begin executing the boustrophedon movement pattern from any area within the environment. In some embodiments, the robotic device performs other movement patterns besides boustrophedon alone or in combination.

In some embodiments, the processor of the robotic fire extinguisher may generate multiple maps of the environment over multiple working sessions. The maps may be stored in a memory of the robotic fire extinguisher and may be combined with previously generated maps to keep the map of the environment up to date. In some embodiments, a predetermined map of the environment may be generated and stored in an internal memory of the robotic fire extinguisher. In some embodiments, the robotic fire extinguisher may generate a map of the environment during operation in the environment. In some embodiments, the processor may update the internal map of the environment with observations collected during each successive work session. Continuous updates to the map of the environment may help establish the most efficient path of the robotic fire extinguisher. In some embodiments, the processor of the robotic fire extinguisher generates a local map and a global map. In some embodiments, the processor integrates the local map into the global map. In some embodiments, the processor only observes a portion of the global map that is local relative to the location of the robotic fire extinguisher. In some embodiments, one or more local maps are superimposed on a global map. In some instances, local maps are combined to create a global map. In some instances. The processor generates a local map and determines its location based on locating the local map within the global map by detecting similar features between the two maps.

The robotic fire extinguisher may, for example, use the map to autonomously navigate the environment during operation, e.g., accessing the map to determine that a candidate route is blocked by an obstacle denoted in the map, to select a route with a route-finding algorithm from a current point to a target point, or the like. To avoid false detection of an obstacle, in some embodiments, the processor assigns each location within the map an obstacle probability indicating the probability of an obstacle existing in each respective location. The obstacle probability assigned to a particular location increases each time an obstacle is observed in the particular location, and the processor qualifies an obstacle as existing in a particular location only when the obstacle probability is greater than a predetermined threshold. For example, all locations in a map are initially set to an obstacle probability of 0.25 (i.e., 25% chance that an obstacle exists in each location). When an obstacle is observed in a particular location, the obstacle probability increases to 0.325, and if observed a second time in the same particular location the obstacle probability increases to 0.3925, and so on. When the obstacle probability assigned to a particular location is greater than 0.325, the processor qualifies an obstacle as existing in the particular location. In some embodiments, the map is stored in memory for future use. Storage of the map may be in temporary memory such that a stored map is only available during an operational session or in more permanent forms of memory such that the map is available at the next session or startup. In some embodiments, the map is further processed to identify rooms and other segments. Examples of methods for dividing an environment into zones are described in U.S. patent application Ser. Nos. 14/817,952, 16/198,393, and 15/619,449, the entire contents of which are hereby incorporated by reference. In some embodiments, a new map is constructed at each use, or an extant map is updated based on newly acquired data.

In some embodiments, the memory of the robotic fire extinguisher may include an internal database of obstacles likely to be encountered within the environment. In some embodiments, an obstacle encountered in the environment may be identified using various sensors to capture features of the obstacle and the processor may determine the type of obstacle based on the internal database. The processor may note the increased likelihood of that type of obstacle being located in the region of the environment in which it was encountered. In some embodiments, the processor may mark the location in the map. For example, images sensors of the robotic fire extinguisher continuously capture images, and if the robotic fire extinguisher encounters a wire on the floor, the processor analyzes images of the wire to extract features of the obstacle and compares them with features of obstacles within the internal database to determine that it is a wire. The processor may mark the region in which the wire was encountered within an internal map as a region with increased likelihood of containing a wire. In some embodiments, the processor may further determine if an obstacle may be overcome by the robotic fire extinguisher. For example, the processor may determine if the wire is an obstacle that may be overcome by the robotic fire extinguisher by, for example, driving over the wire. If so, the robotic fire extinguisher may attempt to drive over the obstacle. If, however, the robotic fire extinguisher encounters a large obstacle, such as a chair or table, the processor may determine that it cannot overcome the obstacle and may attempt to maneuver around the obstacle and continue along its path. In some embodiments, regions wherein obstacles are consistently encountered may be classified by the processor as a high obstacle density area and may be marked in the map of the environment. In some embodiments, the processor may attempt to alter its path to avoid high obstacle density areas. In some embodiments, the processor may alert a user when an unanticipated obstacle blocking the path of the robotic fire extinguisher is encountered, particularly when the robotic fire extinguisher may not overcome the obstacle by maneuvering around or driving over the obstacle. The robotic fire extinguisher may alert the user by generating a noise, sending a message to an application of a communication device paired with the robotic fire extinguisher or any other device paired with the robotic fire extinguisher, displaying a message on a screen of the robotic fire extinguisher, illuminating lights, and the like.

In some embodiments, the robotic fire extinguisher is configured with a first exteroceptive sensor (e.g., depth sensor) and a second proprioceptive sensor (e.g., gyroscope, such as in a three or six axis inertial measurement unit (IMU), the data of which the processor uses simultaneously and interchangeably for mapping and localization of the robotic fire extinguisher. In some embodiments, data from one sensor is used in a primary method for mapping and localization while data from the other sensor is used in a secondary method for mapping and localization. The processor uses the secondary method for mapping and localization when, for example, the sensor used in the primary method for mapping and localization malfunctions, becomes unusable or is functionally affected by the environment. For example, in direct sunlight a first exteroceptive sensor, such as a depth camera, may not provide the reliable readings required for a primary method for mapping and localization. In such instances, the processor uses a secondary method for mapping and localization using data from a second proprioceptive sensor, such as a gyroscope, to localize the robotic fire extinguisher and mark the area covered by the robotic fire extinguisher such that repeat coverage is avoided. The transition between the primary and secondary method may be seamless (e.g., occurring within less than 10 seconds, less than 1 second, or less than 500 milliseconds, and resulting in less than 1 cm, 10 cm, or 50 cm of error in position over 10 seconds of travel) and may be controlled with a finite state machine. In some embodiments, the processor uses the secondary method to verify output of the primary method. In some embodiments, one sensor is active (e.g., depth sensor emitting light to the environment and measuring reflected light) and the other sensor is passive (e.g., gyroscope measuring movement). For example, data from a digital camera (i.e., passive sensor) is used in a primary method for mapping and localization and data from a wheel encoder (i.e., active sensor) is used in a secondary method for mapping and localization.

In some embodiments, IMU measurements in a multichannel stream indicative of acceleration along three or six axes may be integrated over time to infer a change in pose of the robotic fire extinguisher, e.g., with a Kalman filter. In some cases, the change in pose may be expressed as a movement vector in the frame of reference of the room through which the robotic fire extinguisher moves. Some embodiments may localize the robotic fire extinguisher or map the room based on this movement vector (and contact sensors in some cases) even if the camera is inoperative or degraded. In some cases, IMU measurements may be combined with image-based (or other exteroceptive) mapping data in a map or localization determination. Or in some cases, data from one active sensor may be used at a time for localization or mapping, and the other sensor may remain passive, e.g., sensing data, but that data may not be used for localization or mapping while the other sensor is active. Some embodiments may maintain a buffer of sensor data from the passive sensor (e.g., including measurements over a preceding duration, like one second or ten seconds), and upon failover from the active sensor to the passive sensor, which may then become active, some embodiments may access the buffer to infer a current position or map features based on both currently sensed data and buffered data. In some embodiments, the buffered data may be calibrated to the location or mapped features from the formerly active sensor, e.g., with the above-described sensor fusion techniques.

In some embodiments, cliffs are marked as obstacles in the map. In some embodiments, cliffs are detected using edge sensors, such as those described in U.S. patent application Ser. Nos. 14/941,385, 16/279,699, and 16/041,470. In some embodiments, the cliffs marked as obstacles in the map prevent the robotic fire extinguisher from visiting the cliff area more than one time. Without the cliffs marked as obstacles in the map, the robotic fire extinguisher may attempt to visit the cliff area multiple times. Although the cliffs are detected by the edge detection sensors and prevent the robotic fire extinguisher from moving past the cliff, the processor may not learn that the cliff area is off limits and may try to visit the cliff area multiple times. By adding cliffs to the map as obstacles, the robotic fire extinguisher may avoid returning to cliff area again during the same work session and in future work sessions if the map is saved. In some embodiments, the processor treats the cliff area as a perimeter of the environment and directs the robotic fire extinguisher to move along a smooth line parallel to the cliff line as it if was a wall.

In some instances where linear algebra is used, Basic Linear Algebra Subprograms (BLAS) may be implemented to carry out operations such as vector addition, vector norms, scalar multiplication, matrix multiplication, matric transpose, matrix-vector multiplication, linear combinations, dot products, cross products, and the like.

The techniques described herein, e.g., such as mapping and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a mapping chip or a processing chip with a mapping processing unit may be used.

In some embodiments, the processor localizes itself during mapping or during operation. In some embodiments, methods of localization are inherently independent from mapping and path planning but may be used in tandem with any mapping or path planning method or may be used independently to localize the robotic fire extinguisher irrespective of the path or map of the environment. In some embodiments, the processor uses quantum SLAM.

In some embodiments, the processor localizes the robotic fire extinguisher within an environment represented by a phase space or Hilbert space. In some embodiments, the space includes all possible states of the robotic fire extinguisher within the space. In some embodiments, a probability distribution may be used by the processor of the robotic fire extinguisher to approximate the likelihood of the state of the robotic fire extinguisher being within a specific region of the space. In some embodiments, the processor of the robotic fire extinguisher determines a phase space probability distribution over all possible states of the robotic fire extinguisher within the phase space using a statistical ensemble including a large collection of virtual, independent copies of the robotic fire extinguisher in various states of the phase space. In some embodiments, the phase space consists of all possible values of position and momentum variables. In some embodiments, the processor represents the statistical ensemble by a phase space probability density function $\rho(p, q, t)$, q and p denoting position and velocity vectors. In some embodiments, the processor uses the phase space probability density function $\rho(p, q, t)$ to determine the probability $\rho(p, q, t)dq\,dp$ that the Robotic fire extinguisher at time t will be found in the infinitesimal phase space volume dq dp. In some embodiments, the phase space probability density function $\rho(p, q, t)$ has the properties $\rho(p, q, t) \geq 0$ and $\int \rho(p, q, t)d(p, q)=1, \forall t \geq 0$, and the probability of the position q lying within a position interval a, b is $P[a \leq q \leq b] = \int_a^b \int \rho(p, q, t)dpdq$. Similarly, the probability of the velocity p lying within a velocity interval c, d is $P[c \leq q \leq d] = \int_c^d \int (p, q, t)dqdp$. In some embodiments, the processor determines values by integration over the phase space. For example, the processor determines the expectation value of the position q by $\langle q \rangle = \int q\, \rho(p, q, t)\, d(p, q)$.

In some embodiments, the processor evolves each state within the ensemble over time t according to an equation of motion. In some embodiments, the processor models the motion of the Robotic fire extinguisher using a Hamiltonian dynamical system with generalized coordinates q, p wherein dynamical properties are modeled by a Hamiltonian function H. In some embodiments, the function represents the total energy of the system. In some embodiments, the processor represents the time evolution of a single point in the phase space using Hamilton's equations $$\frac{dp}{dt} = -\frac{\partial H}{\partial q}, \frac{dq}{dt} = \frac{\partial H}{\partial p}.$$

In some embodiments, the processor evolves the entire statistical ensemble of phase space density function $\rho(p, q, t)$ under a Hamiltonian H using the Liouville equation $$\frac{\partial \rho}{\partial t} = -\{\rho, H\},$$

wherein $\{\cdot,\cdot\}$ denotes the Poisson bracket and H is the Hamiltonian of the system. For two functions $f$, g on the phase space, the Poisson bracket is given by $$\{f, g\} = \sum_{i=1}^{N} \left( \frac{\partial f}{\partial q_i} \frac{\partial g}{\partial p_i} - \frac{\partial f}{\partial p_i} \frac{\partial g}{\partial q_i} \right).$$

In this approach, the processor evolves each possible state in the phase space over time instead of keeping the phase space density constant over time, which is particularly advantageous if sensor readings are sparse in time.

In some embodiments, the processor evolves the phase space probability density function $\rho(p, q, t)$ over time using the Fokker-Plank equation which describes the time evolution of a probability density function of a particle under drag and random forces. In comparison to the behavior of the robotic fire extinguisher modeled by both the Hamiltonian and Liouville equations, which are purely deterministic, the Fokker-Planck equation includes stochastic behaviour. Given a stochastic process with $dX_t = \mu(X_t, t)dt + \sigma(X_t, t)dW_t$, wherein $X_t$ and $\mu(X_t, t)$ are M-dimensional vectors, $\sigma(X_t, t)$ is a M×P matrix, and $W_t$ is a P-dimensional standard Wiener process, the probability density p(x, t) for $X_t$ satisfies the Fokker-Planck equation $$\frac{\partial p(x, t)}{\partial t} =$$

$$-\sum_{i=1}^{M} \frac{\partial}{\partial x_i} [\mu_i(x, t)p(x, t)] + \sum_{i=1}^{M} \sum_{j=1}^{M} \frac{\partial^2}{\partial x_i \partial x_j} [D_{ij}(x, t)p(x, t)]$$

with drift vector $\mu = (\mu_1, \ldots, \mu_M)$ and diffusion tensor $$D = \frac{1}{2}\sigma\sigma^T.$$

In some embodiments, the processor adds stochastic forces to the motion of the robotic fire extinguisher governed by the Hamiltonian H and the motion of the robotic fire extinguisher is then given by the stochastic differential equation $$dX_t = \begin{pmatrix} dq \\ dp \end{pmatrix} = \begin{pmatrix} +\frac{\partial H}{\partial p} \\ -\frac{\partial H}{\partial q} \end{pmatrix} dt = \begin{pmatrix} 0_N \\ \sigma_N(p, q, t) \end{pmatrix} dW_t,$$

wherein $\sigma_N$ is a N×N matrix and $dW_t$ is a N-dimensional Wiener process. This leads to the Fokker-Plank equation $$\frac{\partial \rho}{\partial t} = -\{\rho, H\} + \nabla_p \cdot (D \nabla_p \rho),$$

wherein $\nabla_p$ denotes the gradient with respect to position p, $\nabla \cdot$ denotes divergence, and $$D = \frac{1}{2} \sigma_N \sigma_N^T$$

is the diffusion tensor.

In other embodiments, the processor incorporates stochastic behaviour by modeling the dynamics of the robotic fire extinguisher using Langevin dynamics, which models friction forces and perturbation to the system, instead of Hamiltonian dynamics. The Langevian equations are given by $M\ddot{q} = -\nabla_q U(q) - \gamma p + \sqrt{2\gamma k_B TM} \, R(t)$, wherein $(-\gamma p)$ are friction forces, $R(t)$ are random forces with zero-mean and delta-correlated stationary Gaussian process, T is the temperature, $k_B$ is Boltzmann's constant, $\gamma$ is a damping constant, and M is a diagonal mass matrix. In some embodiments, the Langevin equation is reformulated as a Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

that the processor uses to evolve the phase space probability density function over time. In some embodiments, the second order term $\nabla_p \cdot (\gamma M \nabla_p \rho)$ is a model of classical Brownian motion, modeling a diffusion process. In some embodiments, partial differential equations for evolving the probability density function over time may be solved by the processor of the robotic fire extinguisher using, for example, finite difference and/or finite element methods.

Figure 13A:
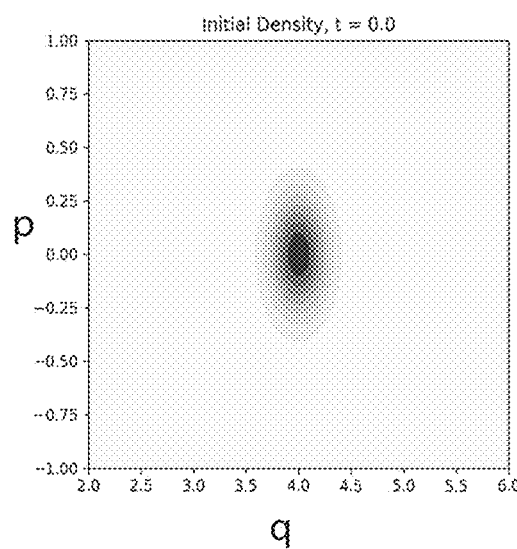
FIG. 13A illustrates an example of an initial phase space probability density of a robotic device, according to some embodiments.
Figure 13B:
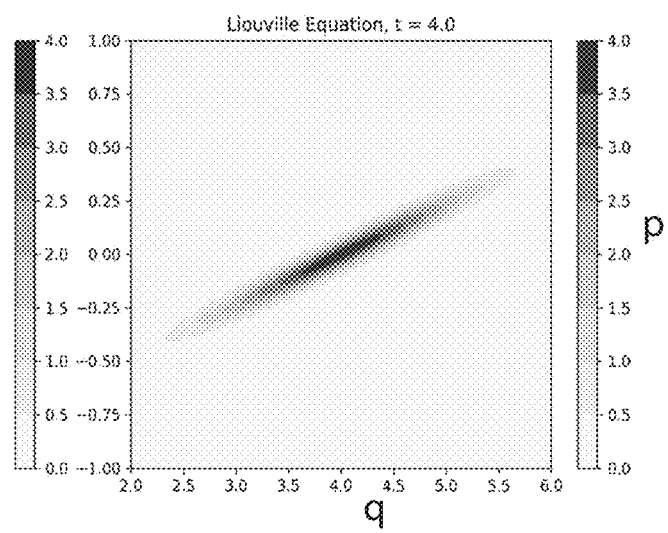
FIGS. 13B-13D illustrates examples of the time evolution of the phase space probability density, according to some embodiments.

FIG. 13A illustrates an example of an initial phase space probability density of a robotic fire extinguisher, a Gaussian in (q, p) space. FIG. 13B illustrates an example of the time evolution of the phase space probability density after four time units when evolved using the Liouville equation incorporating Hamiltonian dynamics, $$\frac{\partial \rho}{\partial t} = -\{\rho, H\}$$

with Hamiltonian $$H = \frac{1}{2} p^2.$$

Figure 13C:
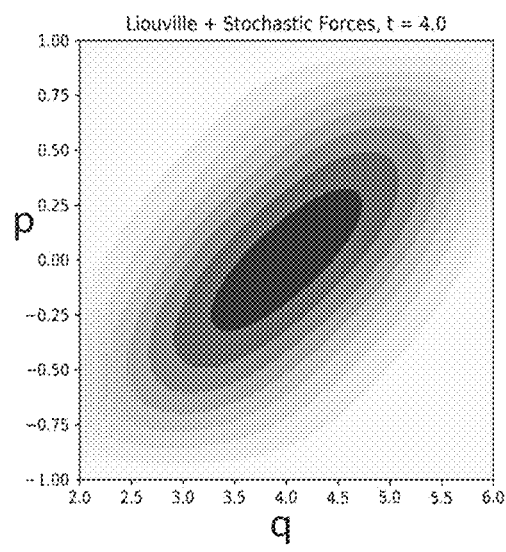
Figure 13D:
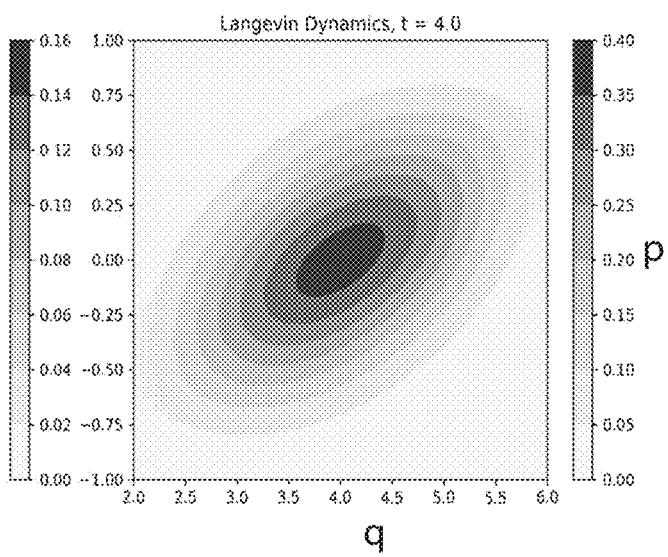

FIG. 13C illustrates an example of the time evolution of the phase space probability density after four time units when evolved using the Fokker-Planck equation incorporating Hamiltonian dynamics, $$\frac{\partial \rho}{\partial t} = -\{\rho, H\} + \nabla_p \cdot (D \nabla_p \rho)$$

with D=0.1. FIG. 13D illustrates an example of the time evolution of the phase space probability density after four time units when evolved using the Fokker-Planck equation incorporating Langevin dynamics, $$\frac{\partial \rho}{\partial t} = -\{\rho, H\} + \nabla_p \cdot (\gamma p \rho) + k_B T \nabla_p \cdot (\gamma M \nabla_p \rho)$$

with $\gamma=0.5$, T=0.2, and $k_B=1$. FIG. 13B illustrates that the Liouville equation incorporating Hamiltonian dynamics conserves momentum over time, as the initial density in FIG. 13A was only distorted in the q-axis (position). In comparison, FIGS. 13C and 13D illustrate diffusion along the p-axis (velocity) as well, as both evolution equations account for stochastic forces. With the Fokker-Planck equation incorporating Hamiltonian dynamics the density spread more equally (FIG. 13C) as compared to the Fokker-Planck equation incorporating Langevin dynamics where the density remained more confined (FIG. 13D) due to the additional friction forces.

In some embodiments, the processor of the robotic fire extinguisher may update the phase space probability distribution when the processor receives readings (or measurements or observations). Any type of reading that may be represented as a probability distribution that describes the likelihood of the state of the robotic fire extinguisher being in a particular region of the phase space may be used. Readings may include measurements or observations acquired by sensors of the robotic fire extinguisher or external devices such as a Wi-Fi™ camera. Each reading may provide partial information on the likely region of the state of the robotic fire extinguisher within the phase space and/or may exclude the state of the robotic fire extinguisher from being within some region of the phase space. For example, a depth sensor of the robotic fire extinguisher may detect an obstacle in close proximity to the robotic fire extinguisher. Based on this measurement and using a map of the phase space, the processor of the robotic fire extinguisher may reduce the likelihood of the state of the robotic fire extinguisher being any state of the phase space at a great distance from an obstacle. In another example, a reading of a floor sensor of the robotic fire extinguisher and a floor map may be used by the processor of the robotic fire extinguisher to adjust the likelihood of the state of the robotic fire extinguisher being within the particular region of the phase space coinciding with the type of floor sensed. In an additional example, a measured Wi-Fi™ signal strength and a map of the expected Wi-Fi™ signal strength within the phase space may be used by the processor of the robotic fire extinguisher to adjust the phase space probability distribution. As a further example, a Wi-Fi™ camera may observe the absence of the robotic fire extinguisher within a particular room. Based on this observation the processor of the robotic fire extinguisher may reduce the likelihood of the state of the robotic fire extinguisher being any state of the phase space that places the robotic fire extinguisher within the particular room. In some embodiments, the processor generates a simulated representation of the environment for each hypothetical state of the robot. In some embodiments, the processor compares the measurement against each simulated representation of the environment (e.g., a floor map, a spatial map, a Wi-Fi map, etc.) corresponding with a perspective of each of the hypothetical states of the robot. In some embodiments, the processor chooses the state of the robot that makes the most sense as the most feasible state of the robot. In some embodiments, the processor selects additional hypothetical states of the robot as a backup to the most feasible state of the robot.

In some embodiments, the processor of the robotic fire extinguisher may update the current phase space probability distribution $\rho(p, q, t_i)$ by re-weighting the phase space probability distribution with an observation probability distribution $m(p, q, t_i)$ according to $$\overline{p}(p, q, t_i) = \frac{\rho(p, q, t_i) \cdot m(p, q, t_i)}{\int \rho(p, q, t_i) m(p, q, t_i) d(p, q)}.$$

In some embodiments, the observation probability distribution may be determined by the processor of the robotic fire extinguisher for a reading at time $t_i$ using an inverse sensor model. In some embodiments, wherein the observation probability distribution does not incorporate the confidence or uncertainty of the reading taken, the processor of the robotic fire extinguisher may incorporate the uncertainty into the observation probability distribution by determining an updated observation probability distribution $$\hat{m} = \frac{1-\alpha}{c} + \alpha m$$

that may be used in re-weighting the current phase space probability distribution, wherein $\alpha$ is the confidence in the reading with a value of $0 \leq \alpha \leq 1$ and $c = \iint dpdq$. At any given time, the processor of the robotic fire extinguisher may estimate a region of the phase space within which the state of the robotic fire extinguisher is likely to be given the phase space probability distribution at the particular time.

Figure 14A:
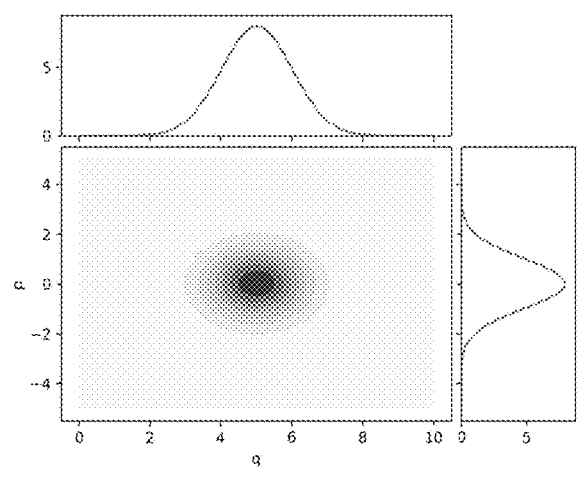
FIGS. 14A-14D illustrate examples of initial phase space probability distributions, according to some embodiments.
Figure 14C:
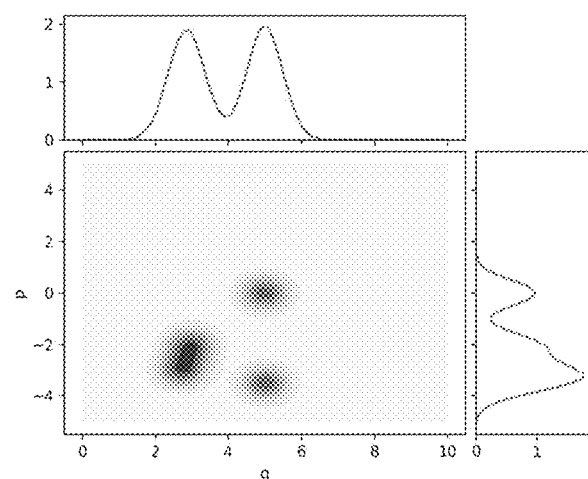
Figure 14B:
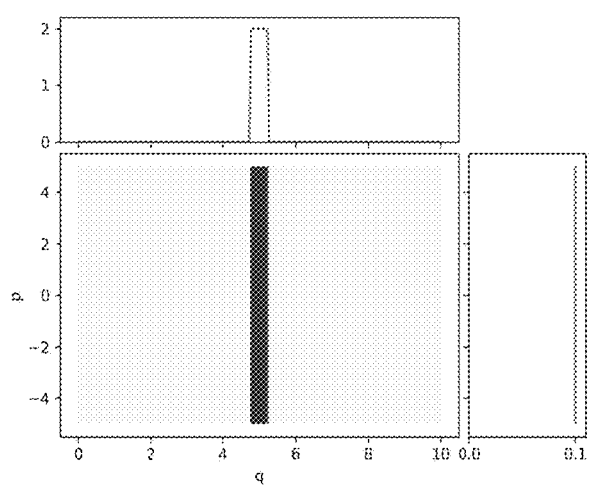
Figure 14D:
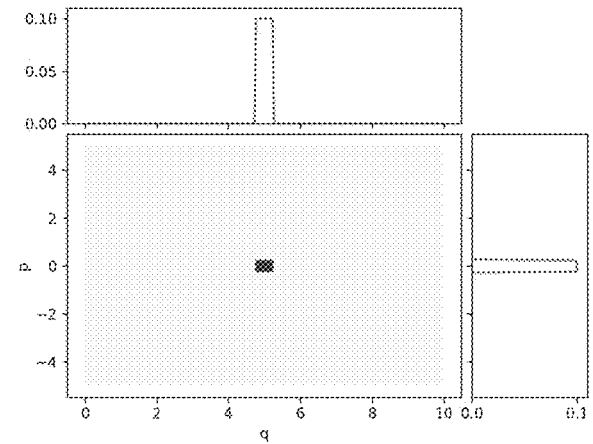

To further explain the localization methods described, examples are provided. In a first example, the processor uses a two-dimensional phase space of the robotic fire extinguisher, including position q and velocity p. The processor confines the position of the robotic fire extinguisher q to an interval [0, 10] and the velocity p to an interval [−5, +5], limited by the top speed of the robotic fire extinguisher, therefore the phase space (p, q) is the rectangle D=[−5, 5]×[0, 10]. The processor uses a Hamiltonian function $$H = \frac{p^2}{2m},$$

with mass m and resulting equations of motion $\dot{p}=0$ and $$\dot{q} = \frac{p}{m}$$

to delineate the motion of the robotic fire extinguisher. The processor adds Langevin-style stochastic forces to obtain motion equations $\dot{p}=-\gamma p+\sqrt{2\gamma m k_B T}R(t)$ and $$\dot{q} = \frac{p}{m},$$

wherein R(t) denotes random forces and m=1. The processor of the robotic fire extinguisher initially generates a uniform phase space probability distribution over the phase space D. FIGS. 14A-14D illustrate examples of initial phase space probability distributions the processor may use. FIG. 14A illustrates a Gaussian distribution over the phase space, centered at q=5, p=0. The robotic fire extinguisher is estimated to be in close proximity to the center point with high probability, the probability decreasing exponentially as the distance of the point from the center point increases. FIG. 14B illustrates uniform distribution for $q \in [4.75, 5.25]$, $p \in [-5, 5]$ over the phase space, wherein there is no assumption on p and q is equally likely to be in [4.75, 5.25]. FIG. 14C illustrates multiple Gaussian distributions and FIG. 14D illustrates a confined spike at q=5, p=0, indicating that the processor is certain of the state of the robotic fire extinguisher.

Figure 15A:
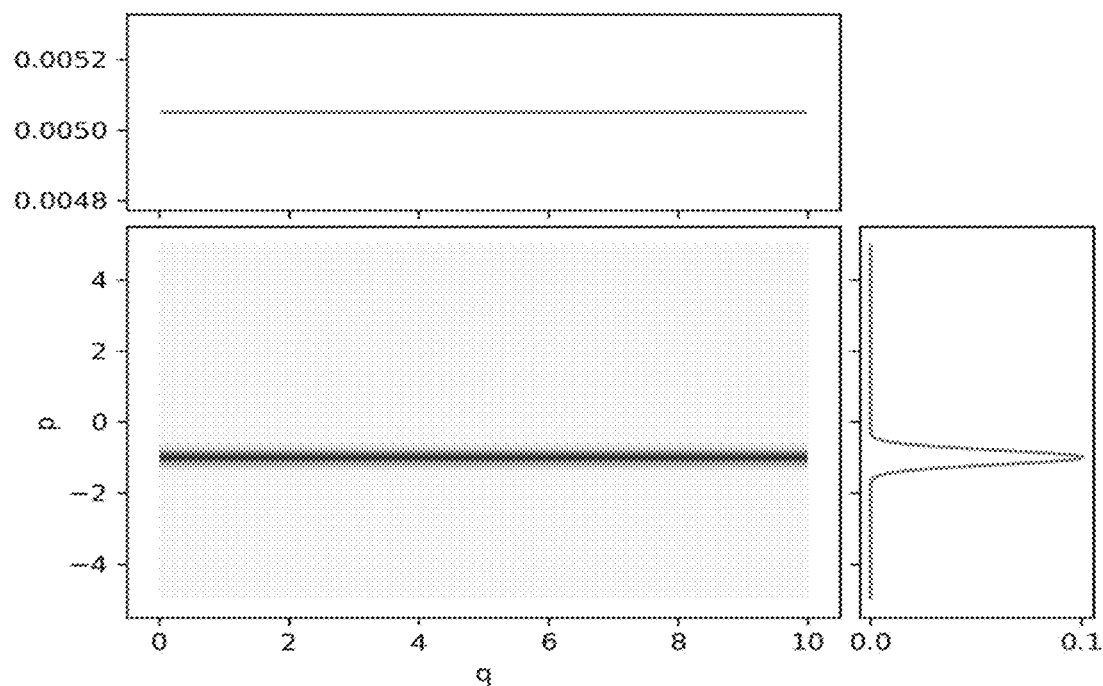
FIGS. 15A and 15B illustrate examples of observation probability distributions, according to some embodiments.
Figure 15B:
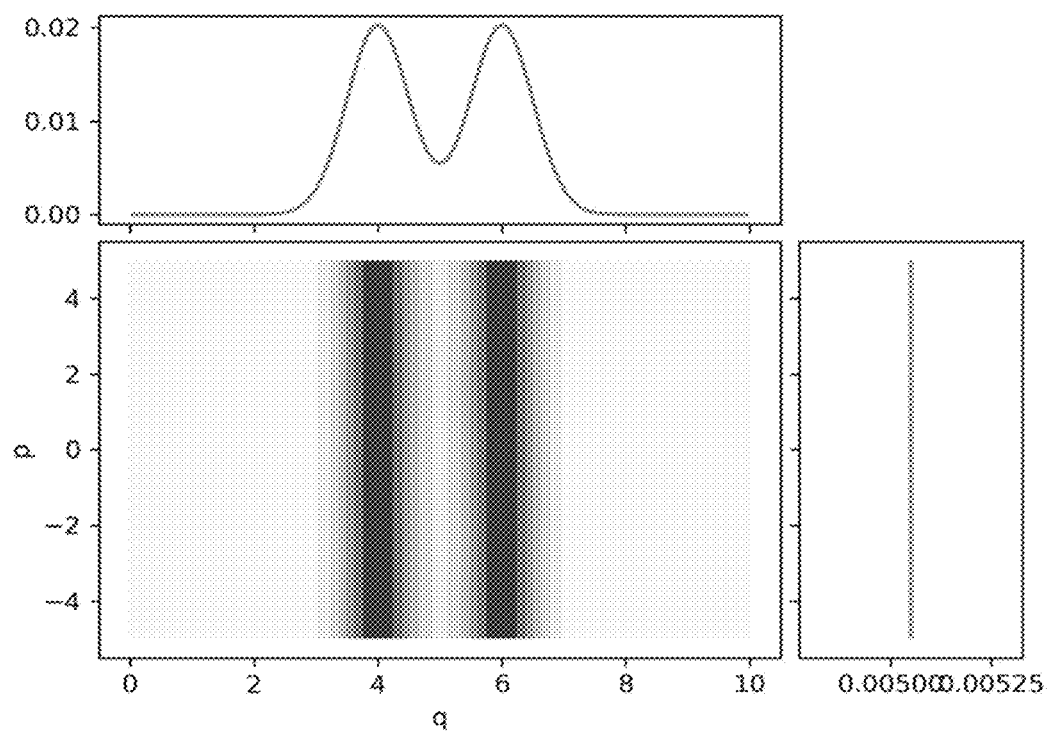

In this example, the processor of the robotic fire extinguisher evolves the phase space probability distribution over time according to Langevin equation $$\frac{\partial \rho}{\partial t} = -\{\rho, H\} + \left(\gamma \frac{\partial}{\partial p}\right) \cdot (p\rho) + \gamma k_B T \frac{\partial^2 \rho}{\partial p^2},$$

wherein $$\{\rho, H\} = p \frac{\partial \rho}{\partial q}$$

and m=1. Thus, the processor solves $$\frac{\partial \rho}{\partial t} = -p \frac{\partial \rho}{\partial q} + \gamma \left(\rho + p \frac{\partial \rho}{\partial p}\right) + \gamma k_B T \frac{\partial^2 \rho}{\partial p^2} \text{ for } t > 0$$

with initial condition $\rho(p, q, 0)=\rho_0$ and homogenous Neumann perimeters conditions. The perimeters conditions govern what happens when the robotic fire extinguisher reaches an extreme state. In the position state, this may correspond to the robotic fire extinguisher reaching a wall, and in the velocity state, it may correspond to the motor limit. The processor of the robotic fire extinguisher updates the phase space probability distribution each time a new reading is received by the processor. FIGS. 15A and 15B illustrate examples of observation probability distributions for odometry measurements and distance measurements, respectively. FIG. 15A illustrates a narrow Gaussian observation probability distribution for velocity p, reflecting an accurate odometry sensor. Position q is uniform as odometry data does not indicate position. FIG. 15B illustrates a bimodal observation probability distribution for position q including uncertainty for an environment with a wall at q=0 and q=10. Therefore, for a distance measurement of four, the robotic fire extinguisher is either at q=4 or q=6, resulting in the bi-modal distribution. Velocity p is uniform as distance data does not indicate velocity. In some embodiments, the processor may update the phase space at periodic intervals or at predetermined intervals or points in time. In some embodiments, the processor of the robotic fire extinguisher may determine an observation probability distribution of a reading using an inverse sensor model and the phase space probability distribution may be updated by the processor by re-weighting it with the observation probability distribution of the reading.

Figure 16:
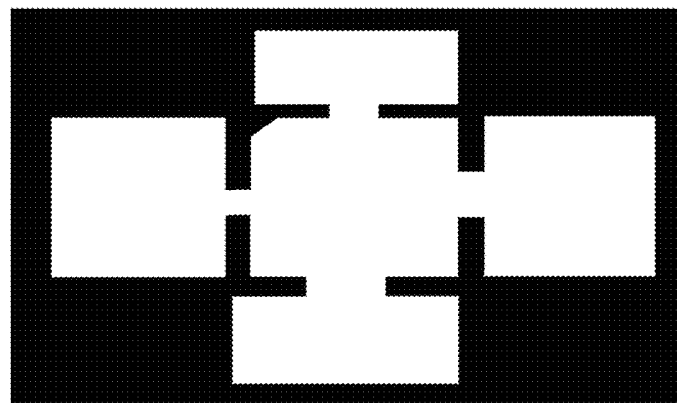
FIG. 16 illustrates an example of a map of an environment, according to some embodiments.
Figure 17A:
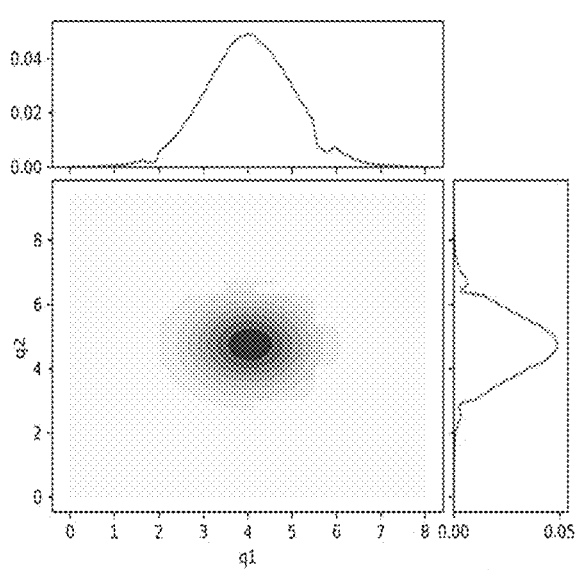
FIGS. 17A-17C illustrate an example of an evolution of a probability density reduced to the $q_1$, $q_2$ space at three different time points, according to some embodiments.
Figure 17B:
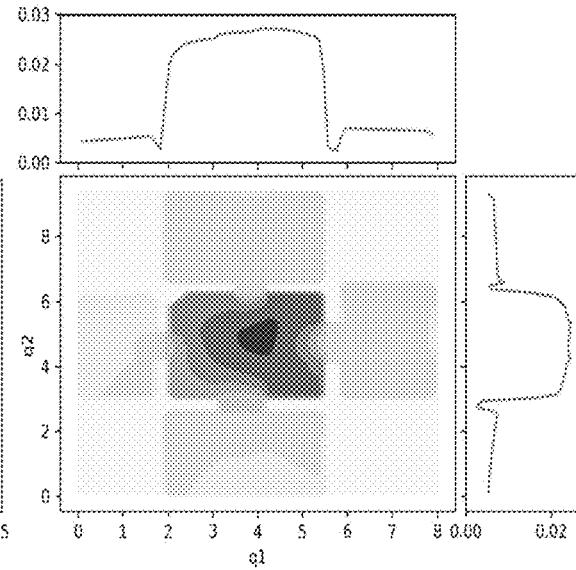
Figure 17C:
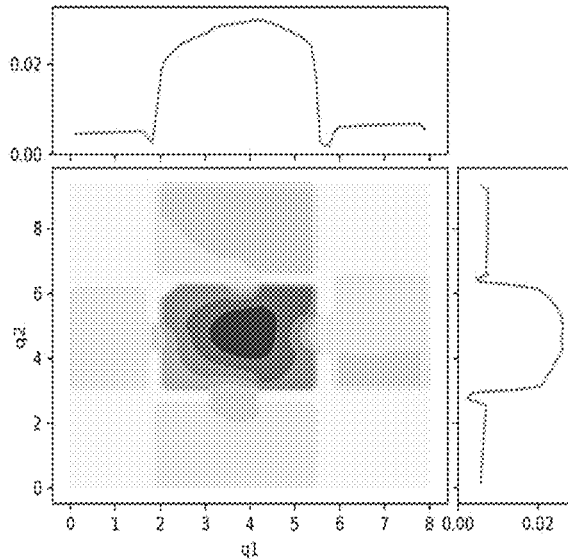
Figure 18A:
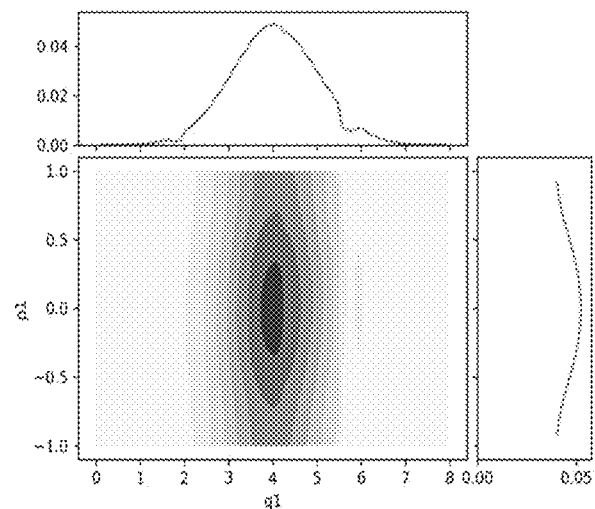
FIGS. 18A-18C illustrate an example of an evolution of a probability density reduced to the $p_1$, $q_1$ space at three different time points, according to some embodiments.
Figure 18B:
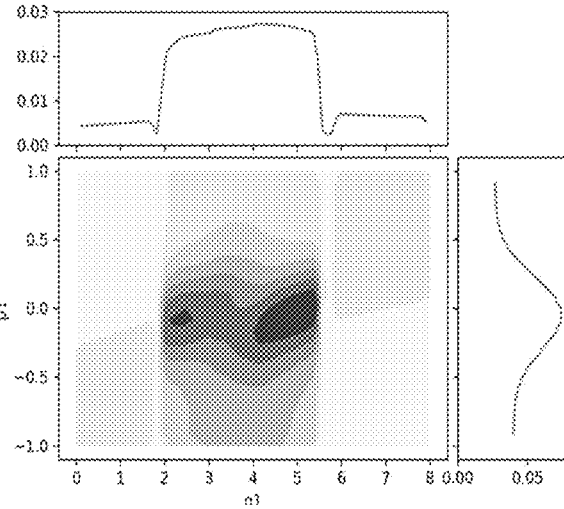
Figure 18C:
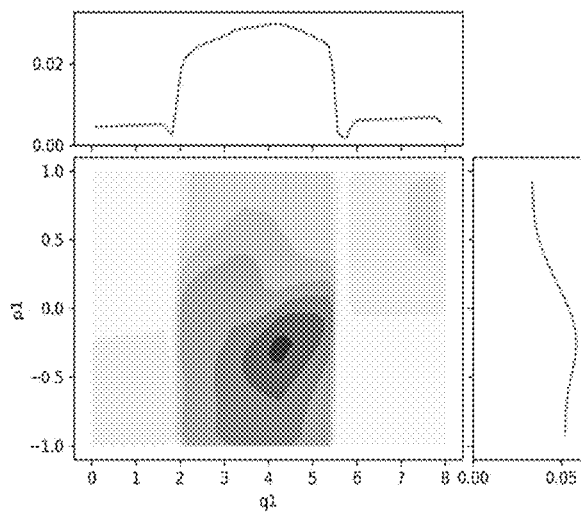
Figure 19A:
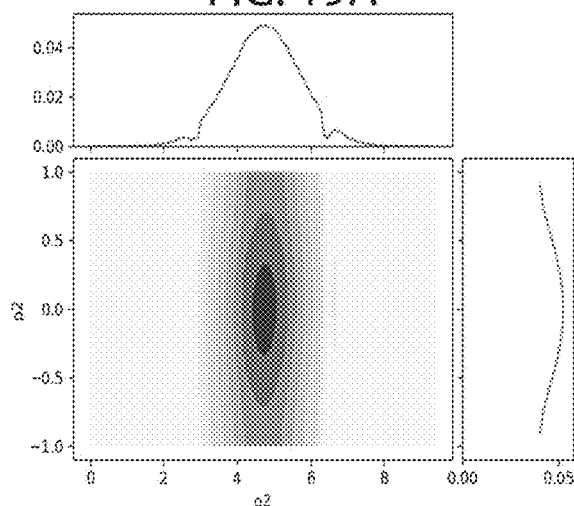
FIGS. 19A-19C illustrate an example of an evolution of a probability density reduced to the $p_2$, $q_2$ space at three different time points, according to some embodiments.
Figure 19B:
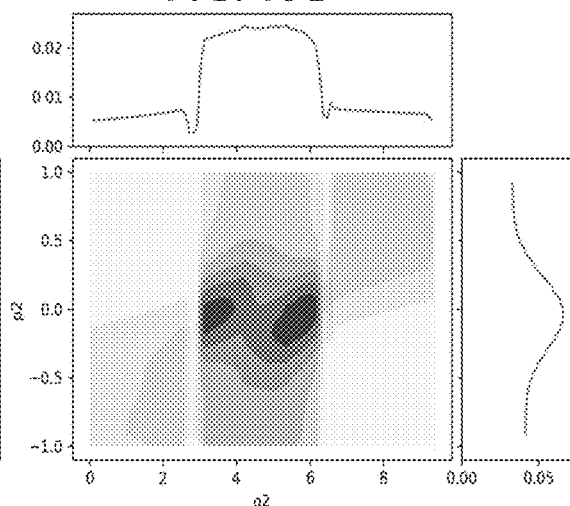
Figure 19C:
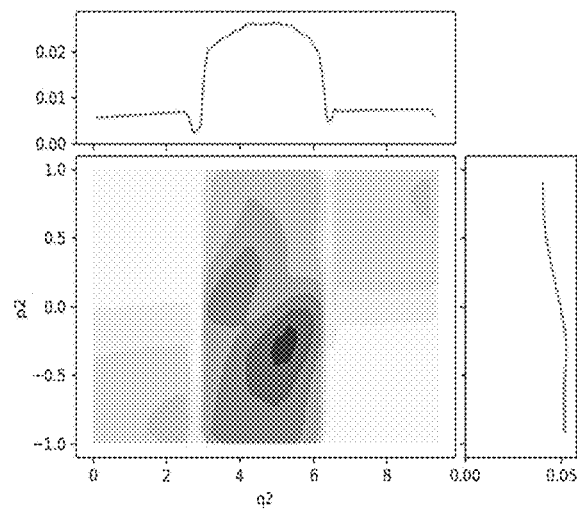
Figure 20:
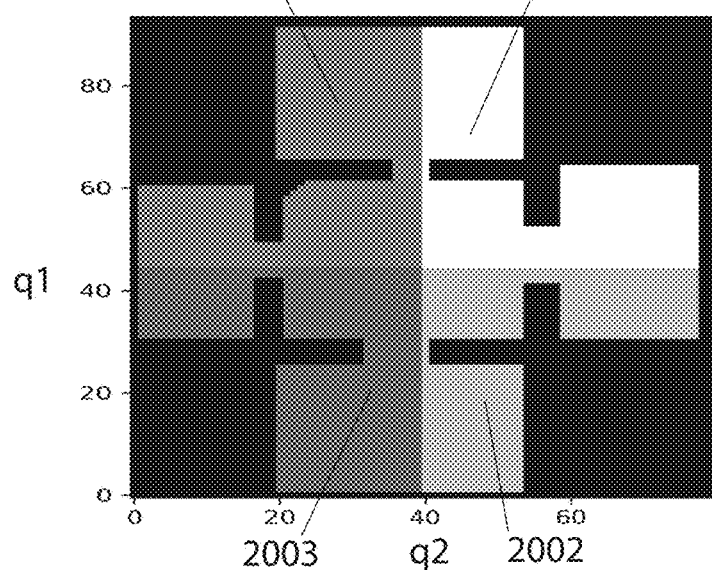
FIG. 20 illustrates an example of a map indicating floor types, according to some embodiments.

The example described may be extended to a four-dimensional phase space with position q=(x, y) and velocity p=($p_x$, $p_y$). The processor solves this four dimensional example using the Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

with M=$I_2$ (2D identity matrix), T=0.1, γ=0.1, and $k_B$=1. In alternative embodiments, the processor uses the Fokker-Planck equation without Hamiltonian and velocity and applies velocity drift field directly through odometry which reduces the dimension by a factor of two. The map of the environment for this example is given in FIG. 16, wherein the white space is the area accessible to the robotic fire extinguisher. The map describes the domain for $q_1$, $q_2 \in$ D. In this example, the velocity is limited to $p_1$, $p_2 \in$ [−1, 1]. The processor models the initial probability density ρ(p, q, 0) as Gaussian, wherein ρ is a four-dimensional function. FIGS. 17A-17C illustrate the evolution of ρ reduced to the $q_1$, $q_2$ space at three different time points (i.e., the density integrated over $p_1$, $p_2$, $\rho_{red}$=∫∫ρ($p_1$, $p_2$, $q_1$, $q_2$)d$p_1$d$p_2$). It can be seen that with increased time, the initial density focused in the middle of the map starts to flow into other rooms. FIGS. 18A-18C illustrate the evolution of ρ reduced to the $p_1$, $q_1$ space and 19A-19C illustrate the evolution of ρ reduced to the $p_2$, $q_2$ space at the same three different time points to show how velocity evolves over time with position. The four-dimensional example is repeated but with the addition of floor sensor data observations. FIG. 20 illustrates a map of the environment indicating different floor types 2000, 2001, 2002, and 2003 with respect to $q_1$, $q_2$. Given that the sensor has no error, the processor may strongly predict the area within which the robotic fire extinguisher is located based on the measured floor type, at which point all other hypothesized locations of the robotic fire extinguisher become invalid. For example, the processor may use the distribution $$m(p_1, p_2, q_1, q_2) = \begin{cases} const > 0, & q_1, q_2 \text{ with the observed floor type} \\ 0, & \text{else} \end{cases}$$

Figure 21:
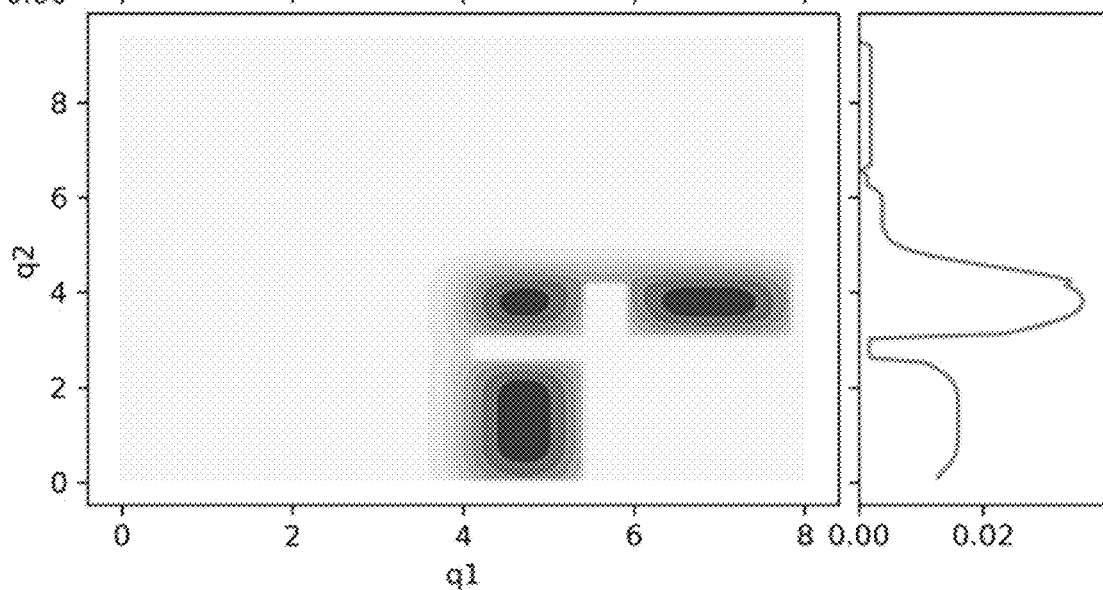
FIG. 21 illustrates an example of an updated probability density after observing floor type, according to some embodiments.
Figure 22:
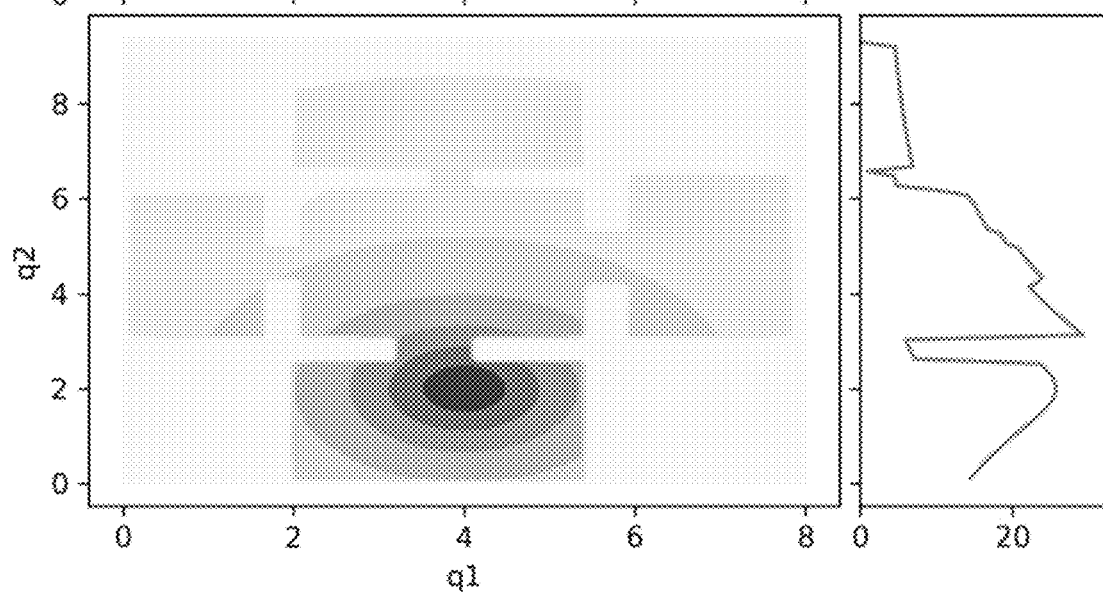
FIG. 22 illustrates an example of a Wi-Fi map, according to some embodiments.
Figure 25:
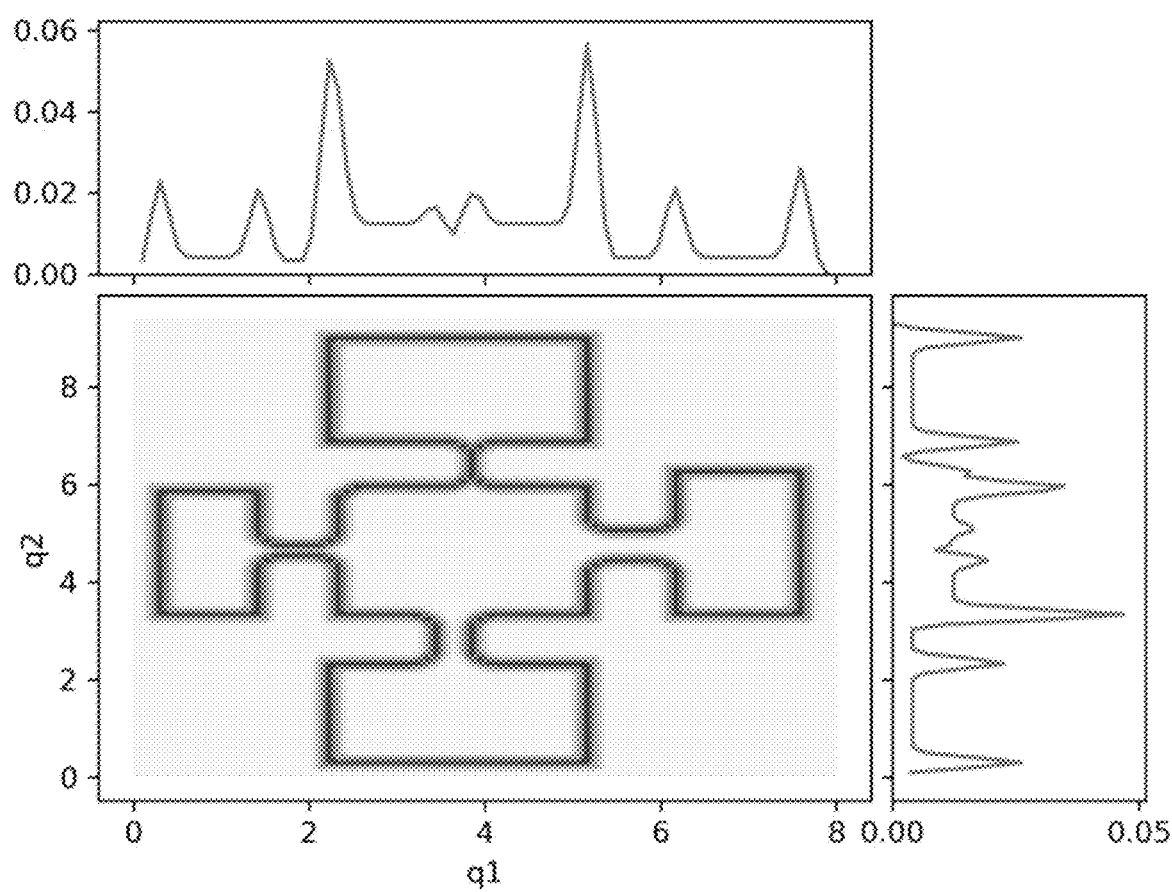
FIG. 25 illustrates an example of an updated probability density after observing distances to a wall, according to some embodiments.
Figure 26:
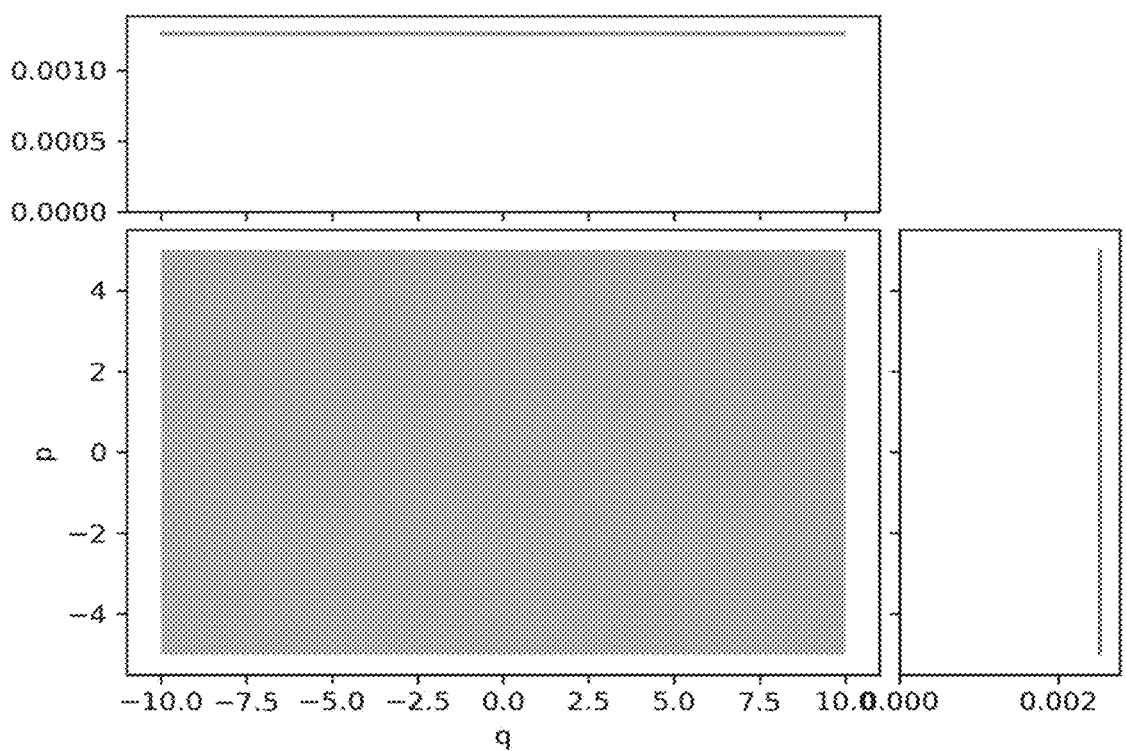
FIGS. 26-29 illustrate an example of an evolution of a probability density of a position of a robotic device as it moves and observes doors, according to some embodiments.

If the sensor has an average error rate ∈, the processor may use the distribution $$m(p_1, p_2, q_1, q_2) = \begin{cases} c_1 > 0, & q_1, q_2 \text{ with the observed floor type} \\ c_2 > 0, & \text{else} \end{cases}$$

with $c_1$, $c_2$ chosen such that $\int_p \int_{D_{obs}} md(q_1, q_2) d(p_1, p_2) = 1-\in$ and $\int_p \int_{D_{obs}^c} md(q_1, q_2) d(p_1, p_2) = \in$. $D_{obs}$ is the $q_1$, $q_2$ with the observed floor type and $D_{obs}^c$ is its complement. By construction, the distribution m has a probability 1−∈ for $q_1$, $q_2 \in D_{obs}$ and probability ∈ for $q_1$, $q_2 \in D_{obs}^c$. Given that the floor sensor measures floor type 2002, the processor updates the probability distribution for position as shown in FIG. 21. Note that the corners of the distribution were smoothened by the processor using a Gaussian kernel, which corresponds to an increased error rate near the borders of an area. Next, Wi-Fi signal strength observations are considered. Given a map of the expected signal strength, such as that in FIG. 22, the processor may generate a density describing the possible location of the robotic fire extinguisher based on a measured Wi-Fi signal strength. The darker areas in FIG. 23 represent stronger Wi-Fi signal strength and the signal source is at $q_1$, $q_2$=4.0, 2.0. Given that the robotic fire extinguisher measures a Wi-Fi signal strength of 0.4, the processor generates the probability distribution for position shown in FIG. 24. The likely area of the robotic fire extinguisher is larger since the Wi-Fi signal does not vary very much. For wall distance measurements, a wall distance map, such as that shown in FIG. 25 may be used by the processor to approximate the area of the robotic fire extinguisher given a distance measured. Given that the robotic fire extinguisher measures a distance of 3 distance units, the processor generates the probability distribution for position shown in FIG. 26. For example, the processor evolves the Fokker-Planck equation over time and as observations are successively taken, the processor re-weights the density function with each observation wherein parts that do not match the observation are considered less likely and parts that highly match the observations relatively increase in probability. An example of observations over time may be, t=1: observe $p_2$=0.75; t=2: observe $p_2$=0.95 and Wi-Fi signal strength 0.56; t=3: observe wall distance 9.2; t=4: observe floor type 2; t=5: observe floor type 2 and Wi-Fi signal strength 0.28; t=6: observe wall distance 3.5; t=7: observe floor type 4, wall distance 2.5, and Wi-Fi signal strength 0.15; t=8: observe floor type 4, wall distance 4, and Wi-Fi signal strength 0.19; t=8.2: observe floor type 4, wall distance 4, and Wi-Fi signal strength 0.19.

Figure 27:
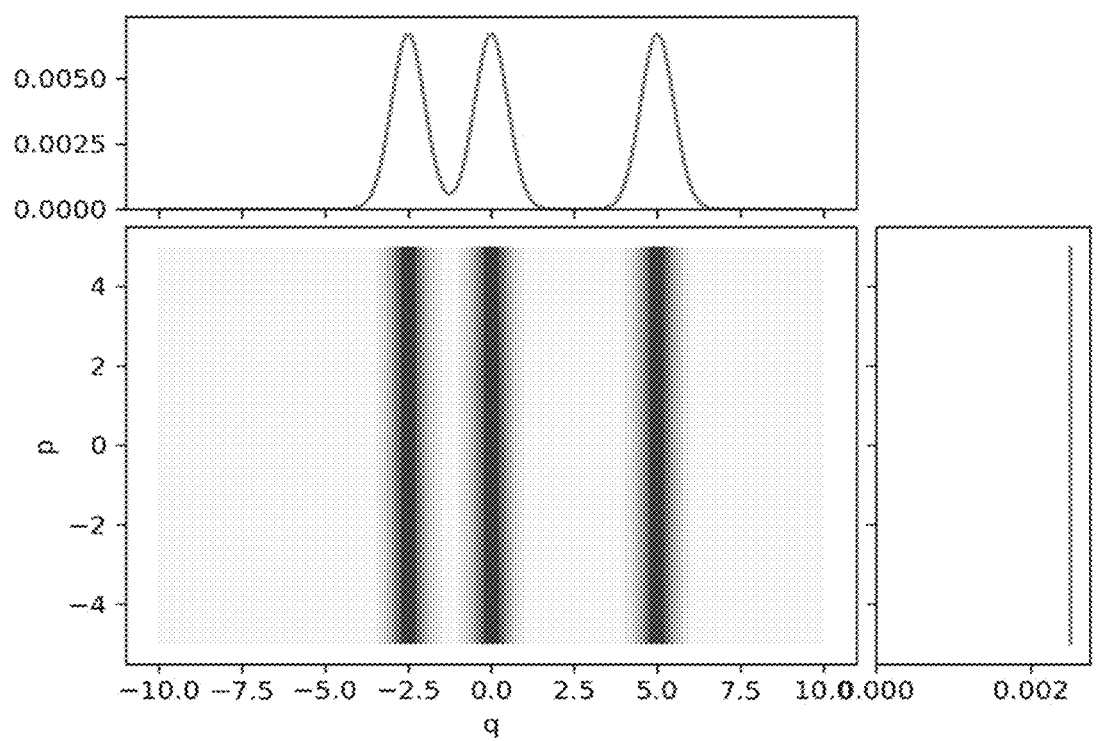
Figure 28:
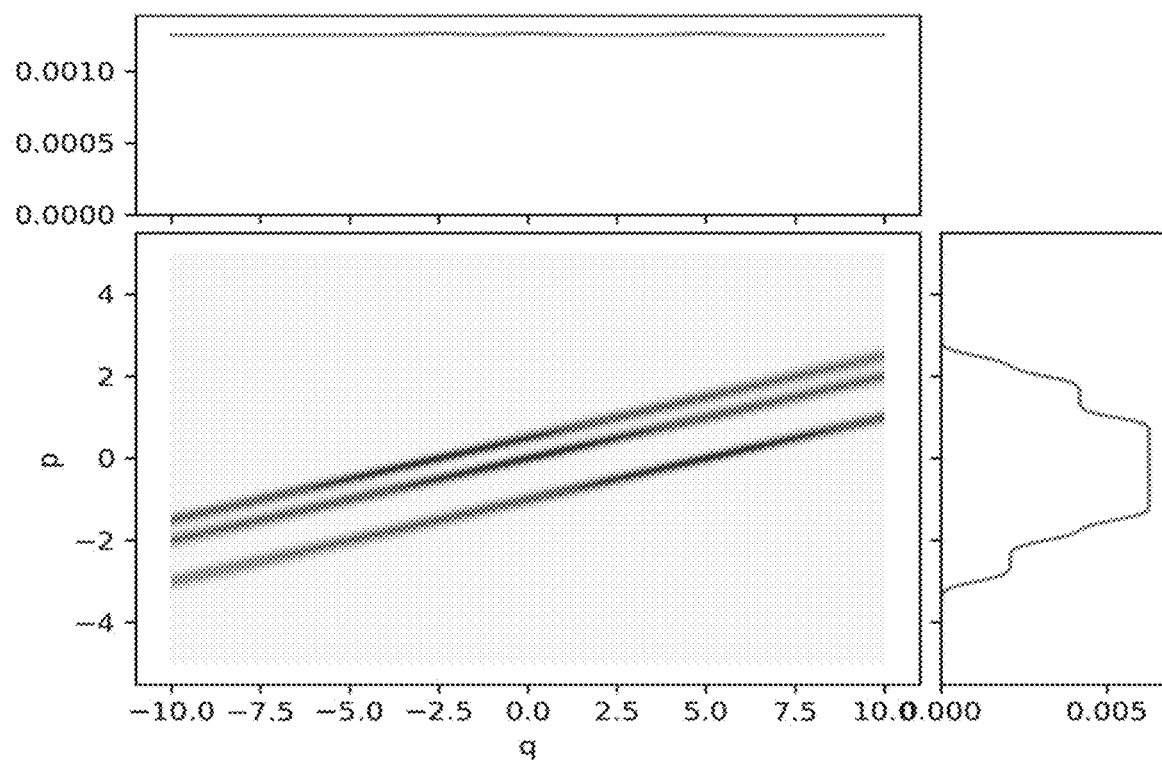
Figure 29:
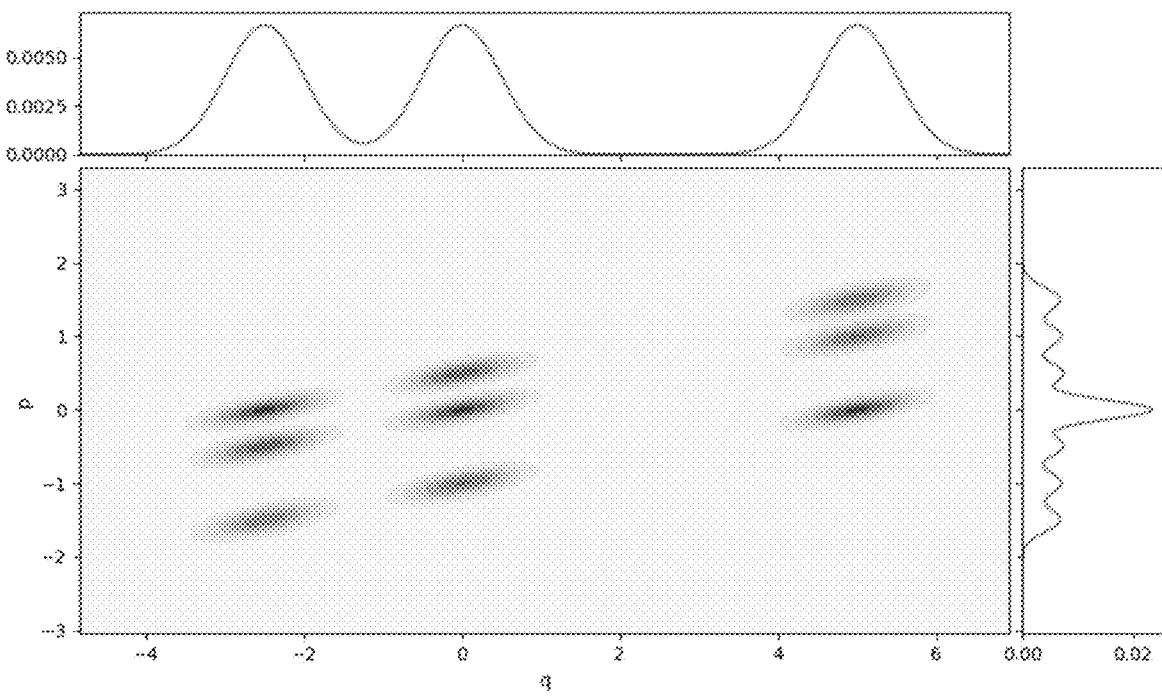

In another example, the robotic fire extinguisher navigates along a long floor (e.g., x-axis, one-dimensional). The processor models the floor using Liouville's equation $$\frac{\partial \rho}{\partial t} = -\{\rho, H\}$$

with Hamiltonian $$H = \frac{1}{2}p^2$$

wherein q∈ [−10, 10] and p∈ [−5, 5]. The floor has three doors at $q_0$=−2.5, $q_1$=0, and $q_2$=5.0 and the processor of the robotic fire extinguisher is capable of determining when it is located at a door based on sensor data observed and the momentum of the robotic fire extinguisher is constant, but unknown. Initially the location of the robotic fire extinguisher is unknown, therefore the processor generates an initial state density such as that in FIG. 27. When the processor determines the robotic fire extinguisher is in front of a door, the possible location of the robotic fire extinguisher is narrowed down, but not the momentum. Therefore, the processor may update the probability density to that shown in FIG. 28. The processor evolves the probability density, and after five seconds the probability is as shown in FIG. 29, wherein the uncertainty in the position space has spread out again given that the momentum is unknown.

However, the evolved probability density keeps track of the correlation between position and momentum. When the processor determines the robotic fire extinguisher is in front of a door again, the probability density is updated to FIG. 30, wherein the density has significantly narrowed down, indicating a number of peaks representing possible location and momentum combinations of the robotic fire extinguisher. For the left door, there is equal likelihood for p=0, p=−0.5, and p=−1.5. These momentum values correspond with the robotic fire extinguisher travelling from one of the three doors in five seconds. This is seen for the other two doors as well.

In some embodiments, the processor models motion of the robotic fire extinguisher using equations $\dot{x}=v \cos \omega$, $\dot{y}=v \sin \omega$, and $\dot{\theta}=\omega$, wherein v and ω are translational and rotational velocities, respectively. In some embodiments, translational and rotational velocities of the robotic fire extinguisher are computed using observed wheel angular velocities $\omega_l$ and $\omega_r$ using $$J\begin{pmatrix} \omega_l \\ \omega_r \end{pmatrix} = \begin{pmatrix} r_l/2 & r_r/2 \\ -r_l/b & r_r/b \end{pmatrix},$$

wherein J is the Jacobian, $r_l$ and $r_r$ are the left and right wheel radii, respectively and b is the distance between the two wheels. Assuming there are stochastic forces on the wheel velocities, the processor of the robotic fire extinguisher evolves the probability density $\rho=(x, y, \theta, \omega_l, \omega_r)$ using $$\frac{\partial \rho}{\partial t} = -\begin{pmatrix} v\cos\theta \\ v\cos\theta \\ \omega \end{pmatrix} \cdot \nabla_q \rho + \nabla_p \cdot (D\nabla_p \rho)$$

wherein $$D = \frac{1}{2}\sigma_N \sigma_N^T$$

is a 2-by-2 diffusion tensor, $q=(x, y, \theta)$ and $p=(\omega_l, \omega_r)$. In some embodiments, the domain is obtained by choosing x, y in the map of the environment, $\theta \in [0, 2\pi)$, and $\omega_l, \omega_r$ as per the robotic fire extinguisher specifications. In some embodiments, solving the equation may be a challenge given it is five-dimensional. In some embodiments, the model may be reduced by replacing odometry by Gaussian density with mean and variance. This reduces the model to a three-dimensional density $\rho=(x, y, \theta)$. In some embodiments, independent equations may be formed for $\omega_l, \omega_r$ by using odometry and inertial measurement unit observations. For example, taking this approach reduces the system to one three-dimensional partial differential equation and two ordinary differential equations. The processor then evolves the probability density over time using $$\frac{\partial \rho}{\partial t} = -\begin{pmatrix} \bar{v}\cos\theta \\ \bar{v}\cos\theta \\ \bar{\omega} \end{pmatrix} \cdot \nabla \rho + \nabla \cdot (D\nabla \rho), t > 0$$

wherein $$D = \begin{pmatrix} dv^2\cos^2\theta & dv^2\sin\theta\cos\theta & 0 \\ dv^2\sin\theta\cos\theta & dv^2\sin^2\theta & 0 \\ 0 & 0 & d\omega^2 \end{pmatrix},$$

$\bar{v}, \bar{\omega}$ represent the current mean velocities, and dv, dω the current deviation. In some embodiments, the processor determines $\bar{v}, \bar{\omega}$ from the mean and deviation of the left and right wheel velocities $\omega_L$ and $\omega_R$ using $$\begin{pmatrix} \bar{v} \\ \bar{\omega} \end{pmatrix} = J\begin{pmatrix} \bar{\omega}_L \\ \bar{\omega}_R \end{pmatrix}.$$

In some embodiments, the processor uses Neumann perimeters conditions for x, y and periodic perimeters conditions for θ.

Figure 30:
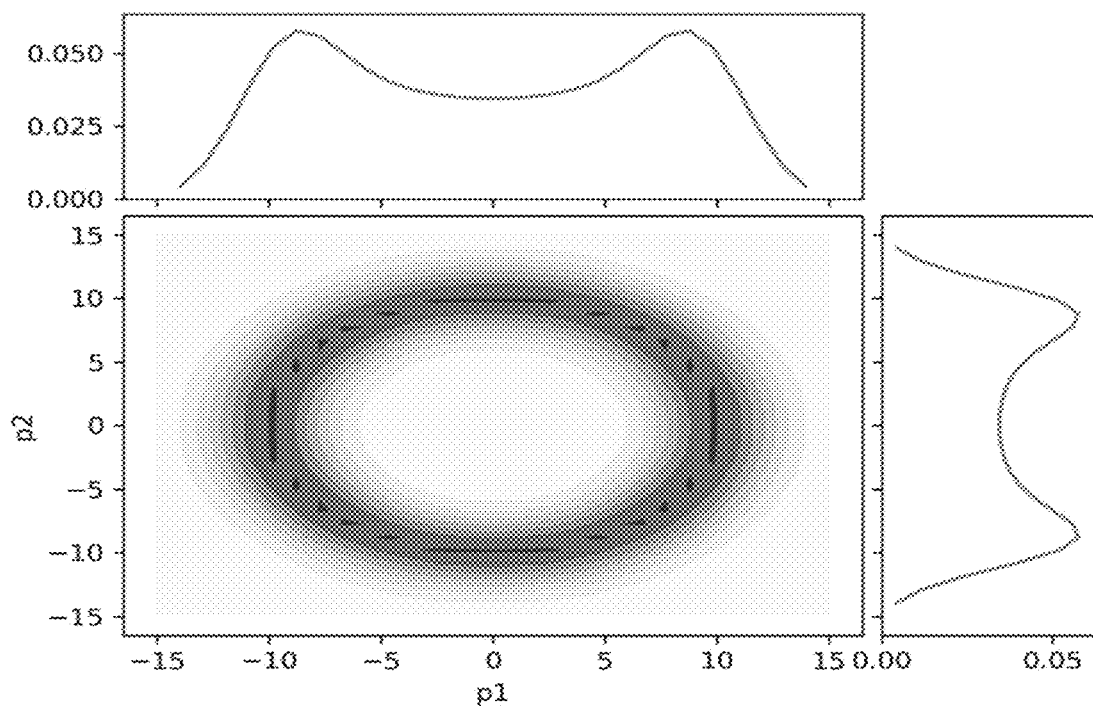
FIG. 30 illustrates an example of a velocity observation probability density, according to some embodiments.
Figure 31:
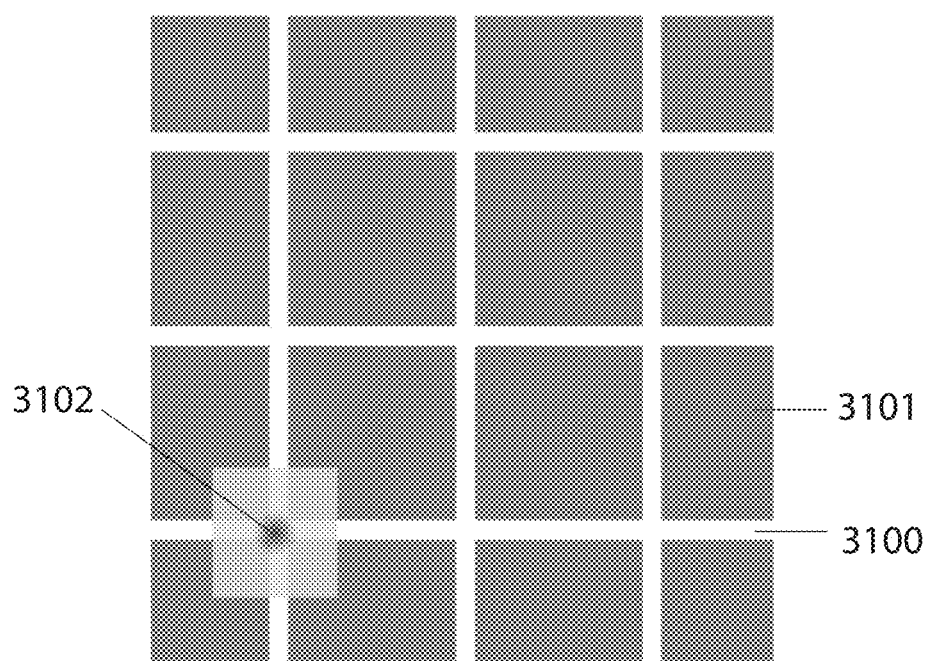
FIG. 31 illustrates an example of a road map, according to some embodiments.

In one example, the processor localizes the robotic fire extinguisher with position coordinate q=(x, y) and momentum coordinate $p=(p_x, p_y)$. For simplification, the mass of the robot is 1.0, the earth is assumed to be planar, and q is a position with reference to some arbitrary point and distance. Thus, the processor evolves the probability density p over time according to $$\frac{\partial \rho}{\partial t} = -p \cdot \nabla_q \rho + \nabla_p \cdot (D\nabla_p \rho),$$

wherein D is as defined above. The processor uses a moving grid, wherein the general location of the robot is only known up to a certain accuracy (e.g., 100 m) and the grid is only applied to the known area. The processor moves the grid along as the probability density evolves over time, centering the grid at the approximate center in the q space of the current probability density every couple time units. Given that momentum is constant over time, the processor uses an interval [−15, 15]×[−15, 15], corresponding to maximum speed of 15 m/s in each spatial direction. The processor uses velocity and GPS position observations to increase accuracy of approximated localization of the robotic device. Velocity measurements provide no information on position, but provide information on $p_x^2+p_y^2$, the circular probability distribution in the p space, as illustrated in FIG. 30 with |p|=10 and large uncertainty. GPS position measurements provide no direct momentum information but provides a position density. The processor further uses a map to exclude impossible states of the robot. For instance, it is impossible to drive through walls and if the velocity is high there is a higher likelihood that the robot is in specific areas. FIG. 31 illustrates a map used by the processor in this example, wherein white areas 3100 indicate low obstacle density areas and gray areas 3101 indicate high obstacle density areas and the maximum off speed in high obstacle density areas is ±5 m/s. Position 3102 is the current probability density collapsed to the $q_1, q_2$ space. In combining the map information with the velocity observations, the processor determines that it is highly unlikely that with an odometry measurement of |p|=10 that the robot is in a position with high obstacle density. In some embodiments, other types of information may be used to improve accuracy of localization. For example, a map to correlate position and velocity, distance to and probability density of other robots using similar technology, Wi-Fi map to extract position, and video footage to extract position.

In some embodiments, the processor uses finite differences methods (FDM) to numerically approximate partial differential equations of the form $$\frac{\partial \rho}{\partial t} = -\{\rho, H\} + \nabla_p \cdot (D\nabla_p \rho).$$

Numerical approximation has two components, discretization in space and in time. The finite difference method relies on discretizing a function on a uniform grid. Derivatives are then approximated by difference equations. For example, a convection-diffusion equation in one dimension and u(x, t) with velocity v, diffusion coefficient $$a, \frac{\partial u}{\partial t} = a\frac{\partial^2 u}{\partial x^2} - v\frac{\partial u}{\partial x}$$

on a mesh $x_0, \ldots, x_j$, and times $t_0, \ldots, t_N$ may be approximated by a recurrence equation of the form $$\frac{u_j^{n+1} - u_j^n}{k} = a\frac{u_{j+1}^n - 2u_j^n + u_{j-1}^n}{h^2} - v\frac{u_{j+1}^n - u_{j-1}^n}{2h}$$

with space grid size h and time step k and $u_j^n \approx u(x_j, t_n)$. The left hand side of the recurrence equation is a forward difference at time $t_n$, and the right hand side is a second-order central difference and a first-order central difference for the space derivatives at $x_j$, wherein $$\frac{u_j^{n+1} - u_j^n}{k} \approx \frac{\partial u(x_j, t_n)}{\partial t}, \frac{u_{j+1}^n - 2u_j^n + u_{j-1}^n}{h^2} \approx \frac{\partial^2 u(x_j, t_n)}{\partial x^2},$$

and $$\frac{u_{j+1}^n - u_{j-1}^n}{2h} \approx \frac{\partial u(x_j, t_n)}{\partial x}.$$

This is an explicit method, since the processor may obtain the new approximation $u_j^{n+1}$ without solving any equations. This method is known to be stable for $$h < \frac{2a}{v}$$

and $$k < \frac{h^2}{2a}.$$

The stability conditions place limitations on the time step size k which may be a limitation of the explicit method scheme. If instead the processor uses a central difference at time $t_{n+1/2}$, the recurrence equation is $$\frac{u_j^{n+1} - u_j^n}{k} = \frac{1}{2}\left(a\frac{u_{j+1}^{n+1} - 2u_j^{n+1} + u_{j-1}^{n+1}}{h^2} - \right.$$

$$\left. v\frac{u_{j+1}^{n+1} - u_{j-1}^{n+1}}{2h} + a\frac{u_{j+1}^n - 2u_j^n + u_{j-1}^n}{h^2} - v\frac{u_{j+1}^n - u_{j-1}^n}{2h}\right),$$

know as the Crank-Nicolson method. The processor obtains the new approximation $u_j^{n+1}$ by solving a system of linear equations, thus, the method is implicit and is numerically stable if $$k < \frac{h^2}{a}.$$

In a similar manner, the processor may use a backward difference in time, obtaining a different implicit method $$\frac{u_j^{n+1} - u_j^n}{k} = a\frac{u_{j+1}^{n+1} - 2u_j^{n+1} + u_{j-1}^{n+1}}{h^2} - v\frac{u_{j+1}^{n+1} - u_{j-1}^{n+1}}{2h},$$

which is unconditionally stable for an time step, however, the truncation error may be large. While both implicit methods are less restrictive in terms of time step size, they usually require more computational power as they require solving a system of linear equations at each time step. Further, since the difference equations are based on a uniform grid, the finite difference method places limitations on the shape of the domain.

In some embodiments, the processor uses finite element methods (FEM) to numerically approximate partial differential equations of the form $$\frac{\partial \rho}{\partial t} = -\{\rho, H\} + \nabla_p \cdot (D\nabla_p \rho).$$

In general, the finite element method formulation of the problem results in a system of algebraic equations. This yields approximate values of the unknowns at discrete number of points over the domain. To solve the problem, it subdivides a large problem into smaller, simpler parts that are called finite elements. The simple equations that model these finite elements are then assembled into a larger system of equations that models the entire problem. The method involves constructing a mesh or triangulation of the domain, finding a weak formulation of the partial differential equation (i.e., integration by parts and Green's identity), and deciding for solution space (e.g., piecewise linear on mesh elements). This leads to a discretized version in form of a linear equation. Some advantages over finite differences method includes complicated geometries, more choice in approximation leads, and, in general, to a higher quality of approximation. For example, the processor uses the partial differential equation $$\frac{\partial \rho}{\partial t} = L\rho,$$

with differential operator, e.g., L=−{•, H}+∇$_p$·(D∇$_p$). The processor discretizes the abstract equation in space (e.g., by FEM or $$FDM) \frac{\partial \overline{\rho}}{\partial t} = \overline{L}\overline{\rho},$$

wherein $\overline{\rho}$, $\overline{L}$ are the projections of ρ, L on the discretized space. The processor discretizes the equation in time using a numerical time integrator (e.g., Crank-Nicolson)

$$\frac{\rho^{-n+1} - \rho^{-n}}{h} = \frac{1}{2}(\overline{L}\overline{\rho}^{-n+1} + \overline{L}\overline{\rho}^{-n}),$$

leading to the equation $$\left(I - \frac{h}{2}\overline{L}\right)\overline{\rho}^{-n+1} = \left(I + \frac{h}{2}\overline{L}\right)\overline{\rho}^{-n},$$

which the processor solves. In a fully discretized system, this is a linear equation. Depending on the space and discretization, this will be a banded, sparse matrix. In some embodiments, the processor employs alternating direction implicit (ADI) splitting to ease the solving process. In 1-EM, the processor may discretize the space using a mesh, construct a weak formulation involving a test space, and solve its variational form. In FDM, the processor discretizes the derivatives using differences on a lattice grid of the domain. In some instances, the processor may implement FEM/FDM with backward differential formulation (BDF)/Radau (Marlis recommendation), for example mesh generation then construct and solve variational problem with backwards Euler. In other instances, the processor implements FDM with ADI, resulting in a banded, tri-diagonal, symmetric, linear system. The processor may use an upwind scheme if Peclet number (i.e., ratio advection to diffusion) is larger than 2 or smaller than −2.

Perimeters conditions are essential in solving the partial differential equations. Perimeters conditions are a set of constraints that determine what happens at the perimeters of the domain while the partial differential equation describe the behaviour within the domain. In some embodiments, the processor uses one or more the following perimeters conditions: reflecting, zero-flux (i.e., homogenous Neumann perimeters conditions)

$$\frac{\partial \rho}{\partial \vec{n}} = 0$$

for p, q∈ ∂D, $\vec{n}$ unit normal vector on perimeters; absorbing perimeters conditions (i.e., homogenous Dirichlet perimeters conditions) ρ=0 for p, q∈ ∂D; and constant concentration perimeters conditions (i.e., Dirichlet) ρ=ρ$_0$ for p, q∈ ∂D. To integrate the perimeters conditions into FDM, the processor modifies the difference equations on the perimeters, and when using FEM, they become part of the weak form (i.e., integration by parts) or are integrated in the solution space. In some embodiments, the processor uses Fenics for an efficient solution to partial differential equations.

In some embodiments, the processor uses quantum mechanics to localize the robotic fire extinguisher. In some embodiments, the processor of the robotic fire extinguisher may determine a probability density over all possible states of the robotic fire extinguisher using a complex-valued wave function for a single-particle system $\Psi(\vec{r}, t)$, wherein $\vec{r}$ may be a vector of space coordinates. In some embodiments, the wave function $\Psi(\vec{r}, t)$ is proportional to the probability density that the particle will be found at a position $\vec{r}$, i.e. $\rho(\vec{r}, t)=|\omega(\vec{r}, t)|^2$. In some embodiments, the processor of the robotic fire extinguisher normalizes the wave function which is equal to the total probability of finding the particle, or in this case the robotic fire extinguisher, somewhere. The total probability of finding the robotic fire extinguisher somewhere adds up to unity $\int |\Psi(\vec{r}, t)|^2 dr=1$. In some embodiments, the processor of the robotic fire extinguisher may apply Fourier transform to the wave function $\Psi(\vec{r}, t)$ to yield the wave function $\Phi(\vec{p}, t)$ in the momentum space, with associated momentum probability distribution $\sigma(\vec{p}, t)=\Phi|(\vec{p}, t)|^2$. In some embodiments, the processor may evolve the wave function $\Psi(\vec{r}, t)$ using Schrödinger equation $$i\hbar \frac{\partial}{\partial t}\Psi(\vec{r}, t) = \left[-\frac{\hbar^2}{2m}\nabla^2 + V(\vec{r})\right]\Psi(\vec{r}, t),$$

wherein the bracketed object is the Hamilton operator $$\hat{H} = -\frac{\hbar^2}{2m}\nabla^2 + V(\vec{r}),$$

i is the imaginary unit, h is the reduced Planck constant, ∇$^2$ is the Laplacian, and $V(\vec{r})$ is the potential. An operator is a generalization of the concept of a function and transforms one function into another function. For example, the momentum operator $\hat{p}=-i\hbar\nabla$ and that is why $$-\frac{\hbar^2}{2m}\nabla^2$$

corresponds to kinetic energy. The Hamiltonian function $$H = \frac{p^2}{2m} + V(\vec{r})$$

has corresponding Hamilton operator $$\hat{H} = -\frac{\hbar^2}{2m}\nabla^2 + V(\vec{r}).$$

For conservative systems (constant energy), the time-dependent factor may be separated from the wave function (e.g., $$\Psi(\vec{r}, t) = \Phi(\vec{r})e^{-\frac{iEt}{\hbar}},$$

giving the time-independent Schrodinger equation $$\left[-\frac{\hbar^2}{2m}\nabla^2 + V(\vec{r})\right]\Phi(\vec{r}) = E\Phi(\vec{r}),$$

or otherwise $\hat{H}\Phi=E\Phi$, an eigenvalue equation with eigenfunctions and eigenvalues. The eigenvalue equation provides a basis given by the eigenfunctions $\{\varphi\}$ of the Hamiltonian. Therefore, in some embodiments, the wave function is given by $\Psi(\vec{r}, t)=\Sigma_k c_k(t)\varphi_k(\vec{r})$, corresponding to expressing the wave function in the basis given by energy eigenfunctions. Substituting this equation into the Schrodinger equation, $$c_k(t) = c_k(0)e^{-\frac{iE_k t}{\hbar}}$$

wherein $E_k$ is the eigen-energy to the eigenfunction $\varphi_k$. For example, the probability of measuring a certain energy $E_k$ at time t is given by the coefficient of the eigenfunction $$\varphi_k, |c_k(t)|^2 = \left|c_k(0)e^{-\frac{iE_k t}{\hbar}}\right|^2 = |c_k(0)|^2.$$

Thus, the probability for measuring the given energy is constant over time. However, this is only true for the energy eigenvalues, not for other observables. Instead, the probability of finding the system at a certain position $\rho(\vec{r})=|\Psi(\vec{r}, t)|^2$ may be used.

The wave function is an element of a complex Hilbert space H, which is a complete inner product space. Every physical property is associated with a linear, Hermitian operator acting on that Hilbert space. A wave function, or quantum state, may be regarded as an abstract vector in a Hilbert space. In some embodiments, $\psi$ is denoted by the symbol $|\psi\rangle$ (i.e., ket), and correspondingly, the complex conjugate $\phi^*$ is denoted by $\langle\phi|$ (i.e., bra). The integral over the product of two functions is analogous to an inner product of abstract vectors, $\int\phi^*\psi d\tau = \langle\phi|\cdot|\psi\rangle \equiv \langle\phi|\psi\rangle$. In some embodiments, $\langle\phi|$ and $|\psi\rangle$ are state vectors of a system and the processor determines the probability of finding $\langle\phi|$ in state $|\omega\rangle$ using $p(\langle\phi|, |\psi\rangle) = |\langle\phi|\psi\rangle|^2$. For a Hermitian operator $\hat{A}$ eigenkets and eigenvalues are denoted $A|n\rangle = a_n|n\rangle$, wherein $|n\rangle$ is the eigenket associated with the eigenvalue $a_n$. For a Hermitian operator, eigenvalues are real numbers, eigenkets corresponding to different eigenvalues are orthogonal, eigenvalues associated with eigenkets are the same as the eigenvalues associated with eigenbras, i.e. $\langle n|A = \langle n|a_n$. For every physical property (energy, position, momentum, angular momentum, etc.) there exists an associated linear, Hermitian operator $\hat{A}$ (called am observable) which acts on the Hilbert space H. Given A has eigenvalues $a_n$ and eigenvectors $|n\rangle$, and a system in state $|\phi\rangle$, the processor determines the probability of obtaining $a_n$ as an outcome of a measurement of A using $p(a_n)=|\langle n|\phi\rangle|^2$. In some embodiments, the processor evolves the time-dependent Schrodinger equation using $$i\hbar\frac{\partial|\psi\rangle}{\partial t} = \hat{H}|\psi\rangle.$$

Given a state $|\phi\rangle$ and a measurement of the observable A, the processor determines the expectation value of A using $\langle A\rangle = \langle\phi|A|\phi\rangle$, corresponding to $$\langle A\rangle = \frac{\int\phi^*\hat{A}\phi d\tau}{\int\phi^*\phi d\tau}$$

for observation operator $\hat{A}$ and wave function $\phi$. In some embodiments, the processor updates the wave function when observing some observable by collapsing the wave function to the eigenfunctions, or eigenspace, corresponding to the observed eigenvalue.

As described above, for localization of the robotic fire extinguisher, the processor evolves the wave function $\Psi(\vec{r}, t)$ using the Schrödinger equation $$i\hbar\frac{\partial}{\partial t}\Psi(\vec{r}, t) = \left[-\frac{\hbar^2}{2m}\nabla^2 + V(\vec{r})\right]\Psi(\vec{r}, t).$$

In some embodiments, a solution is written in terms of eigenfunctions $\psi_n$ with eigenvalues $E_n$ of the time-independent Schrodinger equation $H\psi_n=E_n\psi_n$, wherein $\Psi(\vec{r}, t)=\Sigma_{c_n}c_n e^{-iE_n t/\hbar}\psi_n$ and $c_n=\omega\Psi(\vec{r}, 0)\psi_n^* dr$. In some embodiments, the time evolution is expressed as a time evolution via a unitary operator U(t), $\Psi(\vec{r}, t)=U(t)\Psi(\vec{r}, 0)$ wherein $U(t)=e^{-iHt/\hbar}$. In some embodiments, the probability density of the Hilbert space may be updated by the processor of the robotic fire extinguisher each time an observation or measurement is received by the processor of the robotic fire extinguisher. For each observation with observation operator A the processor of the robotic fire extinguisher may perform an eigen-decomposition $A\omega_n=a_n\omega_n$, wherein the eigenvalue corresponds to the observed quantity. In some embodiments, the processor observes a value a with probability $0\leq p\leq 1$. In some embodiments, wherein the operator has a finite spectrum or a single eigenvalue is observed, the processor of the robotic fire extinguisher may collapse to the eigenfunction(s) with corresponding probability $$\Psi(\vec{r}, t) \to \gamma\sum_{n=1}^{N} p(a_n)d_n\omega_n,$$

wherein $d_n=\int\omega_n^*\Psi dr$, p(a) is the probability of observing value a, and $\gamma$ is a normalization constant. In some embodiments, wherein the operator has continuous spectrum, the summation may be replaced by an integration $\Psi(\vec{r}, t)\to\gamma\int p(a)d_n\omega_n da$, wherein $d_n=\int\omega_n^*\Psi dr$.

For example, consider a robotic fire extinguisher confined to move within an interval $$\left[-\frac{1}{2}, \frac{1}{2}\right].$$

For simplicity, the processor sets $\hbar=m=1$, and an infinite well potential and the regular kinetic energy term are assumed. The processor solves the time-independent Schrodinger equations, resulting in wave functions $$\psi_n = \begin{cases} \sqrt{2}\sin\left(k_n\left(x-\frac{1}{2}\right)\right)e^{-i\omega_n t}, & -\frac{1}{2} < x < \frac{1}{2}, \\ 0, & \text{otherwise} \end{cases}$$

wherein $k_n=n\pi$ and $E_n=\omega_n=n^2\pi^2$. In the momentum space this corresponds to the wave functions $$\phi_n(p, t) = \frac{1}{\sqrt{2\pi}}\int_{-\infty}^{\infty}\psi_n(x, t)e^{-ipx}dx = \frac{1}{\sqrt{\pi}}\frac{n\pi}{n\pi+p}\text{sinc}\left(\frac{1}{2}(n\pi-p)\right).$$

The processor takes suitable functions and computes an expansion in eigenfunctions. Given a vector of coefficients, the processor computes the time evolution of that wave function in eigenbasis. In another example, consider a robotic fire extinguisher free to move on an x-axis. For simplicity, the processor sets $\hbar=m=1$. The processor solves the time-independent Schrodinger equations, resulting in wave functions $$\psi_E(x, t) = Ae^{\frac{i(px-Et)}{\hbar}},$$

wherein energy $$E = \frac{\hbar^2 k^2}{2m}$$

and momentum $p=\hbar k$. For energy E there are two independent, valid functions with ±p. Given the wave function in the position space, in the momentum space, the corresponding wave functions are $$\phi_E(p, t) = e^{\frac{i(px-Et)}{\hbar}},$$

which are the same as the energy eigenfunctions. For a given initial wave function $\psi(x, 0)$, the processor expands the wave function into momentum/energy eigenfunctions $$\phi(p) = \frac{1}{\sqrt{2\pi\hbar}}\int \psi(x, 0)e^{-\frac{ipx}{\hbar}}dx,$$

then the processor gets time dependence by taking the inverse Fourier resulting in $$\psi(x, t) = \frac{1}{\sqrt{2\pi\hbar}}\int \phi(p)e^{\frac{ipx}{\hbar}}e^{\frac{iEt}{\hbar}}dp.$$

Figure 32A:
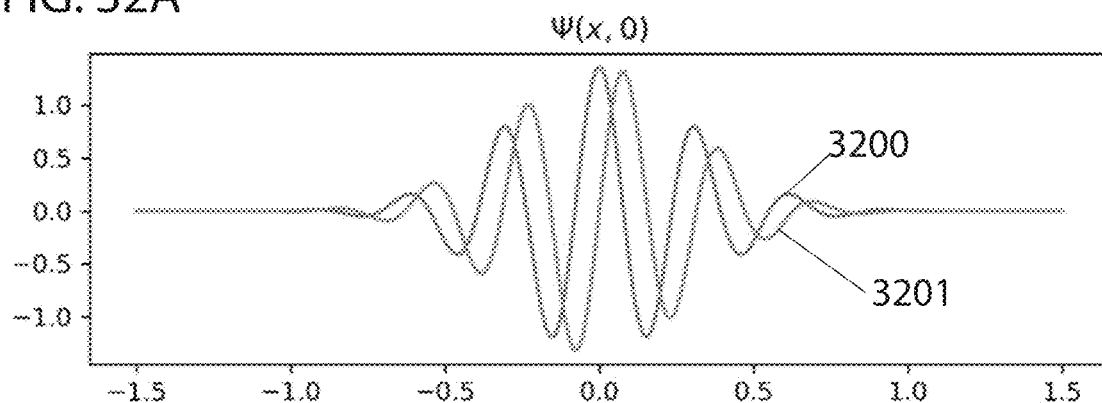
FIGS. 32A-32D illustrate an example of a wave packet, according to some embodiments.
Figure 32B:
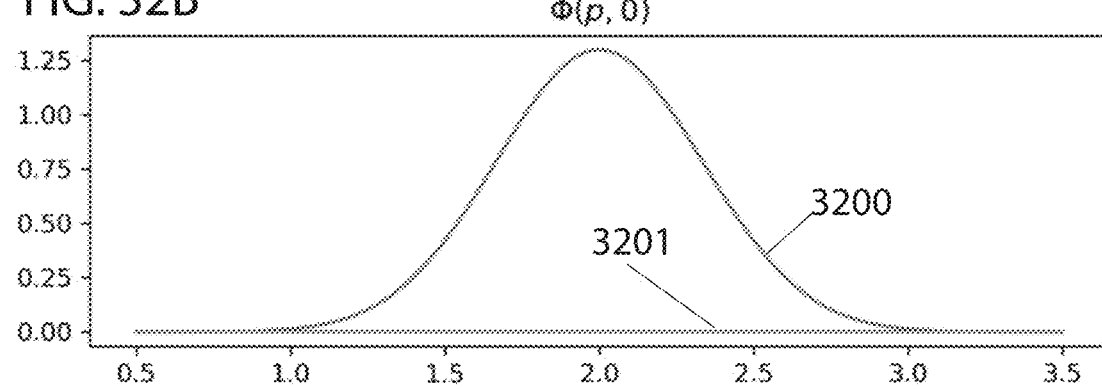
Figure 32C:
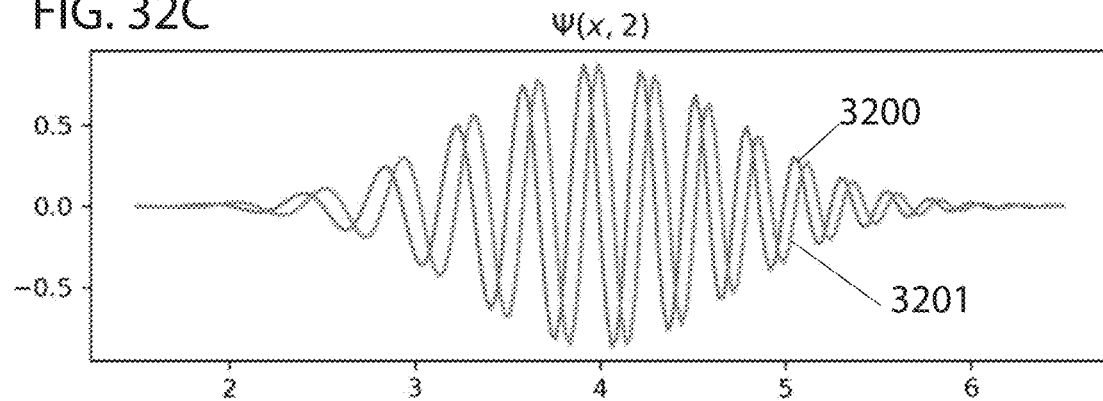
Figure 32D:
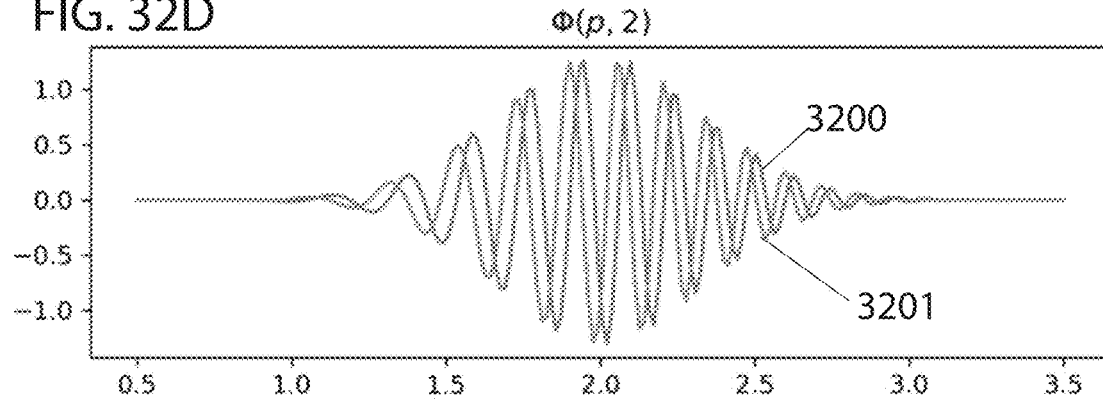
Figure 35A:
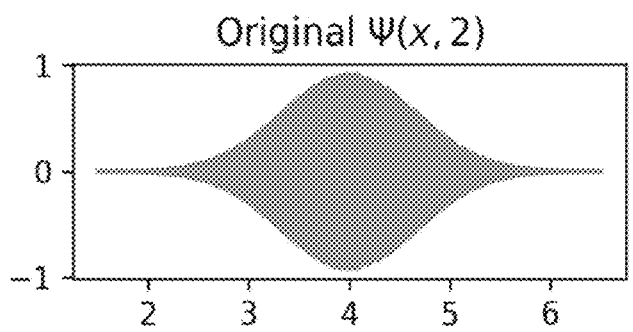
FIGS. 35A-35E illustrate an example of evolution of a wave function in a position and momentum space with observed momentum, according to some embodiments.
Figure 35B:
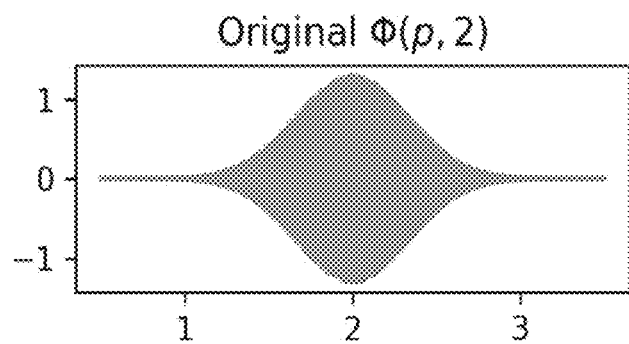
Figure 35C:
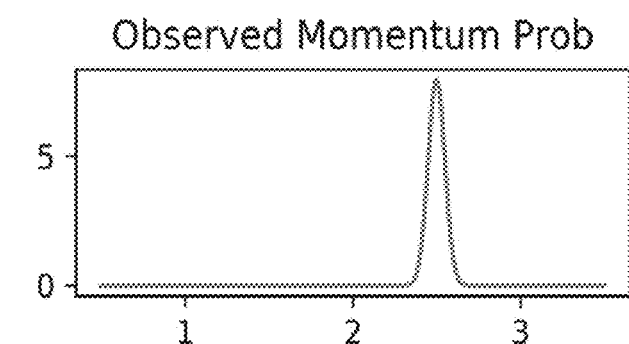
Figure 35D:
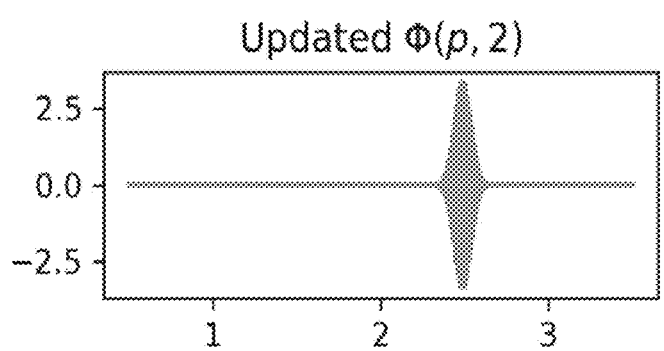
Figure 35E:
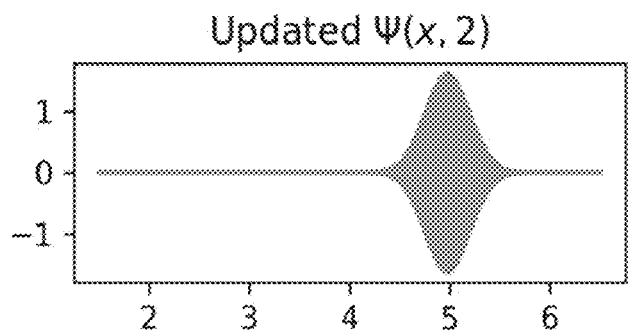
Figure 36A:
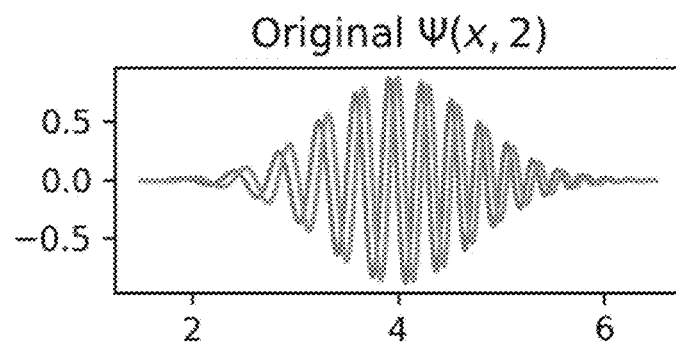
FIGS. 36A-36E illustrate an example of evolution of a wave function in a position and momentum space with observed momentum, according to some embodiments.
Figure 36B:
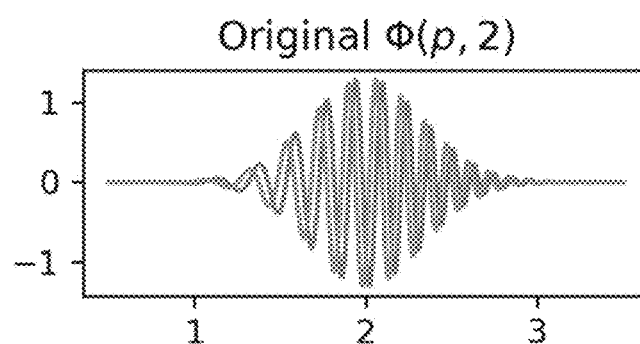
Figure 36C:
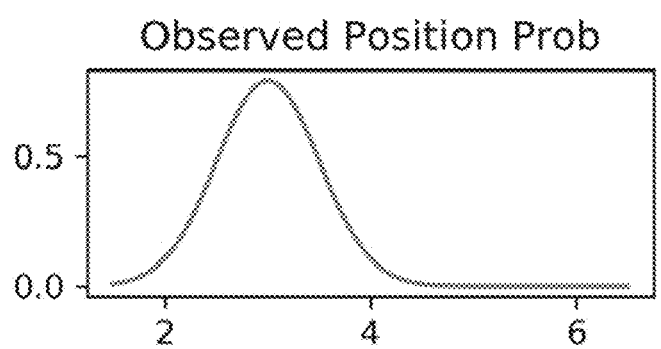
Figure 36D:
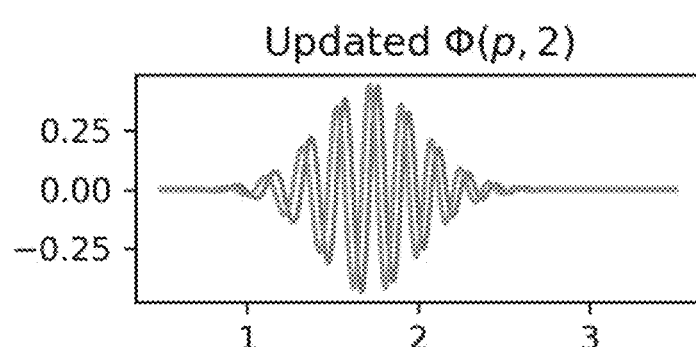
Figure 36E:
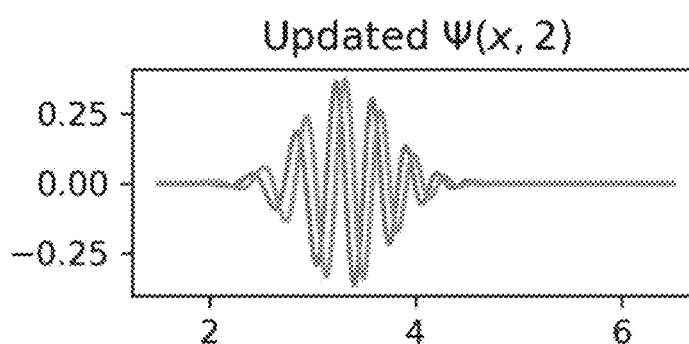

An example of a common type of initial wave function is a Gaussian wave packet, consisting of a momentum eigenfunctions multiplied by a Gaussian in position space $$\psi(x) = Ae^{-\left(\frac{x}{a}\right)^2}e^{\frac{ip_0 x}{\hbar}},$$

wherein $p_0$ is the wave function's average momentum value and a is a rough measure of the width of the packet. In the momentum space, this wave function has the form $$\phi(p) = Be^{-\left(\frac{a(p-p_0)}{2\hbar}\right)^2},$$

which is a Gaussian function of momentum, centered on $p_0$ with approximate width $2\hbar/a$. Note Heisenberg's uncertainty principle wherein in the position space width is ~a, and in the momentum space is ~1/a. FIGS. 32A and 32B illustrate an example of a wave packet at a first time point for $\psi(x)$ and $\phi(p)$, respectively, with $x_0$, $p_0=0, 2$, $\hbar=0.1$, m=1, and a=3. 3200 are real parts and 3201 are imaginary parts. As time passes, the peak moves with constant velocity $p_0/m$ and the width of the wave packet in the position space increases. This happens because the different momentum components of the packet move with different velocities. In the momentum space, the probability density $|\phi(p, t)|^2$ stays constant over time. See FIGS. 32C and 32D for the same wave packet at time t=2.

When modeling the robotic fire extinguisher using quantum physics, and the processor observes some observable, the processor collapses the wave function to the subspace of the observation. For example, consider the case wherein the processor observes the momentum of a wave packet. The processor expresses the uncertainty of the measurement by a function $f(p)$ (i.e., the probability that the system has momentum p), wherein $f$ is normalized. The probability distribution of momentum in this example is given by a Gaussian distribution centered around p=2.5 with σ=0.05, a strong assumption that the momentum is 2.5. Since the observation operator is the momentum operators, the wave function expressed in terms of the eigenfunctions of the observation operator is $\phi(p, t)$. The processor projects $\phi(p, t)$ into the observation space with probability $f$ by determining $\tilde{\phi}(p, t)=f(p)\phi(p, t)$. The processor normalizes the updated $\tilde{\phi}$ and takes the inverse Fourier transform to obtain the wave function in the position space. FIGS. 33A, 33B, 33C, 33D, and 33E illustrate the initial wave function in the position space $\psi(x)$, the initial wave function in the momentum space $\phi(p)$, the observation density in the momentum space, the updated wave function in the momentum space $\tilde{\phi}(p, t)$ after the observation, and the wave function in the position space $\psi(x)$ after observing the momentum, respectively, at time t=2, with $x_0$, $p_0=0, 2, \hbar=0.1$, m=1, and a=3. Note that in each figure the darker plots are the real parts while the lighter plots are the imaginary parts. The resulting wave function in the position space (FIG. 33D) may be unexpected after observing a very narrow momentum density (FIG. 33C) as it concludes that the position must have spread further out from the original wave function in the position space (FIG. 33A). This effect is due to Heisenberg's uncertainty principle. With decreasing h this effect diminishes, as can be seen in FIGS. 34A-34E and FIGS. 35A-35E, illustrating the same as FIGS. 33A-33E but with $\hbar=0.05$ and $\hbar=0.001$, respectively. Similar to observing momentum, position may also be observed and incorporated as illustrated in FIGS. 36A-36E which illustrate the initial wave function in the position space ψ(x), the initial wave function in the momentum space φ(p), the observation density in the position space, the updated wave function in the momentum space φ̂(x, t) after the observation, and the wave function in the position space ψ(p) after observing the position, respectively, at time t=2, with $x_0$, $p_0$=0, 2, $\hbar$=0.1, m=1, and a=3.

Figure 37A:
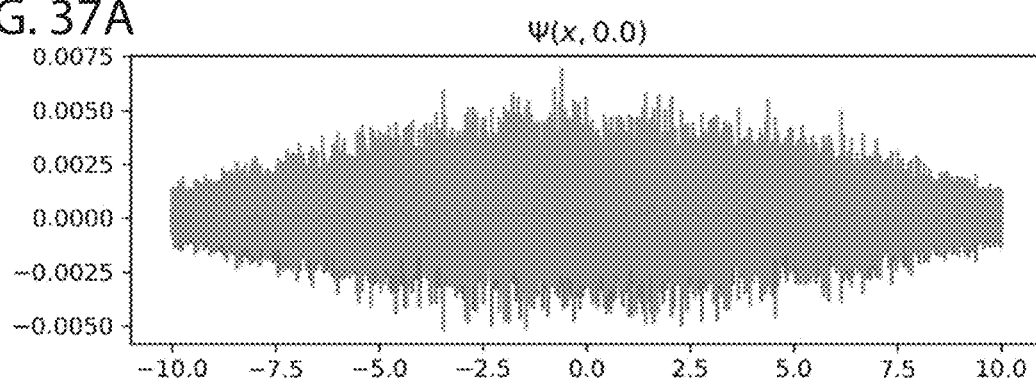
FIGS. 37A and 37B illustrate an example of an initial wave function of a state of a robotic device, according to some embodiments.
Figure 37B:
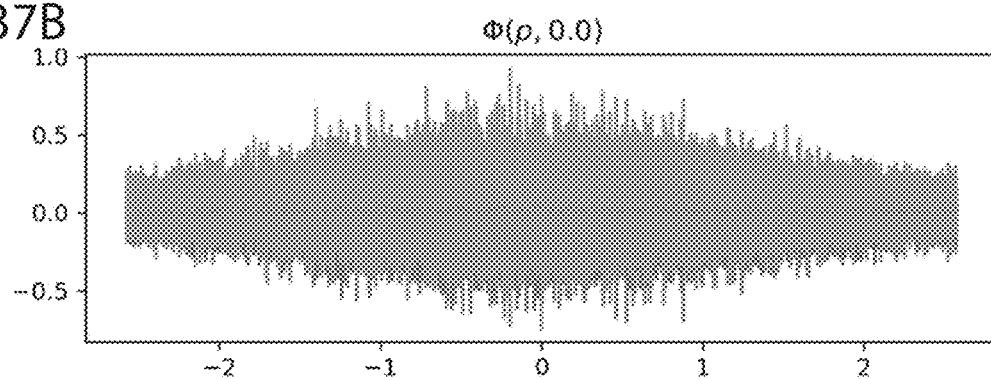
Figure 38A:
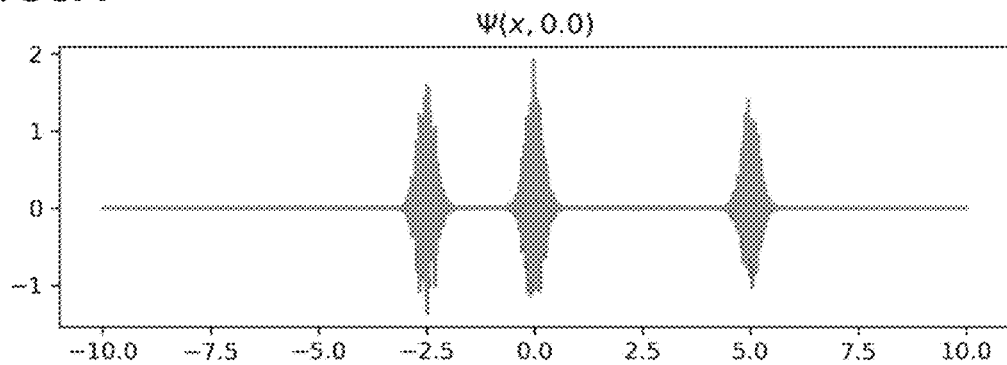
FIGS. 38A and 38B illustrate an example of a wave function of a state of a robotic device after observations, according to some embodiments.
Figure 38B:
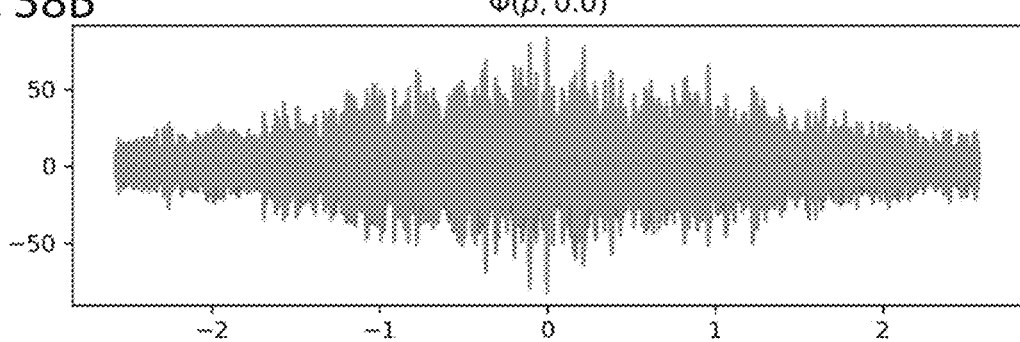
Figure 39A:
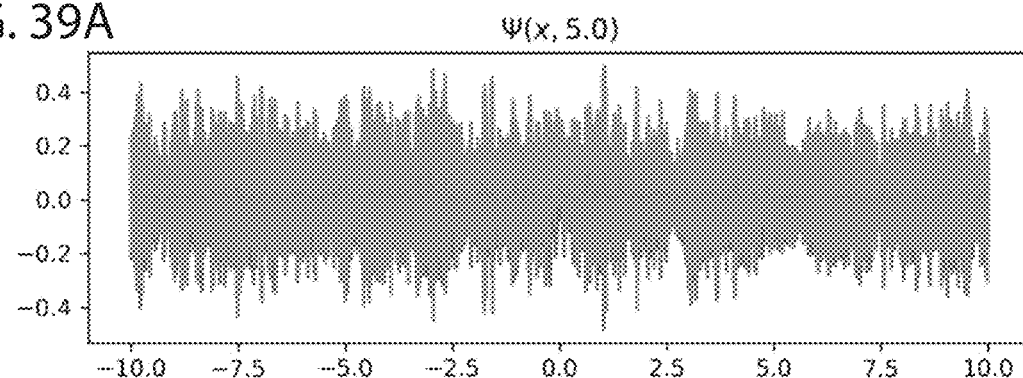
FIGS. 39A and 39B illustrate an example of an evolved wave function of a state of a robotic device, according to some embodiments.
Figure 39B:
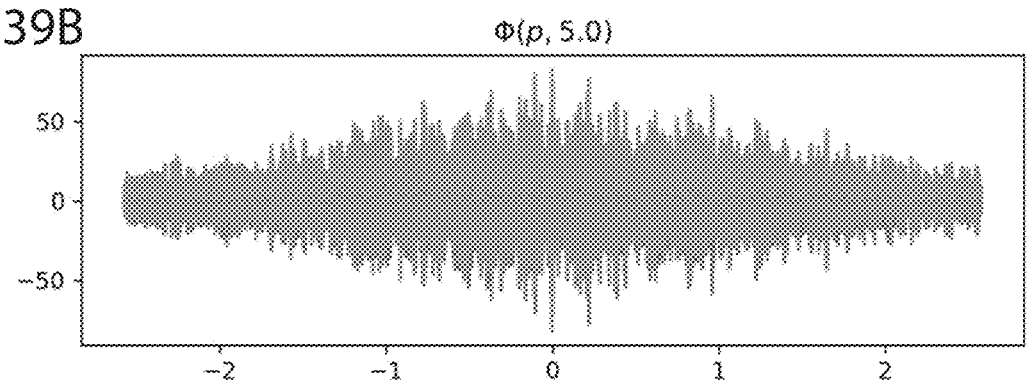
Figure 40A:
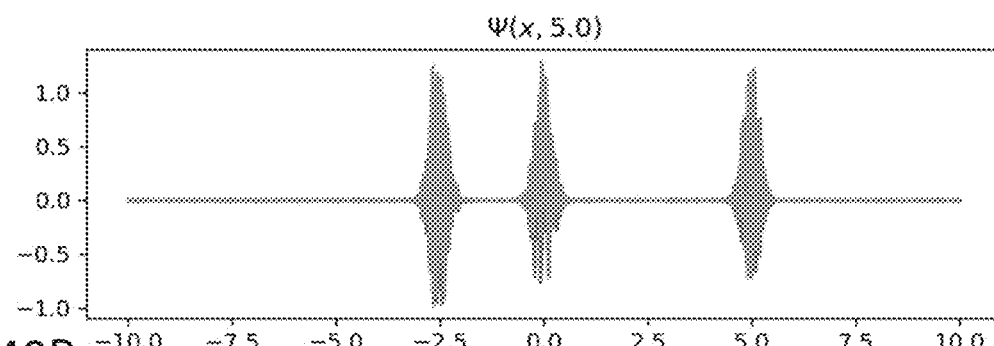
Figure 40B:
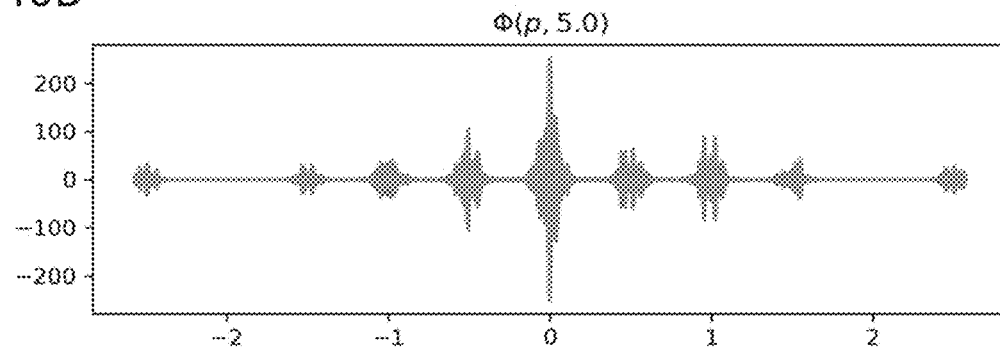
Figure 41A:
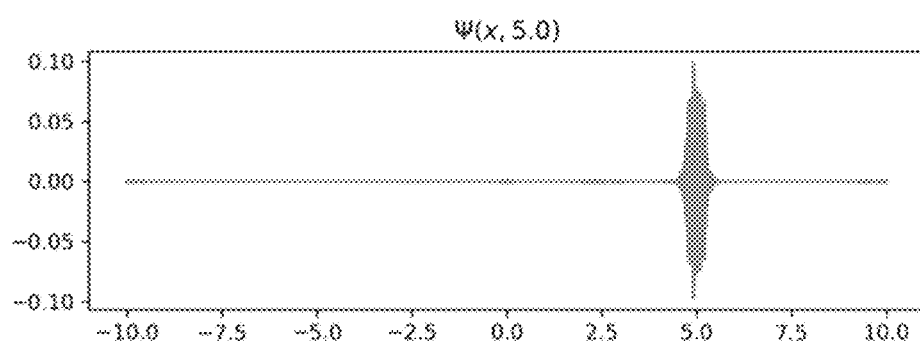
Figure 41B:
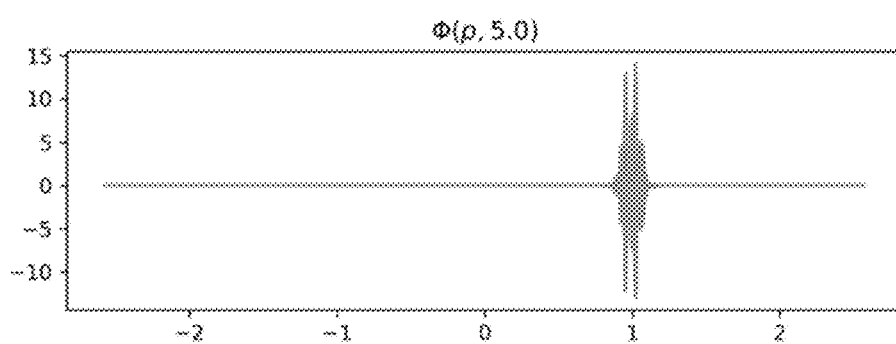
Figure 41C:
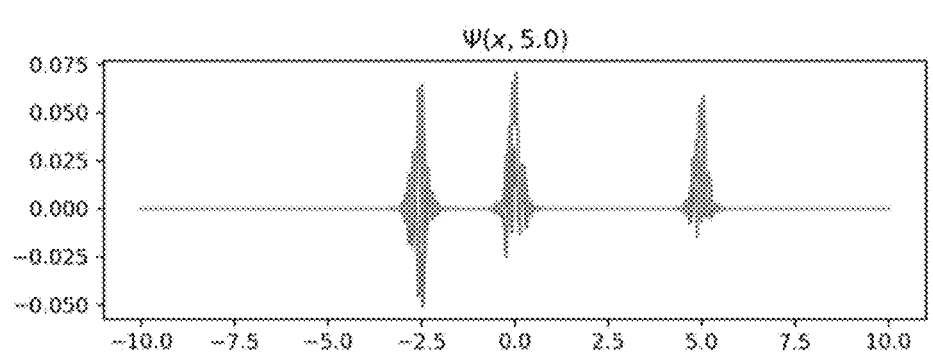
Figure 41D:
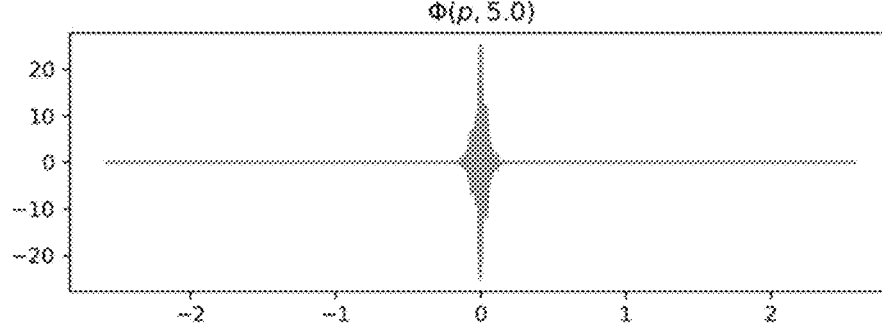
Figure 41E:
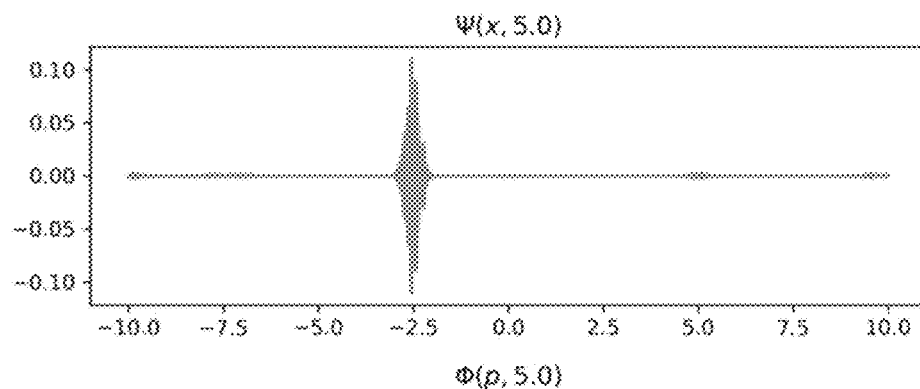
Figure 41F:
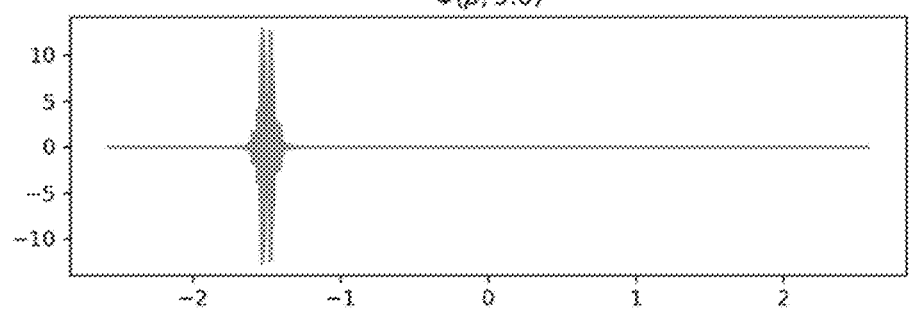
Figure 41G:
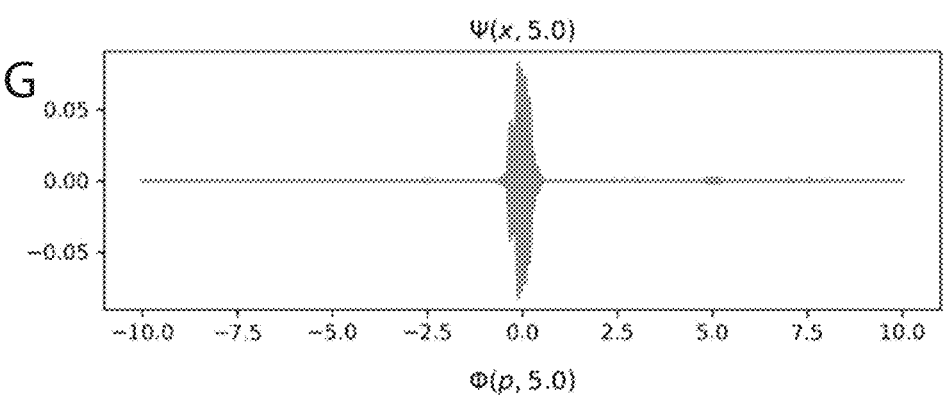
Figure 41H:
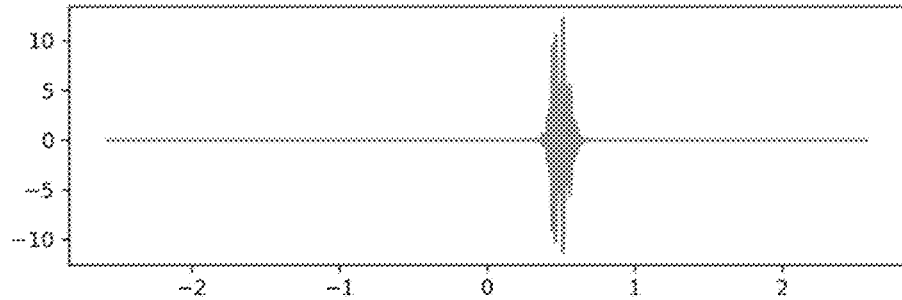
Figure 42A:
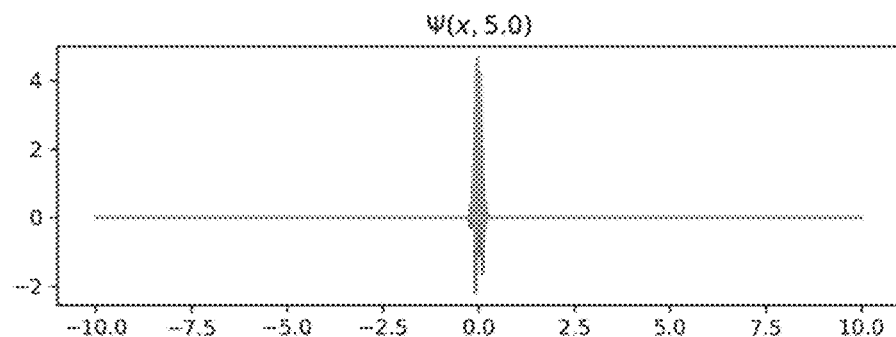
Figure 42B:
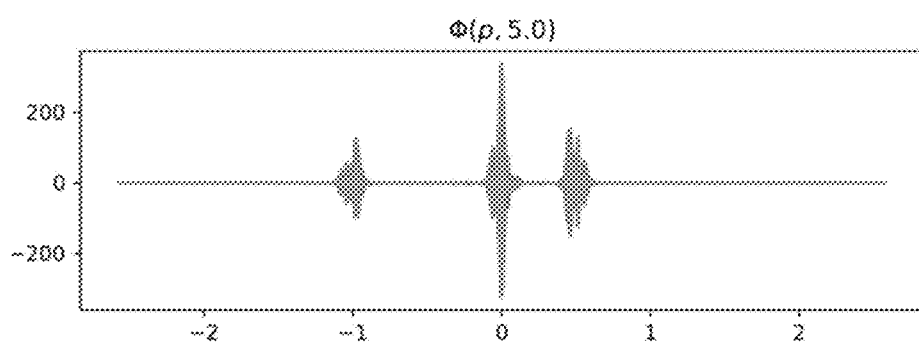
Figure 42C:
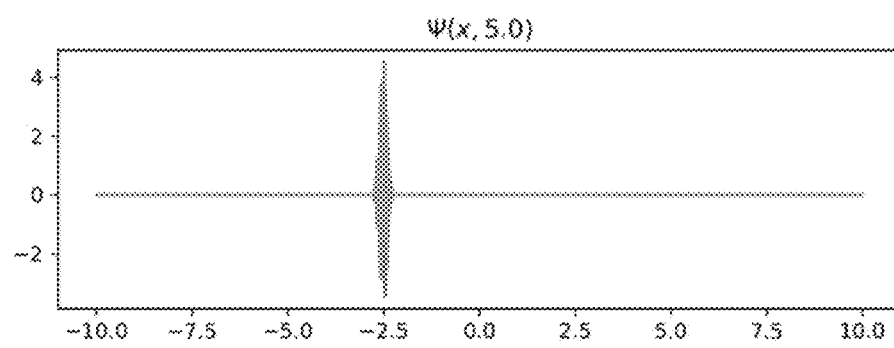
Figure 42D:
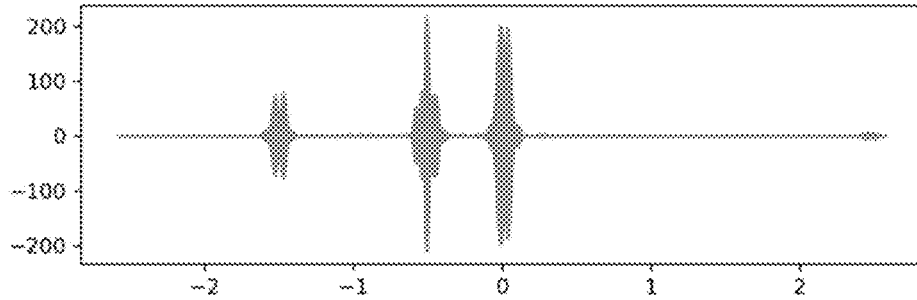

In quantum mechanics, wave functions represent probability amplitude of finding the system in some state. Physical pure states in quantum mechanics are represented as unit-norm vectors in a special complex Hilbert space and time evolution in this vector space is given by application of the evolution operator. Further, in quantum mechanics, any observable should be associated with a self-adjoint linear operator which must yield real eigenvalues, e.g. they must be Hermitian. The probability of each eigenvalue is related to the projection of the physical state on the subspace related to that eigenvalue and observables are differential operators. For example, a robotic fire extinguisher navigates along a one-dimensional floor that includes three doors at doors at $x_0$=−2.5, $x_1$=0, and $x_2$=5.0 and the processor of the robotic fire extinguisher is capable of determining when it is located at a door based on sensor data observed and the momentum of the robotic fire extinguisher is constant, but unknown. Initially the location of the robotic fire extinguisher is unknown, therefore the processor generates initial wave functions of the state shown in FIGS. 37A and 37B. When the processor determines the robotic fire extinguisher is in front of a door, the possible position of the robotic fire extinguisher is narrowed down to three possible positions, but not the momentum, resulting in wave functions shown in FIGS. 38A and 38B. The processor evolves the wave functions with a Hamiltonian operator, and after five seconds the wave functions are as shown in FIGS. 39A and 39B, wherein the position space has spread out again given that the momentum is unknown. However, the evolved probability density keeps track of the correlation between position and momentum. When the processor determines the robotic fire extinguisher is in front of a door again, the wave functions are updated to FIGS. 40A and 40B, wherein the wave functions have significantly narrowed down, indicating a number of peaks representing possible position and momentum combinations of the robotic fire extinguisher. And in fact, if the processor observes another observation, such as momentum p=1.0 at t=5.0, the wave function in the position space also collapses to the only remaining possible combination, the location near x=5.0, as shown in FIGS. 41A and 41B. It can be seen that the processor collapsed the momentum wave function accordingly. Also, the processor reduced the position wave function to a peak at x=5.0. Given constant momentum, the momentum observation of p=1.0, and that the two door observations were 5 seconds apart, the position x=5.0 is the only remaining valid position hypothesis. FIGS. 41C and 41D illustrate the resulting wave function for a momentum observation of p=0.0 at t=5.0 instead. FIGS. 41E and 41F illustrate the resulting wave function for a momentum observation of p=−1.5 at t=5.0 instead. FIGS. 41G and 41H illustrate the resulting wave function for a momentum observation of p=0.5 at t=5.0 instead. Similarly, the processor collapses the momentum wave function when position is observed instead of momentum. FIGS. 42A and 42B illustrate the resulting wave function for a position observation of x=0.0 at t=5.0 instead. FIGS. 42C and 42D illustrate the resulting wave function for a position observation of x=−2.5 at t=5.0 instead. FIGS. 42E and 42F illustrate the resulting wave function for a position observation of x=5.0 at t=5.0 instead.

In some embodiments, the processor of the robotic fire extinguisher considers multiple possible scenarios wherein the robotic fire extinguisher is located in other likely locations in addition to the location estimated by the processor. As the robotic fire extinguisher moves within the environment, the processor gains information of its surroundings from sensory devices which it uses to eliminate less likely scenarios. For example, consider a processor of a robotic device estimating itself to be 100 cm away from a wall. To account for measurement noise the processor considers additional likely scenarios wherein the robotic device is, for example, 102, 101, 99 and 98 cm away from the wall. The processor considers these scenarios as possibly being the actual true distance from the wall and therefore reduces its speed after traveling 98 cm towards the wall. If the robotic device does not bump into the wall after traveling 98 cm towards the wall it eliminates the possibility of it having been 98 cm away from the wall and the likelihood of the robotic device being 99, 100, 101 and 102 cm away from the wall increases. This way as the robotic device travels within the environment, the processor adjusts its confidence of its location with respect to other robotic devices and the environment based on observations and information gained of the surroundings. In some cases, such a method reduces collisions. In an alternative visualization of this approach the processor inflates the surface area occupied by the robotic device such that it is hypothesized that the robotic device occupies all state spaces falling within the borders of the inflated surface area. Since the error of perceived position of the robot increases with movement, the processor inflates the surface area occupied by the robotic device with every movement. The processor deflates the surface area occupied by the robotic device when occupancy of a hypothesized state space falling within the borders of the surface area is proven to be false, thereby reducing the number of state spaces and hence area occupied by the robotic device. In this example, wherein the surface area occupied by the robotic device is equivalent to the integral of all state spaces falling within the borders of the surface area, the occupancy of all state spaces is uniformly distributed. In some embodiments, the inflation and deflation is not the same in all directions. In some embodiments, the amounts of inflation and deflation in different directions depends on the type of motion, noise, sensors, etc.

In some embodiments, the processor initially assumes the robotic fire extinguisher is located somewhere within an area greater than the size of the robot, the location being the seed location of the robotic fire extinguisher. This is due to initial uncertainty in the position and heading of the robotic fire extinguisher and the surroundings. As more data is collected and the processor is more certain of the position of the robotic fire extinguisher relative to its surroundings, the processor reduces the size of area within which the robotic fire extinguisher is assumed to be located. On the other hand, as the robotic fire extinguisher moves and noise, such as movement noise, is introduced, the processor increases the area within which the robotic fire extinguisher is assumed to be located as uncertainty in the position of the robot increases. In some embodiments, the processor adjusts the shape of the area within which the robotic fire extinguisher is assumed to be located within based on deviation between the measured and true heading and translation of the robotic fire extinguisher as it moves. In some embodiments, the processor uses information on linear and angular undershoot and overshoot to help determine the shape of the area within which the robotic fire extinguisher is assumed to be located within. Force is needed to cause linear and angular acceleration and a given amount of force can either be spent on linear overshooting or angular overshooting. If the robotic fire extinguisher overshoots linearly it undershoots angularly and vice versa.

In embodiments, wherein the state of the robotic fire extinguisher within a space is initially unknown, the processor of the robotic fire extinguisher may generate a uniform probability distribution over the space. In other instances, any other probability distribution may be generated depending on the information known about the state of the robotic fire extinguisher and the certainty of the information. Over time and as more measurements and observations are received by the processor of the robotic fire extinguisher, the probability distribution over all possible states of the robotic fire extinguisher in the space evolves.

In some embodiments, the processor uses quantum filtering. In some embodiments, the processor simulates multiple robotic fire extinguishers located in different possible locations within the environment. In some embodiments, the processor may view the environment from the perspective of each different simulated robotic fire extinguisher. In some embodiments, the collection of simulated robotic fire extinguishers form an ensemble. In some embodiments, the processor evolves the location of each simulated robotic fire extinguisher or the ensemble over time. In some embodiments, the range of movement of each simulated robotic fire extinguisher may be different. In some embodiments, the processor may view the environment from the field of view (FOV) of each simulated robotic fire extinguisher, each simulated robotic fire extinguisher having a slightly different map of the environment based on their simulated location and FOV. In some embodiments, the collection of simulated robotic fire extinguishers form an approximate region within which the robotic fire extinguisher is truly located. In some embodiments, the true location of the robotic fire extinguisher is one of the simulated robotic fire extinguishers. In some embodiments, when a measurement of the environment is taken, the processor checks the measurement of the environment against the map of the environment of each of the simulated robotic fire extinguishers. In some embodiments, the processor predicts the robotic fire extinguisher is truly located in the location of the simulated robotic fire extinguisher having a map that best matches the measurement of the environment. In some embodiments, the simulated robotic fire extinguisher which the processor believes to be the true robotic fire extinguisher may change or may remain the same as new measurements are taken and the ensemble evolves over time. In some embodiments, the ensemble of simulated robotic fire extinguishers remain together as the ensemble evolves over time. In some embodiments, the overall energy of the collection of simulated robotic fire extinguishers remains constant in each timestamp, however the distribution of energy to move each simulated robotic fire extinguisher forward during evolution may not be distributed evenly among the simulated robotic fire extinguishers. For example, in one instance a simulated robotic fire extinguisher may end up much further away than the remaining simulated robotic fire extinguishers or too far to the right or left, however in future instances and as the ensemble evolves may become close to the group of simulated robotic fire extinguishers again. In some embodiments, the ensemble evolves to most closely match the sensor readings, such as a gyroscope or optical sensor. In some embodiments, the evolution of the location of simulated robotic fire extinguishers is limited based on characteristics of the physical robotic fire extinguisher. For example, a robot may have limited speed and limited rotation of the wheels, therefor it would be impossible for the robot to move two meters, for example, in between time steps. In another example, the robot may only be located in certain areas of an environment, where it may be impossible for the robot to be located in areas where an obstacle is located for example. In some embodiments, this method of quantum filtering may be used to hold back certain elements or modify the overall understanding of the environment. For example, when the processor examines a total of ten simulated robotic fire extinguishers one by one against a measurement, and selects one simulated robotic fire extinguisher as the true robotic fire extinguisher, the processor filters out nine simulated robotic fire extinguishers, thus filtering ten quanta to one quantum.

In some embodiments, the FOV of each simulated robotic fire extinguisher may not include the exact same features as one another. In some embodiments, the processor saves the FOV of each of the simulated robotic fire extinguishers in memory. In some embodiments, the processor combines the FOVs of each simulated robotic fire extinguisher to create a FOV of the ensemble using methods such as least squares methods. This method is described above for creating a map by aligning sensor data to create one representation of the environment, which may be more accurate than each individual FOV. In some embodiments, the processor tracks the FOV of each of the simulated robotic fire extinguishers individually and the FOV of the entire ensemble. In some embodiments, other methods may be used to create the FOV of the ensemble (or a portion of the ensemble). For example, a classifier AI algorithm may be used, such as Naive Bayes classifier, Least squares support vector machines, k-nearest neighbor, Decision trees, and Neural networks. In some embodiments, more than one FOV of the ensemble (or a portion of the ensemble) may be generated and tracked by the processor, each FOV created using a different method. For example, the processor may track the FOV of ten simulated robotic fire extinguishers and ten differently generated FOVs of the ensemble. At each measurement timestamp, the processor may examine the measurement against the FOV of the ten simulated robotic fire extinguishers and/or the ten differently generated FOVs of the ensemble and may choose any of these 20 possible FOVs as the ground truth. In some embodiments, the processor may examine the 20 FOVs instead of the FOVs of the simulated robotic fire extinguishers and choose a derivative as the ground truth. The number of simulated robotic fire extinguishers and/or the number of generated FOVs may vary. During mapping for example, the processor may take a first field of view of the camera and calculate a FOV for the ensemble or each individual observer (simulated robotic fire extinguisher) inside the ensemble and combine it with the second field of view captured by the camera for the ensemble or each individual observer inside the ensemble. The processor switches between the FOV of each observer (e.g., like multiple CCTV cameras in an environment that an operator may switch between) and/or one or more FOVs of the ensemble (or a portion of the ensemble) and chooses the FOVs that are more probable to be close to ground truth. At each time iteration, the FOV of each observer and/or ensemble evolves into being closer to ground truth.

In some embodiments, simulated robotic fire extinguishers may be divided in two or more classes. For example, simulated robotic fire extinguishers may be classified based on their reliability, such as good reliability, bad reliability, or average reliability or based on their speed, such as fast and slow. Classes that move to a side a lot may be used. Any classification system may be created, such as Linear classifiers like Fisher's linear discriminant, Logistic regression, Naive Bayes classifier and Perceptron, Support vector machines like Least squares support vector machines, Quadratic classifiers, Kernel estimation like k-nearest neighbor, Boosting (meta-algorithm), Decision trees like Random forests, Neural networks, and Learning vector quantization. In some embodiments, each of the classes evolve differently. For example, for fast speed and slow speed classes, each of the classes moves differently wherein the simulated robotic fire extinguishers in the fast class will move very fast and will be ahead of the other simulated robotic fire extinguishers in the slow class that move slower and fall behind. For example, given a gyroscope that shows two meters of movement and classes X, Y, and Z, the ensemble may evolve as illustrated in FIG. 43. At each time stamp 4300, 4301, and 4302, class X moves the fastest as it belongs to the fastest speed class. In other words, when a force is applied at each time stamp to evolve the classes over time, the force moves class X more than the rest of the classes. This may be due to class X being lighter than the rest of the simulated robotic fire extinguishers. The kind and time of evolution may have different impact on different simulated robotic fire extinguishers within the ensemble. The evolution of the ensemble as a whole may or may not remain the same. The ensemble may be homogenous or non-homogenous.

In some embodiments, samples are taken from the phase space. In some embodiments, the intervals at which samples are taken may be fixed or dynamic or machine learned. In a fixed interval sampling system, a time may be preset. In a dynamic interval system, the sampling frequency may depend on factors such as speed or how smooth the floor is and other parameters. For example, as the speed of the robotic fire extinguisher increases, more samples are taken. Or more samples are taken when the robotic fire extinguisher is traveling on rough terrain. In a machine learned system, the frequency of sampling may depend on predicted drift. For example, if in previous timestamps the measurements taken indicate that the robotic fire extinguisher has reached the intended position fairly well, the frequency of sampling is reduced. In some embodiments, the above explained dynamic system may be equally used to determine the size of the ensemble. If, for example, in previous timestamps the measurements taken indicate that the robotic fire extinguisher has reached the intended position fairly well, a smaller ensemble may be used to correct the knowledge of where the robotic fire extinguisher is. In some embodiments, the ensemble is regenerated at each interval. In some embodiments, a portion of the ensemble is regenerated. In some embodiments, a portion of the ensemble that is more likely to depict ground truth may be preserved and the other portion regenerated. In some embodiments, the ensemble may not be regenerated but one of the observers (simulated robotic fire extinguishers) in the ensemble that is more likely to be ground truth is chosen as the most feasible representation of the true robotic fire extinguisher. In some embodiments, observers (simulated robotic fire extinguishers) in the ensemble take part in becoming the most feasible representation of the true robotic fire extinguisher based on how their individual description of the surrounding fits with the measurement taken.

In some embodiments, the processor generates an ensemble of hypothetical positions of various simulated robotic fire extinguishers within the environment. In some embodiments, the processor generates a simulated representation of the environment for each hypothetical position of the robotic fire extinguisher from the perspective corresponding with each hypothetical position. In some embodiments, the processor compares the measurement against each simulated representation of the environment (e.g., a floor type map, a spatial map, a Wi-Fi map, etc.) corresponding with a perspective of each of the hypothetical positions of the robotic fire extinguisher. In some embodiments, the processor chooses the hypothetical position of the robotic fire extinguisher that makes the most sense as the most feasible position of the robotic fire extinguisher. In some embodiments, the processor selects additional hypothetical positions of the robotic fire extinguisher as a backup to the most feasible position of the robotic fire extinguisher. In some embodiments, the processor nominates one or more hypothetical positions as a possible leader or otherwise a feasible position of the robotic fire extinguisher. In some embodiments, the processor nominates a hypothetical position of the robot as a possible leader when the measurement fits well with the simulated representation of the environment corresponding with the perspective of the hypothetical position. In some embodiments, the processor defers a nomination of a hypothetical position to other hypothetical positions of the robotic fire extinguisher. In some embodiments, the hypothetical positions with the highest numbers of deferrals are chosen as possible leaders. In some embodiments, the process of comparing measurements to simulated representations of the environment corresponding with the perspectives of different hypothetical positions of the robotic fire extinguisher, nominating hypothetical positions as possible leaders, and choosing the hypothetical position that is the most feasible position of the robotic fire extinguisher may be iterative. In some cases, the processor selects the hypothetical position with the lowest deviation between the measurement and the simulated representation of the environment corresponding with the perspective of the hypothetical position as the leader. In some embodiments, the processor stores one or more hypothetical positions that are not elected as leader for another round of iteration after another movement of the robot. In other cases, the processor eliminates one or more hypothetical positions that are not elected as leader or eliminates a portion and stores a portion for the next round of iteration. In some cases, the processor chooses the portion of the one or more hypothetical positions that are stored based on one or more criteria. In some cases, the processor chooses the portion of hypothetical positions that are stored randomly and based on one or more criteria. In some cases, the processor eliminates some of the hypothetical positions of the robotic fire extinguisher that pass the one or more criteria. In some embodiments, the processor evolves the ensemble of hypothetical positions of the robotic fire extinguisher similar to a genetic algorithm. In some embodiments, the processor uses a MDP, as mathematically described below, to reduce the error between the measurement and the representation of the environment corresponding with each hypothetical position over time, thereby improving the chances of each hypothetical position in becoming or remaining leader. In some cases, the processor applies game theory to the hypothetical positions of the robotic fire extinguishers, such that hypothetical positions compete against one another in becoming or remaining leader. In some embodiments, hypothetical positions compete against one another and the ensemble becomes an equilibrium wherein the leader following a policy (a) remains leader while the other hypothetical positions maintain their current positions the majority of the time.

The multi-dimensionality in quantum localization described above provides robustness that may be useful in various applications. In some embodiments, the processor uses localization for controlling the operation, settings, and functionality of the robotic fire extinguisher. For example, the processor uses localization to control the behavior of the robotic fire extinguisher in different areas, where for instance, certain functions or settings are desired for different environments. These functions or settings may be triggered once the processor has localized the robotic fire extinguisher against the environment. For example, it may be desirable to run the motor at a higher speed when moving over rough surfaces, such as soft flooring as opposed to hardwood, wherein localization against floor type or against a room may trigger the motor speed. As a further example, localization may also be used in controlling the movement of the robotic fire extinguisher. If the processor localizes the robotic fire extinguisher against a perimeter, for example, it may choose to select a path along the perimeter or it may trigger a polymorphic or other type of path planning algorithm. Or, localizing the robotic fire extinguisher against a perimeter may trigger a path planning algorithm.

Further details of localization methods that may be used independently or in combination are described in U.S. Patent Application Nos. 62/748,943, 62/746,688, Ser. Nos. 16/297,508, 62/740,573, 62/740,580, 15/955,480, 15/425,130, 15/955,344, and 16/427,317, the entire contents of which are hereby incorporated by reference.

For example, in some embodiments, the processor may use data from optoelectronic sensors to localize. In some embodiments, at least two optoelectronic sensors and a light emitting diode (LED) are positioned on the underside of the robotic fire extinguisher such that the optoelectronic sensors monitor the surface upon which the device drives. In some embodiments, an infrared laser diode or other types of light sources may be used. In some embodiments, the optoelectronic sensors are positioned such that they monitor another portion of the environment, such as the ceiling of the environment or another area. The at least two optoelectronic sensors may be positioned at some distance from one another on the underside of the robotic fire extinguisher. For example, two optoelectronic sensors may be positioned along a line passing through the center of the robotic fire extinguisher, each on opposite sides and at an equal distance from the center of the robotic fire extinguisher. In other instances, the optoelectronic sensors may be positioned differently on the underside of the robotic fire extinguisher, where for example, they may not be at equal distance from the center of the robotic fire extinguisher. The LED illuminates the surface upon which the robotic fire extinguisher drives and the optoelectronic sensors capture images of the driving surface as the robotic fire extinguisher moves through the environment. The images captured are sent to the processor and a technique such as, digital image correlation (DIC), may be used to determine the linear movement of each of the optoelectronic sensors in the x and y directions. Each optoelectronic sensor has an initial starting location that can be identified with a pair of x and y coordinates and using a technique such as DIC, a second location of each optoelectronic sensor can be identified by the processor by a second pair of x and y coordinates. In some embodiments, the processor detects patterns in images and is able to determine by how much the patterns have moved from one image to another, thereby providing the movement of each optoelectronic sensor in the x and y directions over a time from a first image being captured to a second image being captured. To detect these patterns and movement of each sensor in the x and y directions the processor processes the images using a technique such as cross correlation to determine how much each successive image is offset from the previous one. In some embodiments, finding the maximum of the correlation array between pixel intensities of two images may be used to determine the translational shift in the x-y plane or in the case of a robotic fire extinguisher, its driving surface plane. Cross correlation may be defined in various ways, such as two-dimensional discrete cross correlation $$r_{ij} = \frac{\sum_k \sum_l [s(k+i, l+j) - \bar{s}][q(k, l) - \bar{q}]}{\sqrt{\sum_k \sum_l [s(k, l) - \bar{s}]^2 \sum_k \sum_l [q(k, l) - \bar{q}]^2}},$$

wherein s(k, l) is the pixel intensity at a point (k, l) in a first image and q(k, l) is the pixel intensity of a corresponding point in the translated image. $\bar{s}$ and $\bar{q}$ are the mean values of respective pixel intensity matrices s and q. The coordinates of the maximum $r_{ij}$ gives the pixel integer shift $(\Delta x, \Delta y)$=arg max{r}. In some embodiments, the correlation array may be determined faster using Fourier Transform techniques or other mathematical methods.

Given the movement of each optoelectronic sensor in the x and y directions, the linear and rotational movement of the robotic fire extinguisher may be determined by the processor. For example, if the robotic fire extinguisher is only moving linearly without any rotation, the translation of each optoelectronic sensor $(\Delta x, \Delta y)$ over a time $\Delta t$ are the same in magnitude and sign and may be assumed to be the translation of the robotic fire extinguisher as well. If the robotic fire extinguisher rotates, the linear translations of each optoelectronic sensor determined from their respective images may be used by the processor to determine the rotation angle of the robotic fire extinguisher. For example, in some instances the robotic fire extinguisher rotates in place, about an instantaneous center of rotation (ICR) located at its center. This may occur when the velocity of one wheel is equal and opposite to the other wheel (i.e. $v_r=-v_l$, wherein r denotes right wheel and l left wheel). In embodiments wherein two optoelectronic sensors, for example, are placed at equal distances from the center of the robotic fire extinguisher along a line passing through its center, the magnitude of the translations in the x and y directions of the two optoelectronic sensors are the same and of opposite sign. The translations of either sensor may be used by the processor to determine the rotation angle of the robotic fire extinguisher about the ICR by applying Pythagorean theorem, given the distance of the sensor to the ICR is known. In embodiments wherein the optoelectronic sensors are placed along a line passing through the center of the robotic fire extinguisher and are not of equal distance from the center of the robotic fire extinguisher, translations of each sensor will not be of the same magnitude however, any set of translations corresponding to an optoelectronic sensor, will result in the same angle of rotation when applying Pythagorean theorem.

Figure 44A:
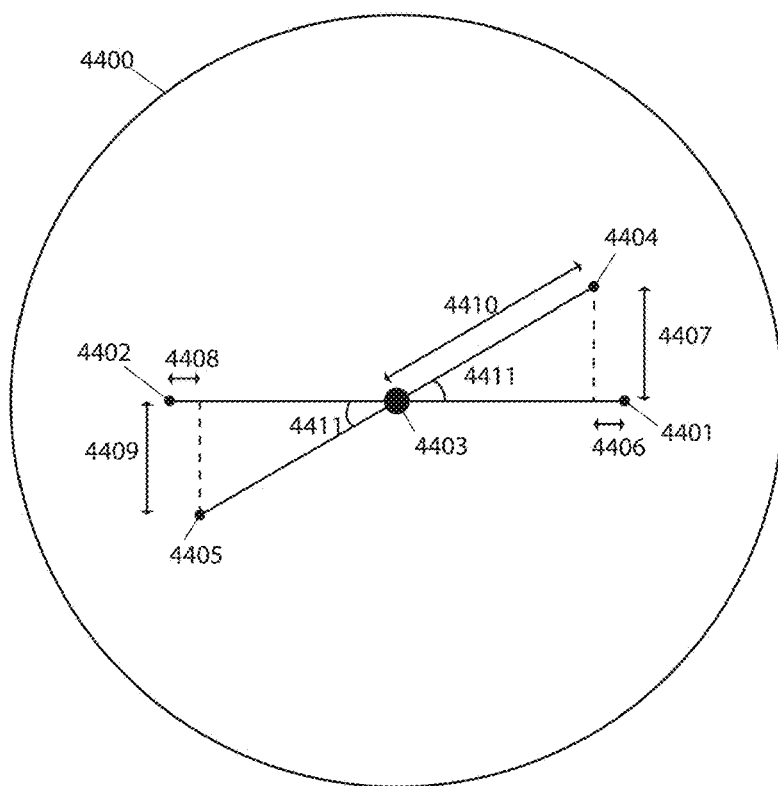
FIGS. 44A-44C illustrate a method for determining a rotation angle of a robotic device, according to some embodiments.

The offset amounts at each optoelectronic sensor location may be used by the processor to determine the amount that the robotic fire extinguisher turned. FIG. 44A illustrates a top view of robotic fire extinguisher 4400 with a first optoelectronic sensor initially positioned at 4401 and a second optoelectronic sensor initially positioned at 4402, both of equal distance from the center of robotic fire extinguisher 4400. The initial and end position of robotic fire extinguisher 4400 is shown, wherein the initial position is denoted by the dashed lines. Robotic fire extinguisher 4400 rotates in place about ICR 4403, moving first optoelectronic sensor to position 4404 and second optoelectronic sensor to position 4405. As robotic fire extinguisher 4400 rotates from its initial position to a new position optoelectronic sensors capture images of the surface illuminated by an LED (not shown) and send the images to a processor for DIC. After DIC of the images is complete, translation 4406 in the x direction (Δx) and 4407 in the y direction (Δy) are determined for the first optoelectronic sensor and translation 4408 in the x direction and 4409 in the y direction for the second sensor. Since rotation is in place and the optoelectronic sensors are positioned symmetrically about the center of robotic fire extinguisher 4400 the translations for both optoelectronic sensors are of equal magnitude. The translations (Δx, Δy) corresponding to either optoelectronic sensor together with the respective distance 4410 of either sensor from ICR 4403 of robotic fire extinguisher 4400 may be used to calculate rotation angle 4411 of robotic fire extinguisher 4400 by forming a right-angle triangle as shown in FIG. 44A and applying Pythagorean theorem $$\sin\theta = \frac{\text{opposite}}{\text{hypotneuse}} = \frac{\Delta y}{d},$$

wherein θ is rotation angle 4411 and d is known distance 4410 of the sensor from ICR 4403 of robotic fire extinguisher 4400.

Figure 44B:
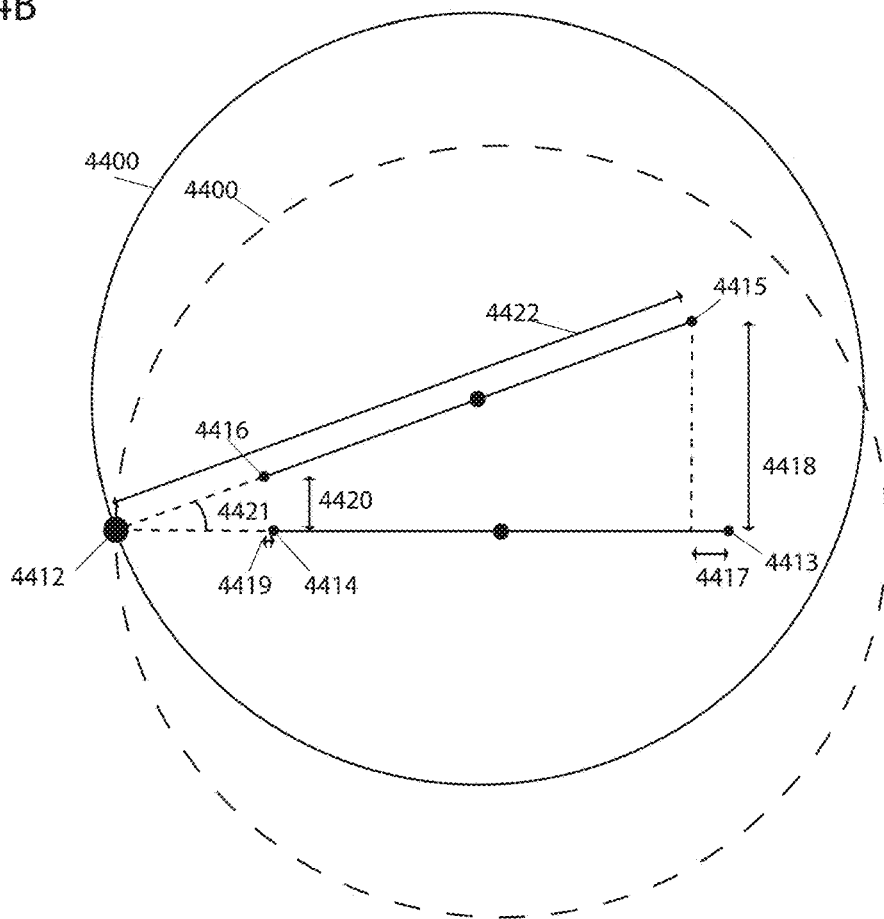

In some embodiments, the rotation of the robotic fire extinguisher may not be about its center but about an ICR located elsewhere, such as the right or left wheel of the robotic fire extinguisher. For example, if the velocity of one wheel is zero while the other is spinning then rotation of the robotic fire extinguisher is about the wheel with zero velocity and is the location of the ICR. The translations determined by images from each of the optoelectronic sensors may be used to estimate the rotation angle about the ICR. For example, FIG. 44B illustrates rotation of robotic fire extinguisher 4400 about ICR 4412. The initial and end position of robotic fire extinguisher 4400 is shown, wherein the initial position is denoted by the dashed lines. Initially first optoelectronic sensor is positioned at 4413 and second optoelectronic sensor is positioned at 4414. Robotic fire extinguisher 4400 rotates about ICR 4412, moving first optoelectronic sensor to position 4415 and second optoelectronic sensor to position 4416. As robotic fire extinguisher 4400 rotates from its initial position to a new position optoelectronic sensors capture images of the surface illuminated by an LED (not shown) and send the images to a processor for DIC. After DIC of the images is complete, translation 4417 in the x direction (Δx) and 4418 in the y direction (Δy) are determined for the first optoelectronic sensor and translation 4419 in the x direction and 4420 in the y direction for the second sensor. The translations (Δx, Δy) corresponding to either optoelectronic sensor together with the respective distance of the sensor to the ICR, which in this case is the left wheel, may be used to calculate rotation angle 4421 of robotic fire extinguisher 4400 by forming a right-angle triangle, such as that shown in FIG. 44B. Translation 4418 of the first optoelectronic sensor in the y direction and its distance 4422 from ICR 4412 of robotic fire extinguisher 4400 may be used to calculate rotation angle 4421 of robotic fire extinguisher 4400 by Pythagorean theorem $$\sin\theta = \frac{\text{opposite}}{\text{hypotneuse}} = \frac{\Delta y}{d},$$

wherein θ is rotation angle 4421 and d is known distance 4422 of the first sensor from ICR 4412 located at the left wheel of robotic fire extinguisher 4400. Rotation angle 4421 may also be determined by forming a right-angled triangle with the second sensor and ICR 4412 and using its respective translation in the y direction.

Figure 44C:
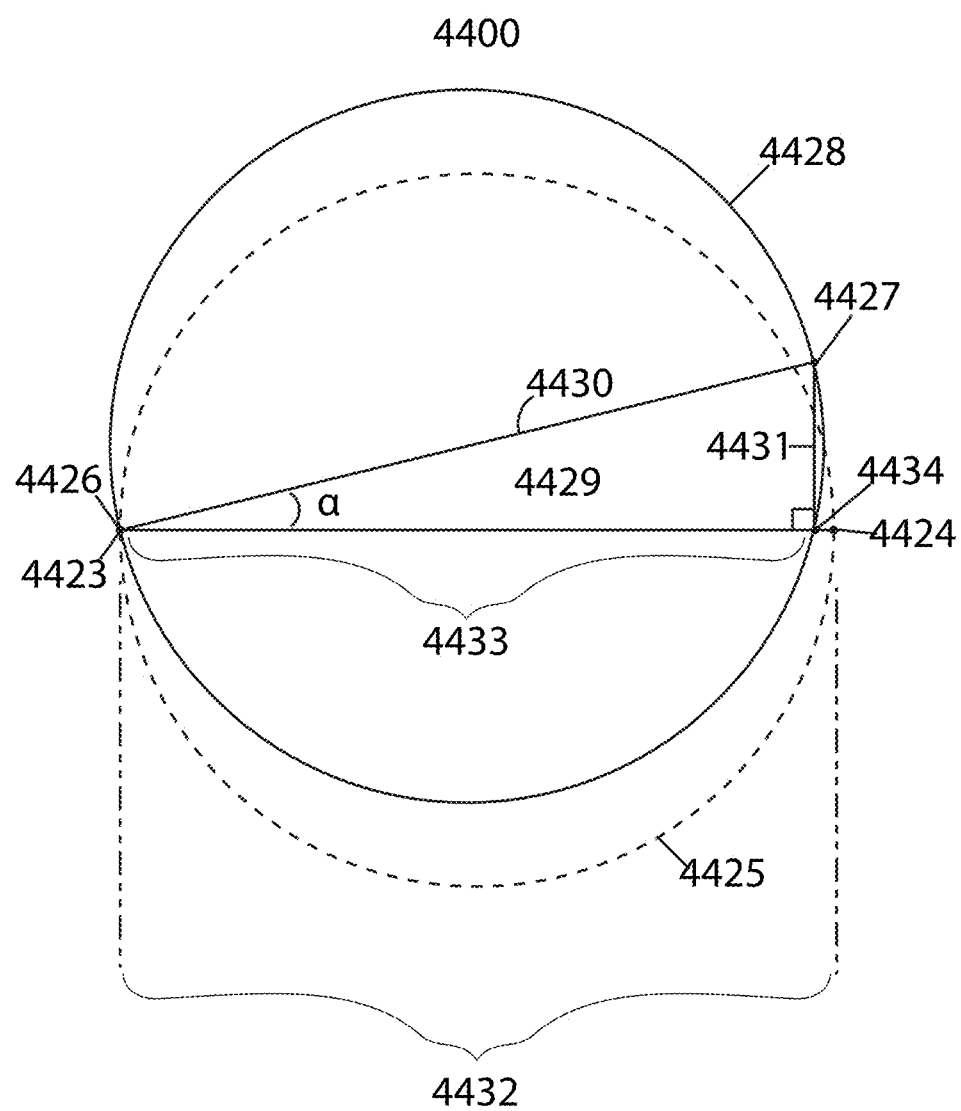

In another example, the initial position of robotic fire extinguisher 4400 with two optoelectronic sensors 4423 and 4424 is shown by the dashed line 4425 in FIG. 44C. A secondary position of the robotic fire extinguisher 4400 with two optoelectronic sensors 4426 and 4427 after having moved slightly is shown by solid line 4428. Because the secondary position of optoelectronic sensor 4426 is substantially in the same position 4423 as before the move, no difference in position of this sensor is shown. In real time, analyses of movement may occur so rapidly that the robotic fire extinguisher may only move a small distance in between analyses and only one of the two optoelectronic sensors may have moved substantially. The rotation angle of robotic fire extinguisher 4400 may be represented by the angle α within triangle 4429. Triangle 4429 is formed by the straight line 4430 between the secondary positions of the two optoelectronic sensors 4426 and 4427, the line 4431 from the second position 4427 of the optoelectronic sensor with the greatest change in coordinates from its initial position to its secondary position to the line 4432 between the initial positions of the two optoelectronic sensors that forms a right angle therewith, and the line 4433 from the vertex 4434 formed by the intersection of line 4431 with line 4432 to the initial position 4423 of the optoelectronic sensor with the least amount of (or no) change in coordinates from its initial position to its secondary position. The length of side 4430 is fixed because it is simply the distance between the two sensors, which does not change. The length of side 4431 may be determined by the processor by finding the difference of the y coordinates between the position of the optoelectronic sensor at position 4427 and at position 4424. It should be noted that the length of side 4433 does not need to be known in order to find the angle α. The trigonometric function $$\sin\theta = \frac{\text{opposite}}{\text{hypotneuse}}$$

only requires that the length of sides 4431 (opposite) and 4430 (hypotenuse) are known. In applying the above trigonometric relationship, the processor obtains the angle α, which is the turning angle of the robotic fire extinguisher.

Figure 45:
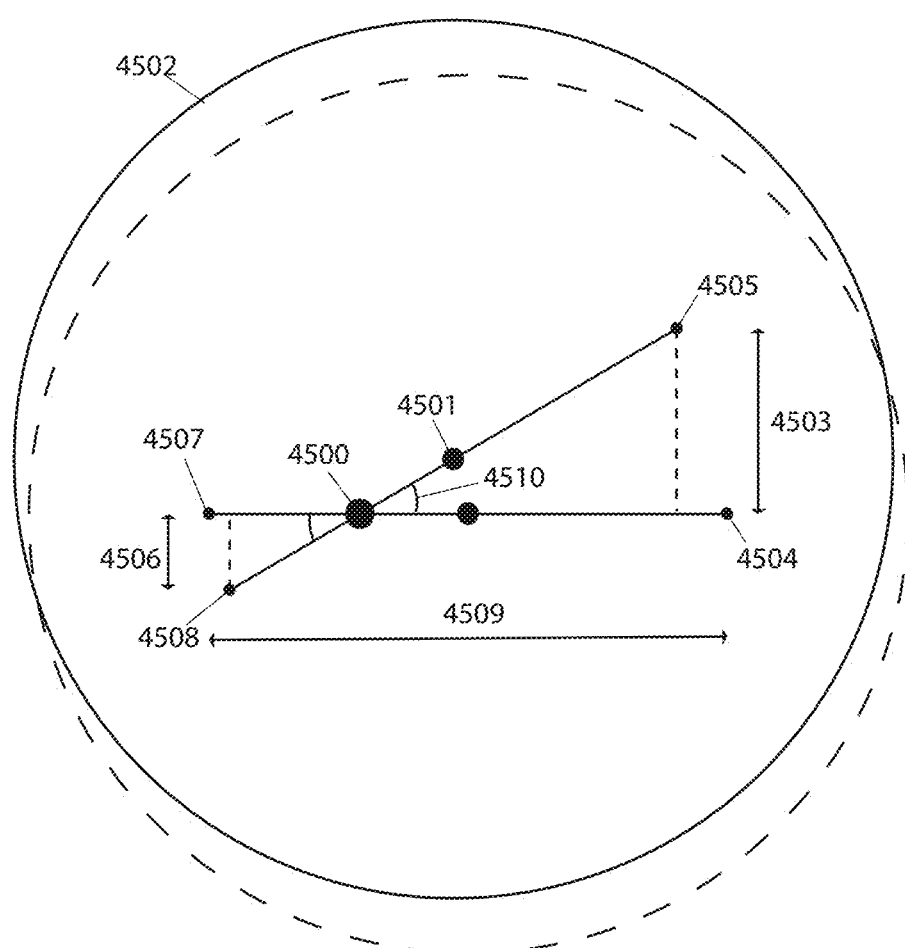
FIG. 45 illustrates a method for calculating a rotation angle of a robotic device, according to some embodiments.

In a further example, wherein the location of the ICR relative to each of the optoelectronic sensors is unknown, translations in the x and y directions of each optoelectronic sensor may be used together to determine rotation angle about the ICR. For example, in FIG. 45 ICR 4500 is located to the left of center 4501 and is the point about which rotation occurs. The initial and end position of robotic fire extinguisher 4502 is shown, wherein the initial position is denoted by the dashed lines. While the distance of each optoelectronic sensor to center 4501 or a wheel of robotic fire extinguisher 4502 may be known, the distance between each sensor and an ICR, such as ICR 4500, may be unknown. In these instances, translation 4503 in the y direction of first optoelectronic sensor initially positioned at 4504 and translated to position 4505 and translation 4506 in the y direction of second optoelectronic sensor initially position at 4507 and translated to position 4508, along with distance 4509 between the two sensors may be used by the processor to determine rotation angle 4510 about ICR 4500 using $$\sin\theta = \frac{\Delta y_1 + \Delta y_2}{b},$$

wherein θ is rotation angle 4510, $\Delta y_1$ is translation 4503 in the y direction of first optoelectronic sensor, $\Delta_2$ is translation 4506 in the y direction of second optoelectronic sensor and b is distance 4509 between the two sensors.

The methods of tracking linear and rotational movement of the robotic fire extinguisher described herein may be supplemental to other methods used for tracking movement and localizing the robotic device. For example, this method may be used with an optical encoder, gyroscope or both to improve accuracy of the estimated movement or may be used independently in other instances.

In some embodiments, given that the time Δt between captured images is known, the linear velocities in the x ($v_x$) and y ($v_y$) directions and angular velocity (w) of the robotic fire extinguisher may be estimated by the processor using $$v_x = \frac{\Delta x}{\Delta t},$$

$$v_y = \frac{\Delta y}{\Delta t},$$

and $$\omega = \frac{\Delta \theta}{\Delta t},$$

wherein Δx and Δy are the translations in the x and y directions, respectively, that occur over time Δt and Δθ is the rotation that occurs over time Δt.

In some embodiments, one optoelectronic sensor may be used to determine linear and rotational movement of the robotic fire extinguisher using the same methods as described above. The use of at least two optoelectronic sensors is particularly useful when the location of ICR is unknown or the distance between each sensor and the ICR is unknown. However, rotational movement of the robotic fire extinguisher may be determined using one optoelectronic sensor when the distance between the sensor and ICR is known, such as in the case when the ICR is at the center of the robotic fire extinguisher and the robotic fire extinguisher rotates in place (illustrated in FIG. 44A) or the ICR is at a wheel of the robotic fire extinguisher and the robotic fire extinguisher rotates about the wheel (illustrated in FIGS. 44B and 44C).

In some embodiments, the optoelectronic sensors and light source, such as an LED, may be combined into a single unit device with an embedded processor or may be connected to any other separate processor, such as that of the robotic fire extinguisher. In some embodiments, each optoelectronic sensor has its own light source and in other embodiments optoelectronic sensors may a share light source. In some embodiments, a dedicated image processor may be used to process images and in other embodiments a separate processor coupled to the optoelectronic sensor(s) may be used, such as the processor of the robotic fire extinguisher. In some embodiments, each optoelectronic sensor, light source and processor may be installed as separate units. In some embodiments, a light source, such as an LED, may not be used.

In some embodiments, two-dimensional optoelectronic sensors may be used. In other embodiments, one-dimensional optoelectronic sensors may be used. In some embodiments, one-dimensional optoelectronic sensors may be combined to achieve readings in more dimensions. For example, to achieve similar results as two-dimensional optoelectronic sensors, two one-dimensional optoelectronic sensors may be positioned perpendicularly to one another. In some instances, one-dimensional and two dimensional optoelectronic sensors may be used together.

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multi-purpose chip, or a specific application chip with built in mapping capabilities. In some embodiments, the implementations may include built-in circuitry for easier and faster processing and GPUs and TPUs capabilities. In some embodiments, a localization chip or a processing chip with a localization processing unit may be used. In some embodiments, a localization and mapping chip or a processing chip such as a CPU or MCU with a localization and mapping processing unit may be used.

In some embodiments, various bumps on a path of the robotic fire extinguisher may affect the map or localization. In some embodiments, an IMU may be used to measure a bump in the z-axis. In some embodiments, the processor detects a bump when the values in the z-axis suddenly increase beyond a predetermined threshold. In some embodiments, the processor filters out the readings captured while the robot was traversing across the bump. In some embodiments, the processor uses the last known good mapping and localization prior to the robot traversing the bump, generates an ensemble of eight (or another number) hypothesized robots, each hypothesized robot being approximately half a diameter of the robot apart from one another and located within the last known good map around the last known good localization, and determines which hypothesized robot fits best with readings collected after fully traversing over the bump. In some embodiments, the number of hypothesized robots and the distance between the hypothesized robots may vary. In some embodiments, the processor may choose a particular hypothesized robot and generate an ensemble around the hypothesized robot in iterative process until gaining localization back. In some embodiments, these methods may be performed in parallel or done in an iterative process. In some embodiments, the processor of the robot adjusts all of its motors, etc. to on, off, then maximum speed intermittently when the robot becomes stuck. In some embodiments, the processor stops its motors and announces an error code. In some embodiments, the GUI of the robot or an application of a communication device paired with the processor of the robot may suggest that the robot either abort the sweeping or drive back to the dock when the robot is stuck. In some embodiments, the processor adjusts all motors to maximum speed and drives at full speed to overcome being stuck and drives back to the dock when drive back to the dock is selected.

In some embodiments, the robotic fire extinguisher may attempt to make a determination as to whether or not it has visited a work area previously based on, for example, features of an environment. In some embodiments, a unique characteristic may appear slightly different when identified a second time, and the processor of a robotic fire extinguisher may need to manipulate the data of the unique characteristic captured in order to determine whether or not the characteristic accurately matches what was previously captured when determining whether or not a work area has previously been operated in. In some embodiments, if the processor of the robotic fire extinguisher recognizes an area as having been previously visited, the processor may alter the operations or path of the robotic fire extinguisher. In some embodiments, the robotic fire extinguisher may be ordered to skip operations in a work area. For example, a button on a user interface of the robotic fire extinguisher, or an application of a communications device that is paired with the robotic fire extinguisher may be used to command the processor of the robotic fire extinguisher to skip operations in a given work area. An example of a communications device includes, but is not limited to, a smart phone, smart watch, laptop, tablet, remote control, or the like. In some embodiments, if the robotic fire extinguisher enters a work area, the robotic fire extinguisher may be commanded to leave the work area. In some embodiments, the robotic fire extinguisher may attempt to return to the work area for operations at a later time. In some embodiments, the robotic fire extinguisher may be commanded to execute an action at a particular point in a working session. In some embodiments, a selection may be made as to when a work area is to be operated in based on the number of times a button is pressed commanding the robot to skip a work area. In some embodiments, the robotic fire extinguisher may be commanded to leave an area, where after the robotic fire extinguisher may attempt to operate in the area during a different operational cycle. In some embodiments, the robotic fire extinguisher may store data regarding commands to leave a work area and use this data for future operational cycles. In some embodiments, the robotic fire extinguisher may alter a schedule it has set for recurring services based on commands received to vacate an area. In some embodiments, a command may be set for the robotic fire extinguisher to vacate an area but to return at an unspecified future time. In some embodiments, a command may be set for the robotic fire extinguisher to vacate an area but to return at a specified predetermined time. In some embodiments, if a first robotic fire extinguisher obtains a command to leave a work area, the processor of the first robotic fire extinguisher may communicate with additional robotic fire extinguishers for the purposes of sharing this data in order to indicate that other robotic fire extinguishers should not operate in a given area at a particular time or for the purposes of sharing other data. In some embodiments, the processor of the robotic fire extinguisher may use historical data with regards to prior work operations when planning an operational session.

In some embodiments, the processor of the robotic fire extinguisher may fail in a localization capacity and not recognize where it is located in a work environment. In some embodiments, if localization fails, the robotic fire extinguisher may begin a new mapping of the working environment, operating in a new functional and mapping capacity, visiting each work area, such as, each room, and mapping these areas beginning with the work area in which localization first failed. In some embodiments, the failure of localization may include the loss of data pertaining to the location of the robotic fire extinguisher's initial navigational starting point, such as the location of a docking or base station of the robotic fire extinguisher to which the robotic fire extinguisher returns following each work session. In some embodiments, when localization fails the processor of the robotic fire extinguisher may immediately begin to search for the base station. In some embodiments, when localization fails the robotic fire extinguisher may operate and map work areas while simultaneously searching for the base station. In some embodiments, when localization fails the robotic fire extinguisher may complete a work session, mapping the environment as it does so, and return to each work area after the work session to search for the base station. In some embodiments, the processor of the robotic fire extinguisher may search for the base station by searching for an IR light emitted by a transmitter of the base station to be received by the robotic fire extinguisher which will signal the robotic fire extinguisher to return to the base station. In some embodiments, the processor of the robotic fire extinguisher may search for a base station by rotating in 360 degrees in each work area until a signal from the base station is received by the robotic fire extinguisher. In some embodiments, if the robotic fire extinguisher does not detect a signal from the base station in a work area, the robotic fire extinguisher may automatically navigate to a different work area. In some embodiments, if the robotic fire extinguisher detects a signal from the base station in a work area, the robotic fire extinguisher may automatically cease operations and navigate directly to the base station. In some embodiments, if the robotic fire extinguisher detects a signal from the base station in a work area, the robotic fire extinguisher may navigate to a new work area before navigating back to the base station. In some embodiments, if the base station is detected by the robotic fire extinguisher, and the robotic fire extinguisher thereafter navigates to a new work area, a path plan may be set by the processor for navigating back to the base station. In some embodiments, if a first robotic fire extinguisher's localization fails, a processor of the first robotic fire extinguisher may communicate with a centralized control system, a base station, other devices or processors of other robotic fire extinguishers to assist with the processor recovering a localization capacity. For example, if a first robotic fire extinguisher's localization fails, a processor of the first robotic fire extinguisher may send out, for example, a distress signal indicating that it has lost localization, and a processor of a second robotic fire extinguisher, may share data such as maps or other beneficial data with the processor of the first robotic fire extinguisher to assist the with recovering some form of a localization capacity. In an additional example, if the localization capacity of the processor of the robotic fire extinguisher fails, the processor may communicate with a centralized control system, base station, other devices or processors of other robotic fire extinguishers to attempt to recover data such as maps or other beneficial data to assist the with recovering some form of a localization capacity. In some embodiments, the signal transmitter used may be an omni-directional signal emitter such as, for example, an IR signal emitter. In some embodiments, the signal transmitter may be located on the robotic fire extinguisher and the signal may be received by the base station. In some embodiments, when localization fails, the robotic fire extinguisher may detect and mark obstacles encountered in the environment within a new map generated during the operational cycle as the robotic fire extinguisher navigates in the work environment. In some embodiments, features on the base station may be used for the processor of the robotic fire extinguisher to easily distinguish when searching for the base station. For example, unique angles or physical characteristics of a base station may be implemented in memory of the processor to help the processor easily identify the base station. Further, characteristics of a surface of a base station such as printing, painting, patterns, and the like may be used by the processor to easily identify the base station. Further details of methods for recognizing prior rooms and skipping prior rooms visited are disclosed in U.S. Patent Application No. 62/740,558, the entire contents of which is hereby incorporated by reference.

In some embodiments, the processor of the robotic fire extinguisher generates a movement path in real-time based on the observed environment. In some embodiments, the processor of the robotic fire extinguishers determines a movement path in real-time based on sensor observations captured by sensors. In some embodiments, a topological graph represents the movement path and is described with a set of vertices and edges, the vertices being linked by edges. Vertices may be represented as distinct points while edges may be lines, arcs or curves. The properties of each vertex and edge may be provided as arguments at run-time based on real-time sensory input of the environment. The topological graph may define the next actions of the robotic fire extinguisher as it follows along edges linked at vertices. While executing the movement path, in some embodiments, rewards may be assigned by the processor as the robotic fire extinguisher takes actions to transition between states and uses the net cumulative reward to evaluate a particular movement path comprised of actions and states. A state-action value function may be iteratively calculated during execution of the movement path based on the current reward and maximum future reward at the next state. One goal is to find optimal state-action value function and optimal policy by identifying the highest valued action for each state. As different topological graphs including vertices and edges with different properties are executed over time, the number of states experienced, actions taken from each state, and transitions increase. The path devised by the processor of the robotic fire extinguisher iteratively evolves to become more efficient by choosing transitions that result in most favorable outcomes and by avoiding situations that previously resulted in low net reward. After convergence, the evolved movement path is determined to be more efficient than alternate paths that may be devised using real-time sensory input of the working environment. In some embodiments, the reward is determined individually for the robotic fire extinguisher, or the reward is a cumulative reward of each of the two or more robotic fire extinguishers collaborating with another. For example, the movement path chosen for each of the two or more robotic fire extinguishers collectively maximizes the cumulative reward. Further, the states, actions, and outcomes experienced by one robotic fire extinguisher may be shared with other robotic fire extinguishers operating within the same environment such that actions that resulted in poor outcome may be avoided. For example, if one robotic device finds that the action of transitioning to a particular state results in the robotic device becoming stuck, this information may be shared with other processors of other robotic devices such that they may avoid that particular action.

In some embodiments, the properties of the vertices and edges of the topological graph describing the movement path of the robotic fire extinguisher may be provided at run-time as an argument based on sensory input of the robotic fire extinguisher or other collaborating robotic fire extinguishers or from external sensors. A property of a vertex may be, for example, its position and the number and position of vertices linked via edges. A property of an edge may be, for example, edge type such as a line or arc, edge length or radius depending on edge type, angular orientation and connecting vertices. In some embodiments, vertices and edges may also include other properties such as driving surface type (e.g., gravel, paved, hard wood floor, carpet, tile, etc.), area identifier (e.g., excavation area, soil dump site, parking lot, highway, bedroom, kitchen, etc.) and/or driving conditions (e.g., maximum speed). In some embodiments, the number of roots or nodes of the topological graph is limited to one. A vertex designated as a root within the topological graph by the processor of the robotic fire extinguisher is capable of reaching the whole graph from the designated vertex, i.e. there is a path from the root to all other vertices and edges within the graph.

As the processor receives sensory input (from a local or remote sources), in some embodiments, it creates a representation of the map in a taxicab coordinate system and begins to devise a topological path within discovered areas, i.e. areas for which sensory input has been collected, the edges of the path being lines following along the gridlines of the taxicab coordinate system. Sensory input may be, for example, a collection of distance measurements. In some embodiments, distance measurements may be taken using distance measurement devices such as LIDAR, camera, laser, sonar, ultrasonic, stereo vision, structured light vision devices or chip-based depth sensors using CMOS or CCD imagers, IR sensors, and such. In some embodiments, other sensory input may be used, for example, data indicating driving surface type or obstacle detection. For example, optical driving surface sensors may detect a pattern of reflected light emitted onto the driving surface, which upon multiple stages of signal processing and machine learning embodiments may determine to a degree of certainty the type of driving surface upon which the robotic fire extinguisher drives. As a further example, obstacles may be detected by embodiments based on a sensed reflection of emitted light from an obstacle sensor. Tactile sensors may also be used by embodiments to provide sensory input to the processor when physical contact is made with an object. The devised topological path may be based on estimates of suitable properties for vertices and edges based on sensory input received. The next action or movement of the robotic fire extinguisher may be along a path defined by the estimated properties of the vertices and edges. As the robotic fire extinguisher executes the action, it transitions from its current state to a new state. After completing each action and transitioning to a new state, in embodiments, a reward may be assigned by the processor and a state-action value function may be iteratively calculated based on the current reward and the maximum future reward at the next state. In some embodiments, e.g., where time is not considered discrete, the value of the reward may be dependent on sequential time required to complete the action and transition to the new state, where a greater negative reward is assigned for longer times. As such, in some embodiments, the robotic fire extinguisher incurs a negative reward at all times. Since the robotic fire extinguisher is penalized for time, any event that may reduce the efficiency of the robotic fire extinguisher in terms of time to complete its task increases its overall penalty. These events may include collisions with obstacles, number of U-turns, repeat actions, driving distance, and driving on particular types of driving surfaces. In some embodiments, the processor uses these events to directly assign negative reward thereby acting as optimization factors themselves. In some embodiments, the processor uses other efficiency metrics, such as percentage or level of task completion. Once the robotic fire extinguisher completes its task and hence the topological movement path required to complete the task, a positive reward value (e.g., predetermined or dynamically determined) may be assigned. A net reward value for the executed movement path, consisting of a sequence of states and actions, may then be calculated as the sum of the cumulative negative reward from the multiple actions taken while transitioning from one state to another and the positive reward upon completion of the task. In some embodiments, the state is a collection of current states of two or more robotic fire extinguishers collaborating with one another and the reward is a cumulative reward of each of the two or more robotic fire extinguishers collaborating.

As multiple work sessions are executed over time, in embodiments, optimal state-action value function and optimal policy from which actions from different states are selected may be determined. From a single state, there may be several actions that may be executed. The sequence of states and actions that result in the maximum net reward, in some embodiments, provides the optimal state-action value function. The action from a state which results in the highest reward provides the optimal policy for the given state. As different movement paths are executed over time, the number of states experienced, actions taken from each state, and transitions increase. In some embodiments, the processor devises a path for the robotic fire extinguisher iteratively over multiple work sessions, evolving to become more efficient by choosing transitions that result in most favorable outcomes and by avoiding situations that previously resulted in low net reward. In some embodiments, properties for each movement path are selected within an assigned work cycle such that the cumulative penalty value for consecutive work cycles have a lowering trend over time. In some embodiments, convergence to a particular movement path may be executed by the processor of the robotic fire extinguisher when the reward is maximized or a target reward is achieved or a period of time has passed after which the processor may converge the movement path to the path with highest reward. After convergence, assuming the system did not fall into a local minimum or is able to get out of a local minimum, the evolved movement path may be deemed by the processor of the robotic fire extinguisher to likely be more efficient than alternate paths that may possibly be devised using real-time sensory input of the working environment.

The states and actions of the robotic fire extinguisher devising and executing the movement path may be represented by a Markov Chain comprised of a sequence of random variables $s_1, s_2, s_3, \ldots$. The random variables are states the robotic fire extinguisher may experience and form a set S called the state space. The topological graph defining the movement path of the robotic fire extinguisher may therefore be thought of as a sequence of states $s \in S$, where states are connected by paths and are each defined with a discrete time stamp $t \in T$. For the robotic fire extinguisher to transition from a current state s to next state s', the robotic fire extinguisher performs an action $a \in A$ over a time span of t to t', displacing a distance d along an edge of the topological graph. When the state space is defined by a taxicab coordinate system, the distance d is given by the rectilinear distance or L1 norm and displacement is along a line. For a Markov chain, having Markov property, the probability of moving to a next state P (s'|s). is dependent only on the present state. A Markov chain may, therefore, be represented by a topological graph, where the edges of graph t are labelled by the probabilities of transitioning from one state at time t to another at time t'. A Markov chain may be extended to a Markov Decision Process (MDP) through the addition of actions (choices) and rewards (motivation), such that there are multiple actions that may be chosen from a single state and a different reward associated with each action. MDP is a five-tuple comprising a finite set of states S, a finite set of actions A, the probability that action a will lead to state s' at time t' given by P (s'|s), the immediate reward after transitioning from state s to state s' given by r, and the discount factor γ, representing the difference in importance between future and present rewards. The goal of the MDP is to find an optimal state-action value function by identifying sequence of states and actions with highest net reward. Since multiple actions may be taken from each state, the goal is to also find an optimal policy that indicates the action from each state with the highest reward value.

In a MDP actions are taken to transition from one state to another and after transitioning to each new state a reward is assigned. For a sequence of states and actions, the net reward is the sum of rewards received for the sequence of states and actions, with future rewards discounted. The expected net reward for the execution of a sequence of states and actions is given by a state-action value function. The goal is to find an optimal state-action value function by identifying sequence of states and actions with highest net reward. Since multiple actions can be taken from each state, the goal is to also find an optimal policy that indicates the action from each state with the highest reward value. Consider a sequence of states s and actions a followed by rewards r, $s_t$, $a_t$, $r_{t+1}$, $s_{t+1}$, $a_{t+1}$, $r_{t+2}$, $s_{t+2}$, $a_{t+2}$, $r_{t+3}$, ... $a_T$, $r_T$, $s_T$. The net return $R_T = r_{t+1} + \gamma^1 r_{t+2} + \ldots + \gamma^{T-t-1} r_T$ to be expected in the future is the sum of the rewards received for the sequence of states and actions beginning from state $s_t$ and ending with terminal state $s_T$, wherein $0 \leq \gamma < 1$ is a discount factor applied as distant rewards are less important. The value of a state-action pair $Q(s, a) = E[R_T | s_t = s, a_t = a]$ is defined as equivalent to the expected return $R_T$ for the sequence of states and actions beginning with state $s_t$ and action $a_t$ and ending with terminal state $s_T$. By finding the sequence of states and actions which maximize the state-action value function Q (s, a), the optimal value function $Q^*(s, a) = \max E [R_T | s_t = s, a_t = a]$ is identified. And the optimal policy $\pi^*(S) = \text{argmax } Q^*(s, a)$ for each state may be derived by identifying the highest valued action which can be taken from each state. To iteratively calculate the state-action value function for a given state s and action a, the Bellman Optimality equation may be applied. The optimal value function obeys Bellman Optimality equation and may be expressed as $Q^*(s, a) = E [r + \gamma \max Q^*(s', a')]$. The equation expresses that the value for a given state s and action a should represent the current reward r observed at state s plus the maximum discounted γ future reward for the next state s' the robotic device would end up in. This equation can be used by the processor to iteratively calculate the state-action value $Q_{i+1}(s, a) = E [r + \gamma \max Q_i(s', a')]$ for a given state s and action a as the sequence of states and action are executed. i is the iteration number and begins at i=0, with $Q_0(s', a')$ being initially assumed based, for example, on previous experience, the midpoint of the min and max value possible, or an arbitrary value. Based on the definition of an expected value, the equation is equivalent to $Q_{i+1}(s, a) = \Sigma P(s'|s)[r + \gamma \max Q_i(s', a')]$, wherein P(s'|s) is the probability that action a will lead to state s', as previously described above. In the particular application of determining optimal movement path, the sequence of states and actions corresponds to the states visited and actions taken while executing the movement path from start to finish, where actions are defined by the properties of vertices and edges chosen based on sensory input from sensors of the robotic fire extinguisher or sensors of other robotic fire extinguishers or fixed sensing devices. Over time, as more states are visited and different actions from each state are evaluated the system will converge to find the most optimal action to take from each state thereby forming an optimal policy. Further, as different sequences of states and actions, i.e. movement paths, are evaluated over time, the system will converge to the most optimal sequence of states and actions.

Path planning methods that may be used are described in U.S. patent application Ser. Nos. 16/041,286, 16/422,234, 15/406,890, 15/676,888, and 14/673,633, the entire contents of which are hereby incorporated by reference. For example, in some embodiments, the processor of a robot may learn a path, such as a path between a first location and a second location, in a variety of ways. In some embodiments, the processor of the robot may be taught a path by directing the robot along the desired path by physically moving the robot or by using a remote control or an application of a communication device paired with the processor of the robot. Other methods of moving the robot along the desired path may also be used, such as voice commands. In some embodiments, a live video feed (or real-time images) of a camera mounted on the robot is transmitted to a remote operator that controls movement of the robot using an input device (e.g., joystick, keyboard, mouse, touchscreen of communication device, etc.). In some embodiments, the processor of the robot may be taught a path between the first location and second location by physically wheeling the robot from the first location, through the environment, to the second location. In some embodiments, the first location is the same as the second location. In some embodiments, the processor of the robotic device is taught the same path or different paths multiple times in the same area. In some embodiments, the processor of the robot is taught one or more paths for one or more different areas (e.g., kitchen, bathroom, bedroom, etc.) and paths to navigate between one or more areas. Over time, as the processor learns more and more paths, the processor becomes more efficient at covering areas or navigating between two areas or locations. In some embodiments, the processor collects data using one or more sensors during learning one or more paths and uses data collected to learn most efficient coverage of an area or navigation between areas or locations. In some embodiments, the processor of the robot uses similar methods and techniques as those described above for learning and converging to the most efficient movement path during manual training, wherein the robot is controlled to move along a particular path. In another example, a user may remotely guide the robot using an input device based on a live video feed from a camera of the robot transmitted to a communication device (e.g., laptop, smartphone, tablet, etc.) of the operator. In some embodiments, the operator directs the robot, from a first location to a second location. In some embodiments, the robot is manually navigated to a specific location a predetermined amount of times before it autonomously navigates to the specific location. In some embodiments, the details learned by a processor during path learning may be shared with one or more other processors of one or more robots, such that details learned by a single processor may improve SLAM of other processors of other robots. For example, during manual training a processor may learn to avoid a particular area due to high obstacle density and may mark it in the map. This may be shared with processors of other robots operating in the same environment.

In some embodiments path learning may be initiated by, for example, a user pressing a start button on the robot or on any other device capable of communicating with the processor of the robot, voice activation or autonomously upon startup, prior to beginning the process of teaching a path to a processor of the robot. In some embodiments, path learning may be completed by, for example, pressing an end button on the robot or on any other device capable of communicating with the processor of the robot, voice activation, or autonomously upon detecting no movement of the robot for a predetermined amount of time. Path learning may be initiated when the robot is positioned at a first location and completed after the robot has navigated along the desired path and returned back to the first location or any other location. In some embodiments, path learning may be initiated when the robot is positioned at a first location and completed after the robot has navigated along the desired path to the second location. Alternatively, in some embodiments, path learning may be initiated and completed using an application of a communication device, such as a mobile device, laptop or smart phone, capable of communicating with the robot. In some embodiments, an application of a communication device may be used to mark a path of the robot within a map of the working environment that may be shared with the processor of the robot and the processor actuates the robot to move along the path. During path learning, the processor of the robot may determine its location within an internal map of the working environment while simultaneously mapping the environment. In some instance, the processor of the robot may mark observed obstacles in the working environment within an internal map of the environment. In some embodiments, the robot includes an extendable handle that a user may use to physically wheel the robot along a path. In some embodiments, a communication device may be used to manually direct the robot along a path. In some embodiments, the communications device is part of the robot and it detachable and wireless. In some embodiments, the communication device is a personal device that executes an application paired with the processor of the robot. In some embodiments, the communication device is a user interface built into the robot.

In some embodiments, the robotic fire extinguisher executes a wall or perimeter follow path or another type of path that includes segments parallel to one or more walls or perimeters within the environment (e.g., boustrophedon). In some embodiments, the processor estimates a major wall-angle of a room to align the path of the robot with a wall in the room. In some embodiments, the processor determines a set of all obstacle locations (e.g., walls, furniture, etc.) in a current map of the environment (e.g., partial or full map) and divides the set of all obstacles locations into subsets including contiguous obstacle locations (i.e., connected obstacle locations). For example, a portion of obstacle locations within the set of all obstacle locations may correspond with a wall. The portion of obstacle locations corresponding with the wall of the environment may be contiguous as they are positioned immediately adjacent to one another and collectively form the wall, and thus may be a subset. In another example, a portion of obstacle locations corresponding with a piece of furniture may form a subset. In some embodiments, the processor determines the largest subset of contiguous obstacle locations and orders the obstacle locations within that subset (e.g., such that the contiguous obstacle locations are ordered from right to left or vice versa). In some embodiments, the processor executes a simplification algorithm (e.g., Ramer/Douglas/Puecker algorithm) over the ordered obstacle locations that eliminates obstacle locations from the subset that are within a predetermined distance from the line connecting a previous and next obstacle location. In some embodiments, the processor connects the obstacle locations remaining in the subset, resulting in one or more line segments. In some embodiments, the processor determines the angle of the longest line segment with respect to the coordinate system of the robot to estimate the room orientation such that it may follow a path parallel to one or more walls.

In some embodiments, the processor may divide the environment into zones and order zones for coverage to improve efficiency. Examples of methods for dividing an environment into zones for coverage are described in U.S. patent application Ser. Nos. 14/817,952, 15/619,449, 16/198,393, 14/673,633, and 15/676,888, the entire contents of which are hereby incorporated by reference.

In some embodiments, the processor of the robotic fire extinguisher uses a motion model to predict the position of the robotic fire extinguisher within the environment. In some embodiments, the processor determines parameters of the motion model of the robotic fire extinguisher that improve predictions of the motion model. In some embodiments, the processor uses a parametrized model $\hat{y}_{t+1}=\text{model}(y_t, p_t)$ to predict output $\hat{y}_{t+1}$ at time t+1 given observed output $y_t$ at time t and parameters $p_t$. In some embodiments, the processor estimates the parameters that minimize a prediction error $y_{t+1}-\hat{y}_{t+1}$, wherein $y_{t+1}$ is the actual observed output at time t+1. In some embodiments, the processor uses recursive estimation $p_{t+1}=p_t+K_{t+1}(y_{t+1}-\hat{y}_{t+1})$ to estimate parameter $p_{t+1}$ at time t+1. In some embodiments, the processor uses the gain $K_{t+1}$ to determine how much the current prediction error $y_{t+1}-\hat{y}_{t+1}$ affects the update of the parameter estimate. In some embodiments, the processor updates the parameter in the direction of the gradient of the error by, for example, $K_{t+1}=Q_{t+1}\Psi_{t+1}$ with $Q_{t+1}$ suitably chosen, and the gradient $$\Psi_{t+1}^T = \frac{\partial \hat{y}_{t+1}}{\partial p_t},$$

wherein $Q_{t+1}$ is a weighting factor used to determine how much to correct the parameter estimate. In some embodiments, the processor uses tracking error gradient descent wherein $Q_{t+1}$=constant. In some embodiments, the processor uses tracking error gradient descent with normalized gradient wherein $$Q_{t+1} = \frac{\gamma}{\|\Psi_{t+1}\|^2 + \text{Bias}},$$

wherein $\gamma$ is a constant. In some embodiments, $Q_{t+1}$ is chosen as a forgetting factor. In some embodiments, $K_{t+1}$ is chosen as Kalman gain of a Kalman filter.

In some embodiments, the processor of the robotic fire extinguisher predicts where the robotic fire extinguisher is going to be positioned $\hat{x}_{t+1}=\text{model}(x_t, u_t, \Delta t)$ at time t+1 given an input state $x_t$ (i.e., previous position estimate) and sensor measurements $u_t$ (e.g., wheel encoder) at time t and a time step $\Delta t$. In some embodiments, the processor implements the model in a Kalman filter and the prediction step is an explicit Euler step in time. In some embodiments, the processor receives feedback on the computed state estimate (e.g., through sensor pose updates) and corrects the pose to $x_{t+1}$ at time t+1. In some embodiments, the processor determines a tracking error using $e=x_{t+1}-\hat{x}_{t+1}$.

In some embodiments, the processor uses tracking error gradient descent to reduce the tracking error. In some embodiments, the processor adds parameters to the model $\hat{x}_{t+1}=\text{model}(x_t, u_t, \Delta t, p_t)$ to improve the performance of the model. Examples of parameters include wheel radii, wheel distance, sensor position, etc. In some embodiments, the processor incrementally perturbs the parameters in the direction that reduces the tracking error the most, or otherwise in the direction of the descent on the tracking error function $$E = \frac{1}{2}e^T e.$$

In some embodiments, the processor updates the parameters using $$p_{t+1} = p_t + h\left(\frac{\partial \hat{x}_{t+1}}{\partial p_t}\right)^T e,$$

where h is a small step size. This is the same update rule as described above with $$Q_{t+1} = h \text{ and } \Psi_{t+1}^T = \frac{\partial \hat{x}_{t+1}}{\partial p_t}.$$

In some embodiments, the processor uses hyperparameters for fine tuning the model. In some embodiments, the processor uses an adaptive step size h(t), wherein $$Q_{t+1} = \frac{\gamma}{\|\Psi_{t+1}\|^2 + \text{Bias}},$$

for example. In some embodiments, the processor models uncertainty by premultiplying Q with a matrix M to, for example, do larger updates in directions with higher certainty and smaller updates in directions of uncertainty, or by taking the Kalman update instead as it is already corrected by both covariance matrices. In some embodiments, the processor improves stability of the model by, for example, detecting outliers and eliminating them or by delayed updates, or by delayed updates on a separate set of parameters.

In some embodiments, the processor uses an extended Kalman filter with augmented state space in modeling the motion of the robotic fire extinguisher. In some embodiments, the processor uses the augmented state space $$\tilde{x}_t = \begin{pmatrix} x_t \\ p_t \end{pmatrix}$$

and applies the Kalman filter to $\tilde{x}$. In some embodiments, the parameters are taken as time-invariant and the processor models zero noise on the parameter portion of the state. Therefore, in some embodiments, the processor models dynamics using $$\tilde{x}_{t+1} = \Phi(\ldots) = \begin{pmatrix} \text{model}(x_t, u_t, \Delta t, p_t) \\ p_t \end{pmatrix}.$$

In some embodiments, the processor updates the Jacobian F from the non-augmented Kalman process using $$\tilde{F} = \frac{\partial \Phi}{\partial \tilde{x}_t} = \begin{pmatrix} F & \Psi_{t+1}^T \\ 0 & I \end{pmatrix},$$

wherein $\Psi_{t+1}^T$ is the model derivative with respect to the parameters as defined above.

For example, in some embodiments, the processor models motion of the robotic fire extinguisher using $\dot{x}=v \cos \omega$; $\dot{y}=v \sin \omega$; $\dot{\theta}=\omega$, with initial conditions such as $x(t_0)=x_0$, and wherein v is translational velocity and w is rotational velocity. In some embodiments, the processor uses a forward model including $x_{t+1}=x_t+v\Delta t \cos \theta_t$; $y_{t+1}=y_t+v\Delta t \sin \theta_t$; $\theta_{t+1}=\theta_t+\omega\Delta t$, to compute the motion of the robotic fire extinguisher. In some embodiments, the processor determines translational and rotational velocities v and ω based on observed right and left wheel velocities $\omega_R$ and $\omega_L$ of the robotic fire extinguisher using $$\begin{pmatrix} v \\ \omega \end{pmatrix} = J \begin{pmatrix} \omega_L \\ \omega_R \end{pmatrix},$$

wherein $$J = \begin{pmatrix} r_L/2 & r_R/2 \\ -r_L/b & r_R/b \end{pmatrix}$$

and $r_R$ and $r_L$ are right and left wheel radii and b is the distance between the right and left wheels. In some embodiments, the processor uses wheel sizes as parameters $p_t=[r_L, r_R]^T$ and $J=J(p_t)$. In some embodiments, the processor estimates parameters p for observed left and right wheel velocities $u_t=[\omega_L, \omega_R]^T$ to improve the forward model. Given abbreviated state vector $$x_t = \begin{pmatrix} x_t \\ y_t \\ \theta_t \end{pmatrix},$$

the processor uses forward model $$\hat{x}_{t+1} = \text{model}(x_t, u_t, \Delta t, p_t) = \begin{pmatrix} x_t + v_t \Delta t \cos \theta_t \\ y_t + v_t \Delta t \sin \theta_t \\ \theta_t + \omega_t \Delta t \end{pmatrix}$$

with $$\begin{pmatrix} v_t \\ \omega_t \end{pmatrix} = J(p_t) u_t.$$

In some embodiments, the processor determines the gradient for a single time step in the direction of the model parameters using $$\Psi_{t+1}^T = \frac{\partial \hat{x}_{t+1}}{\partial p_t} = \frac{1}{2} \Delta t \begin{pmatrix} \omega_L \cos \theta_t & \omega_R \cos \theta_t \\ \omega_L \sin \theta_t & \omega_R \sin \theta_t \\ -2\omega_L/b & 2\omega_R/b \end{pmatrix}.$$

In some embodiments, the processor updates parameters $p_t$ in the direction of steepest descent of a single time step error function. In some embodiments, upon receiving a scan match the processor estimates the position of the robotic fire extinguisher using EKF before the scan match and the position of the robotic fire extinguisher based on the scan match. In some embodiments, the processor determines an error $e_{t+1}$=pose from scan match—pose from EKF before scan match and uses the error to update the parameters $p_{t+1}=p_t+Q_{t+1}\Psi_{t+1}e_{t+1}$.

In some embodiments, the processor uses deep neural networks to learn complex, non-linear functions. In some embodiments, the deep neural networks recognize patterns by clustering and classifying data. In some embodiments, the neural networks establish correlations between the input data. In some embodiments, the processor uses feedforward networks to learn a motion model for the robotic fire extinguisher. In some embodiments, different hierarchy and training process are used to construct different possible motion models. For example, a first motion model uses previous pose and measure velocity to determine new pose. The first motion model takes position into account and is therefore capable of mapping coordinate dependent parameters (e.g., slightly tilted driving surface). In another example, a second motion model uses initial position and measured velocity to determine change in pose. The second motion model does not take position into account and therefore may only account for internal/general mismatches. Neither model 1 or 2 take previous velocities into account. In embodiments, previous velocities could be added but would increase the dimension of the neural network. While neural networks may be trained to a high degree of accuracy, they do not take previous measurements into account. Further, there is the challenge of online calibration with neural networks as calibration requires frequently running backpropagation. Depending on the size of the network, this may result in significant computational cost. Freezing the network and only updating the network with respect to a few parameters (e.g. additional tuning input parameters) may be considered conceptually similar to the methods described above.

In some embodiments, the processor uses a recurrent neural network as it is a time-aware type of neural network. Recurrent neural networks are able to keep states hidden from time step to time step. In contrast to feedforward neural networks, the input of recurrent neural networks includes not only the current input but also information perceived in previous steps. Internally, recurrent units have an internal state. This internal state also influences the output. With each input, this hidden state is updated. This mechanism provides a feedback loop at every time step in the input series. In some embodiments, the processor uses continuous time recurrent neural networks to account for slight mismatch in sampling speed of velocities. Different recurrent neural network hierarchies for modeling dynamics of the robotic fire extinguisher may be used. In some embodiments, the recurrent neural network feeds back the output from one time step as input to the next time step. In some embodiments, the processor uses a time integration recurrent neural network to estimate a new state of the robotic fire extinguisher. In one embodiment, the recurrent neural network receives state and sensor measurements as input and outputs a new state and feeds back the output as the state input. In another embodiment, the recurrent neural network outputs how much the state changed and the change is fed back and added to the state input. In some embodiments, the model is updated by backpropagating the error. In some embodiments, the error is backpropagated using iterative closest point matching.

In some embodiments, the processor uses a modular structure to estimate a new state of the robotic fire extinguisher wherein the recurrent neural network receives state, odometer measurements and IMU readings as input and the output position and velocity of the recurrent neural network is used input into a non-linear ground-truth model (e.g., classical motion model), in addition to state, describing physics of the robotic fire extinguisher. The ground truth model outputs a new state. In some embodiments, the processor updates the model by determining the hard-coded gradient of the ground truth model and directly backpropagating the gradient through the recurrent neural network.

In some embodiments, the processor estimates a new state of the robotic fire extinguisher by learning to map observations to parameters p of a forward model (e.g., as described above). The recurrent neural network receives state, odometer measurements, and IMU readings as input and outputs parameters p, which are received as input into the forward model. The forward model also receives state and odometer measurements as input and outputs a new state. In some embodiments, the processor uses $p_{t+1}=p_t+Q_{t+1}\Psi_{t+1}e_{t+1}$ as described above to determine parameters instead of the recurrent neural network. Further description of the estimation of model parameters is provided in U.S. patent application Ser. Nos. 16/041,286 and 16/353,019, the entire contents of which are hereby incorporated by reference.

In some embodiments, the processor determines which tools to use based on characteristics of the environment using methods such as those described in U.S. Patent Application Nos. 62/735,137, Ser. Nos. 16/239,410 and 16/163,530, the entire contents of which are hereby incorporated by reference. For example, in some embodiments, the robotic fire extinguisher uses the processor and one or more environmental sensors (e.g., sensors that sense attributes or can observe or provide data from which inferences can be made about characteristics of an environment, such as those of a floor, a wall, or a surface of an object). Examples of sensors include, but are not limited to, floor sensors, debris sensors, obstacle sensors, cliff sensors, acoustic sensors, cameras, optical sensors, distance sensors, motion sensors, tactile sensors, electrical current sensors, and the like. Sensors may sense various attributes of one or more of these features of an environment, e.g., particulate density, rolling resistance experienced by robot wheels, hardness, location, hardness, color, acoustic reflectivity, optical reflectivity, planarity, and the like. In some embodiments, the sensor takes readings of the environment and the processor obtains the sensor data. In some embodiments, the sensed data is associated with location data of the robotic fire extinguisher indicating the location of the robotic fire extinguisher at the time the sensor data was obtained. In some embodiments, the processor infers environmental characteristics from the sensory data. In some embodiments, the processor adjusts various operating parameters of actuators, like speed, torque, duty cycle, frequency, slew rate, flow rate, pressure drop, temperature, or second or third order time derivatives of the same. For instance, some embodiments adjust the speed of components (e.g., wheel, water pump motor, etc.) based on the environmental characteristics inferred. In some embodiments, the processor activates or deactivates (or modulates intensity of) functions (e.g., fire extinguisher, water pump supplying water to a hose, etc.) based on the environmental characteristics inferred. In other instances, the processor adjusts a path, operational schedule (e.g., time when various designated areas are worked upon), and the like based on sensory data. Examples of environmental characteristics include floor type, obstacle density, room or area type, level of debris accumulation, level of user activity, time of user activity, etc.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X' ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A robotic device, comprising:
   a chassis;
   a set of wheels coupled to the chassis;
   a battery;
   a plurality of sensors;
   a processor;
   a tangible, non-transitory, machine readable medium storing instructions that when executed by the processor effectuates operations comprising:
      capturing, with at least one sensor disposed on the robotic device, data of an environment of the robotic device and data indicative of movement of the robotic device;
      generating or updating, with the processor, a map of the environment based on at least a portion of the captured data; and
      generating or updating, with the processor, a movement path of the robotic device based on at least the map, wherein at least a portion of the movement path comprises a repetitive iteration of:
         actuating, with the processor of the robot, the robot to traverse a first linear segment;
         actuating, with the processor of the robot, the robot to rotate 180 degrees in a first rotation, wherein the first rotation comprises traversing a first distance in a direction perpendicular to the first linear segment after starting the first rotation and before finishing the first rotation;
         actuating, with the processor of the robot, the robot to traverse a second linear segment; and
         actuating, with the processor of the robot, the robot to rotate 180 degrees in a second rotation, wherein the second rotation comprises traversing a second distance in a direction perpendicular to the second linear segment after starting the second rotation and before finishing the second rotation.

2. The robotic device of claim 1, wherein the first distance and the second distance are less than a coverage width of the robotic device.

3. The robotic device of claim 1, wherein the operations further comprise:
  inferring, with the processor, a current location of the robotic device, wherein inferring the location of the robotic device comprises:
    generating, with the processor, virtually simulated robotic devices located at different possible locations with the environment;
    comparing, with the processor, at least a portion of the captured data of the environment with maps of the environment, each map corresponding with a perspective of a virtually simulated robotic device; and
    identifying, with the processor, the current location of the robotic device as a location of a virtually simulated robotic device with which the at least a portion of the captured data of the environment best fits the corresponding map of the environment thereof; and
  wherein the processor generates or updates the movement path further based on at least a portion of the captured data and the inferred current location of the robotic device.

4. The robotic device of claim 1, wherein:
  the robotic device collaborates with a second robotic device;
  the robotic device executes a first task; and
  the second robotic device executes a second task after the robotic device completes the first task.

5. The robotic device of claim 4, wherein:
  a processor of the second robotic device navigates within the environment using the map generated by the processor of the robotic device.

6. The robotic device of claim 4, wherein the robotic device executes the first task or another task upon receiving a message from an artificial intelligence assistant device.

7. The robotic device of claim 1, wherein the operations further comprise:
  inferring, with the processor, presence or absence of at least one person within the environment based on sensor data; and
  actuating, with the processor, the robotic device to perform an action based on the presence or the absence of the at least one person within the environment.

8. The robotic device of claim 1, wherein:
  the robotic device is paired with a software application executed on a user computing device; and
  the software application is configured to:
    display the map; a status of the robotic device; and a battery level; and
    receive at least one input designating a selection, a modification, a deletion, or an addition of a new boundary; a subarea within the map; a name for a subarea within the map; a robotic operation to be executed within at least one subarea within the map; a setting to be applied within at least one subarea within the map; a virtual barrier; and a schedule of operation.

9. The robotic device of claim 1, wherein the operations further comprise:
  capturing, with an image sensor disposed on the robotic device, images of objects within the environment;
  identifying, with the processor, an object type of an object captured in an image based on a database of objects of different object types; and
  actuating, with the processor, the robotic device to avoid or maneuver around the object.

10. The robotic device of claim 9, wherein operations further comprise:
  marking, with the processor, the object within the map.

11. The robotic device of claim 1, wherein:
  the robotic device alerts a user by at least illuminating a light source disposed on the robotic device; and
  a software application executed on a user computing device paired with the robot is configured to display the alert.

12. The robotic device of claim 1, wherein the operations further comprise:
  determining, with the processor, an environmental characteristic of a first location within the environment based on at least some sensor data captured by the plurality of sensors; and
  actuating, with the processor, an adjustment to a speed of at least one component of the robotic device based on the environmental characteristic.

13. The robotic device of claim 12, wherein the environmental characteristic comprises a driving surface type.

14. The robotic device of claim 1, wherein the operations further comprise:
  determining, with the processor, an environmental characteristic of a first location within the environment based on at least some sensor data captured by the plurality of sensors; and
  actuating, with the processor, an adjustment to a movement path of the robotic device based on the environmental characteristic.

15. The robotic device of claim 1, wherein the operations further comprise:
  determining, with the processor, a schedule of operation of the robotic device within the environment based on sensed times of human activity within the environment.

16. A tangible, non-transitory, machine readable medium storing instructions that when executed by a processor of a robotic device effectuates operations comprising:
  capturing, with at least one sensor disposed on the robotic device, data of an environment of the robotic device and data indicative of movement of the robotic device;
  generating or updating, with the processor, a map of the environment based on at least a portion of the captured data; and
  generating or updating, with the processor, a movement path of the robotic device based on at least the map, wherein at least a portion of the movement path comprises a repetitive iteration of:
    actuating, with the processor of the robot, the robot to traverse a first linear segment;
    actuating, with the processor of the robot, the robot to rotate 180 degrees in a first rotation, wherein the first rotation comprises traversing a first distance in a direction perpendicular to the first linear segment after starting the first rotation and before finishing the first rotation;
    actuating, with the processor of the robot, the robot to traverse a second linear segment; and
    actuating, with the processor of the robot, the robot to rotate 180 degrees in a second rotation, wherein the second rotation comprises traversing a second distance in a direction perpendicular to the second linear segment after starting the second rotation and before finishing the second rotation.

17. A method for operating a robotic device, comprising:
  capturing, with at least one sensor disposed on the robotic device, data of an environment of the robotic device and data indicative of movement of the robotic device;

generating or updating, with a processor of the robotic device, a map of the environment based on at least a portion of the captured data; and generating or updating, with the processor, a movement path of the robotic device based on at least the map, wherein at least a portion of the movement path comprises a repetitive iteration of:

actuating, with the processor of the robot, the robot to traverse a first linear segment;

actuating, with the processor of the robot, the robot to rotate 180 degrees in a first rotation, wherein the first rotation comprises traversing a first distance in a direction perpendicular to the first linear segment after starting the first rotation and before finishing the first rotation;

actuating, with the processor of the robot, the robot to traverse a second linear segment; and actuating, with the processor of the robot, the robot to rotate 180 degrees in a second rotation, wherein the second rotation comprises traversing a second distance in a direction perpendicular to the second linear segment after starting the second rotation and before finishing the second rotation.

18. The method of claim 17, wherein:

the robotic device collaborates with a second robotic device;

the robotic device executes a first task;

the second robotic device executes a second task after the robotic device completes the first task;

a processor of the second robotic device navigates within the environment using the map generated by the processor of the robotic device or a map generated by the processor of the second robotic device;

the robotic device executes the first task or another task upon receiving a message from an artificial intelligence assistant device;

the robotic device alerts a user by at least illuminating a light source disposed on the robotic device;

the robotic device is paired with a software application executed on a user computing device; and the software application is configured to:

display the map; a status of the robotic device; and a battery level; and receive at least one input designating a selection, a modification, a deletion, or an addition of a new boundary; a subarea within the map; a name for a subarea within the map; a robotic operation to be executed within at least one subarea within the map; a setting to be applied within at least one subarea within the map; a virtual barrier; and a schedule of operation.

19. The method of claim 17, further comprising:

inferring, with the processor, presence or absence of at least one person within the environment based on sensor data;

actuating, with the processor, the robotic device to perform an action based on the presence or the absence of the at least one person within the environment;

capturing, with an image sensor disposed on the robotic device, images of objects within the environment;

identifying, with the processor, an object type of an object captured in an image based on a database of objects of different object types; and actuating, with the processor, the robotic device to avoid or maneuver around the object.

20. The method of claim 17, further comprising:

determining, with the processor, an environmental characteristic of a first location within the environment based on at least some sensor data captured by the plurality of sensors; and actuating, with the processor, an adjustment to a speed of at least one component or a movement of the robotic device based on the environmental characteristic.

* * * * *